United States Patent
Chauhan et al.

(10) Patent No.: US 11,480,714 B2
(45) Date of Patent: Oct. 25, 2022

(54) METHODS AND COMPOSITIONS FOR IMPROVED COMFORT CONTACT LENS

(71) Applicant: UNIVERSITY OF FLORIDA RESEARCH FOUNDATION, Gainesville, FL (US)

(72) Inventors: Anuj Chauhan, Gainesville, FL (US); Kuan-Hui Hsu, Tainan (TW); Yifan Yu, Gainesville, FL (US)

(73) Assignee: University of Florida Research Foundation, Inc., Gainesville, FL (US)

( * ) Notice: Subject to any disclaimer, the term of this patent is extended or adjusted under 35 U.S.C. 154(b) by 105 days.

(21) Appl. No.: 16/649,555

(22) PCT Filed: Oct. 4, 2018

(86) PCT No.: PCT/US2018/054372
§ 371 (c)(1),
(2) Date: Mar. 20, 2020

(87) PCT Pub. No.: WO2019/070979
PCT Pub. Date: Apr. 11, 2019

(65) Prior Publication Data
US 2020/0284951 A1 Sep. 10, 2020

Related U.S. Application Data

(60) Provisional application No. 62/568,008, filed on Oct. 4, 2017.

(51) Int. Cl.
*G02B 1/18* (2015.01)
*C08J 3/28* (2006.01)
*G02B 1/04* (2006.01)

(52) U.S. Cl.
CPC .................. *G02B 1/18* (2015.01); *C08J 3/28* (2013.01); *G02B 1/043* (2013.01); *C08J 2377/00* (2013.01); *C08J 2383/04* (2013.01)

(58) Field of Classification Search
CPC ...................................... G02B 1/043
See application file for complete search history.

(56) References Cited

U.S. PATENT DOCUMENTS 4,954,587 A   9/1990  Mueller
5,270,415 A   12/1993 Sulc et al.
(Continued)

FOREIGN PATENT DOCUMENTS

CA   2552319 A1   4/2005
CA   2857981 A1   6/2013

OTHER PUBLICATIONS

International Search Report issued for PCT/US2018/054372, dated Jan. 10, 2019.

*Primary Examiner* — Michael F Pepitone
(74) *Attorney, Agent, or Firm* — Thomas | Horstemeyer, LLP

(57) ABSTRACT

In one aspect, the present disclosure relates to a contact lens comprising a disclosed lubricious surface layer. In a further aspect, the lubricious surface layer comprises a polyacrylamide, e.g., a poly(N,N-dimethylacrylamide. In various aspects, the lubricious surface layer is formed at the surface of a contact lens. In a further aspect, the lens can be a hydrogel lens. In a further aspect, the lens can be a silicone hydrogel lens. The present disclosure also pertains to methods of forming the disclosed lubricious surface layers on a surface of a contact lens. This abstract is intended as a scanning tool for purposes of searching in the particular art and is not intended to be limiting of the present disclosure.

10 Claims, 34 Drawing Sheets

(56) References Cited

U.S. PATENT DOCUMENTS

| | | | |
|---|---|---|---|
| 5,914,074 A | 6/1999 | Martin et al. | |
| 6,200,626 B1 * | 3/2001 | Grobe, III | C08J 7/0423 427/2.24 |
| 6,213,604 B1 * | 4/2001 | Valint, Jr. | C08J 7/123 427/574 |
| 6,630,243 B2 * | 10/2003 | Valint, Jr. | G02B 1/043 428/420 |
| 2001/0036556 A1 * | 11/2001 | Jen | C08J 7/123 428/522 |
| 2010/0280247 A1 | 11/2010 | Mutti et al. | |
| 2011/0060267 A1 | 3/2011 | Dewoolfson et al. | |
| 2011/0166247 A1 | 7/2011 | Myung et al. | |
| 2013/0155371 A1 | 6/2013 | Zhang et al. | |
| 2015/0234204 A1 | 8/2015 | Havenstrite et al. | |

* cited by examiner

| [DMA] [AIBN] | 2% DMA | 4% DMA | 6% DMA |
|---|---|---|---|
| 3.0% AIBN | Lubricity unchanged; Shape unchanged | Lubricity unchanged; Shape unchanged | Lubricity increase; Shape changed |
| 3.5% AIBN | Lubricity slight increase; Shape unchanged | Lubricity increase; Shape slightly changed | Lubricity increase; Shape changed |
| 4.0% AIBN | Lubricity increase; Shape slightly changed | Lubricity increase; Shape changed | Lubricity increase; Shape changed |

FIG. 31

| Property \ Lens Type | Acuvue 2 | O₂ Optix | Acuvue Trueye | Bausch&Lomb Soflens | Acuvue Oasys |
|---|---|---|---|---|---|
| Shape | Normal | Normal | Normal | Enlarged | Normal |
| Lubricity | Unchanged | Unchanged | Unchanged | Unchanged | Slight Increase |
| Image | | | | | |

FIG. 40

| Lens Type / Property | Acuvue 2 | O₂ Optix | Acuvue Trueye | Bausch&Lomb Soflens | Acuvue Oasys |
|---|---|---|---|---|---|
| Shape | Changed | Normal | Normal | Enlarged | Normal |
| Lubricity | Unchanged | Unchanged | Unchanged | Unchanged | Increase |
| Image | | | | | |

FIG. 41

| Property \ [AIBN] | 2% | 2.8% | 3.0% | 3.2% | 3.4% | 4% | 6% |
|---|---|---|---|---|---|---|---|
| Shape | Normal | Normal | Normal | Slightly changed | Slightly changed | Slightly changed | Slightly changed |
| Lubricity | Slight Increase | Slight Increase | Increase | Increase | Increase | Increase | Increase |
| Transparency | Yes | Yes | Yes | Yes | Yes | No | No |
| Image | | | | | | | |

FIG. 42

METHODS AND COMPOSITIONS FOR IMPROVED COMFORT CONTACT LENS

CROSS-REFERENCE TO RELATED APPLICATIONS

This Application is a National Stage of International Application No. PCT/US2018/054372, filed Oct. 4, 2018, which claims the benefit of U.S. Provisional Application No. 62/568,008, filed on Oct. 4, 2017, each of which is incorporated herein by reference in its entirety.

BACKGROUND

Almost 17% of new contact lens wearers drop out in the first year of wear, which is a major concern for the contact lens industry. Discomfort and dryness are the leading causes, accounting for almost 50% of the drop outs. In spite of the continuous improvements in lens design, a large proportion of contact lens users experience at least some form of dryness and discomfort, particularly towards the end of the day. The mechanisms that cause the dryness and discomfort are complex and not completely understood. A number of researchers have examined the correlation between various lens properties and discomfort and dryness. A recent study showed that excessive lens movement, inferior lens decentration, poor surface wettability and deposits, inferior corneal staining, and Asian ethnicity are associated with dryness and discomfort. Comfort data for several different lens types showed a significant correlation with the coefficient of friction. No correlation between comfort and oxygen permeability, modulus and water content has been shown. A correlation between comfort and friction coefficient suggests that the friction coefficient is the key lens property associated with the end of day comfort, irrespective of the technique used in the measurement. The correlation of dryness and discomfort to lubricity is related to the rapid motion of the upper eyelid over the contact lens surface during a blink. It is believed that lubricity and wettability impact dryness and discomfort, and so significant efforts have been made to improve both of these properties.

Efforts to improve wettability have focused on incorporation of highly hydrophilic monomers, plasma surface treatments and addition of internal wetting agents such as polyvinyl alcohol (PVA) or polyvinyl pyrrolidone (PVP). Extended release of PVA incorporated in Focus DAILIES® (CIBA Vision) into the tears improves comfort. Incorporation of PVP in Acuvue® Oasys™ with Hydraclear™ Plus lenses (Johnson and Johnson) increases wettability, eliminating the need for surface treatment typically required in silicone hydrogel contact lenses. Contrary to the PVA incorporation, the PVP loaded in lenses remains trapped due to the high molecular weight but appears to partially diffuse to the surface to increase the wettability. Hyaluronic acid (HA) has been explored as a potential biocompatible comfort enhancer and lenses loaded with sodium hyaluronate (Hyaluronate Gel) have been commercialized (Safigel™).

The incorporation of wetting and comfort agents in contact lenses has not relieved the experience of discomfort and dryness for many patients. Lens modifications have included designing better formulations of rewetting drops and lens care solutions to improve the comfort. PVA, PVP and HA have been used in artificial tears and rewetting drops for contact lenses. Addition of surfactants in rewetting drops and lens care solutions has been found to be beneficial, most likely due to improved wettability of the surface due to surfactant adsorption. The adsorbed and absorbed surfactant desorbs with time, possibly leading to the reduced end of day comfort. Preservatives included in the formulations can absorb into the lenses and then desorb during lens wear, which could lead to patient discomfort and potential toxicity issues.

Mayhan et al. U.S. Pat. No. 4,589,964 teaches a method to generate a substrate with peroxy groups thereon and initiate polymerization of water soluble monomers from surface generated radicals. Bertrand et al. U.S. Pat. No. 5,274,028 teaches a method to surface graft a hydrophilic polymer on a semi-solid polymer substrate with hydroperoxide groups on the surface in the presence of a variable valence metal ion in a reduced state.

Despite advances in research directed toward improved lubricity and wettability in contact lens, a significant percentage of contact lens users discontinue use of contact lens due to discomfort and dryness. Moreover, compositions directed to increasing comfort and decreasing dryness are associated with desorption and release of the wetting and/or lubricious agents into the eye. These needs and other needs are addressed by the present disclosure.

SUMMARY

In accordance with the purpose(s) of the present disclosure, as embodied and broadly described herein, the present disclosure, in one aspect, relates to a contact lens comprising a disclosed lubricious surface layer. In a further aspect, the lubricious surface layer comprises a polyacrylamide, e.g., a poly(N,N-dimethylacrylamide. In various aspects, the lubricious surface layer is formed at the surface of a contact lens. In a further aspect, the lens can be a hydrogel lens. In a further aspect, the lens can be a silicone hydrogel lens. The present disclosure also pertains to methods of forming the disclosed lubricious surface layers on a surface of a contact lens.

Disclosed are hydrogel contact lens, comprising a surface layer of relatively uniform thickness comprising a non-ionic hydrophilic polymer, wherein the surface layer has a water swelling ratio greater than 200%.

In a further aspect, the present disclosure pertains to methods of preparing a surface layer thereon, comprising providing a hydrogel contact lens body; loading the hydrogel contact lens body from an aqueous solution comprising a tertiary amine to form a tertiary amine loaded silicone hydrogel contact lens body or from an aqueous solution comprising a radical initiator to form a radical initiator loaded silicone hydrogel contact lens body; providing an aqueous solution comprising a monomer for a non-ionic hydrophilic polymer for use with the radical initiator loaded silicone hydrogel contact lens body or the aqueous solution comprising a monomer for a non-ionic hydrophilic polymer and further comprising a radical initiating oxidizer for use with the tertiary amine loaded silicone hydrogel contact lens body; contacting the tertiary amine loaded hydrogel contact lens body or the radical initiator loaded hydrogel contact lens body with the aqueous solution comprising the monomer; polymerizing the monomer at the surface and/or in the surface and a surface adjacent portion of the tertiary amine loaded hydrogel contact lens body or the radical initiator loaded silicone hydrogel contact lens body to form a non-ionic hydrophilic polymer film; terminating the radical; and isolating a lubricious hydrogel contact lens.

In various aspects, the present disclosure pertains to a contact lens comprising a surface layer formed by a disclosed method.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims. In addition, all optional and preferred features and modifications of the described aspects are usable in all aspects of the present disclosure taught herein. Furthermore, the individual features of the dependent claims, as well as all optional and preferred features and modifications of the described aspects are combinable and interchangeable with one another.

BRIEF DESCRIPTION OF THE FIGURES

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIG. 1A shows the release of DMA and TEMED from a DMA and TEMED infused ACUVUE® TruEye® lens versus time FIG. 1B shows the release of APS from an APS infused ACUVUE® TruEye® lens vs time.

FIG. 31 shows representative data for an ACUVUE® Advance contact lens modified to have a lubcricious coating, according to an aspect of the present disclosure, made using the indicated AIBN and DMA concentrations. A representative photograph image is shown for each reaction condition along with a summary of lubricity and shape characteristics following modification with the lubcricious coating. Reactions were carried out at 70° C. for 12 hours.

FIG. 40 shows representative data for the indicated contact lens modified to have a lubcricious coating, according to an aspect of the present disclosure, made using 3.4 wt % AIBN and 30 wt % DMA concentrations. A representative photograph image is shown for each reaction condition along with a summary of lubricity and shape characteristics following modification with the lubcricious coating. Reactions were carried out under UV light for 20 seconds using an RC-742 Pulsed UV System (Xenon Corporation, Wilmington, Mass.).

FIG. 41 shows representative data for the indicated contact lens modified to have a lubcricious coating, according to an aspect of the present disclosure, made using 3.4 wt % AIBN and 40 wt % DMA concentrations. A representative photograph image is shown for each reaction condition along with a summary of lubricity and shape characteristics following modification with the lubcricious coating. Reactions were carried out under UV light for 20 seconds using an RC-742 Pulsed UV System.

FIG. 42 shows representative data for an ACUVUE® Oasys contact lens modified to have a lubcricious coating, according to an aspect of the present disclosure, made using the indicated AIBN concentrations with 40 wt % DMA. A representative photograph image is shown for each reaction condition along with a summary of lubricity and shape characteristics following modification with the lubcricious coating. Reactions were carried out by UV irradiation for 20 seconds using an RC-742 Pulsed UV System.

FIG. 44A shows the overall testing device with the chuck and forked tongue highlighted by the indicated arrows. FIG. 44B shows a closer view of the chuck and forked tongue shown in FIG. 44A. FIG. 44C shows a domed rod with a rabbit cadaver cornea attached to the domed rod. FIG. 44D shows a concaved rod with a test contact lens attached to the concaved rod.

Figure 1A:
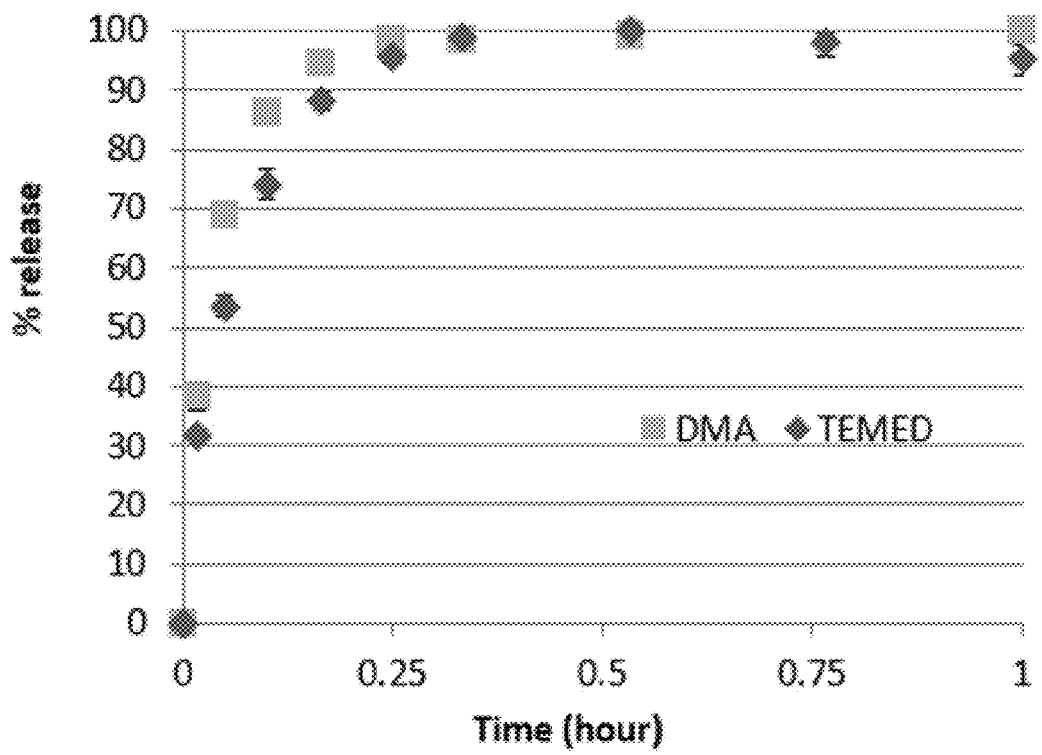
FIGS. 1A and 1B show representative data for a disclosed composition.

Additional advantages of the present disclosure will be set forth in part in the description which follows, and in part will be obvious from the description, or can be learned by practice of the present disclosure. The advantages of the present disclosure will be realized and attained by means of the elements and combinations particularly pointed out in the appended claims. It is to be understood that both the foregoing general description and the following detailed description are exemplary and explanatory only and are not restrictive of the present disclosure, as claimed.

DETAILED DESCRIPTION

Many modifications and other aspects disclosed herein will come to mind to one skilled in the art to which the disclosed compositions and methods pertain having the benefit of the teachings presented in the foregoing descriptions and the associated drawings. Therefore, it is to be understood that the present disclosures are not to be limited to the specific aspects disclosed and that modifications and other aspects are intended to be included within the scope of the appended claims. The skilled artisan will recognize many variants and adaptations of the aspects described herein. These variants and adaptations are intended to be included in the teachings of this disclosure and to be encompassed by the claims herein.

Although specific terms are employed herein, they are used in a generic and descriptive sense only and not for purposes of limitation.

As will be apparent to those of skill in the art upon reading this disclosure, each of the individual aspects described and illustrated herein has discrete components and features which may be readily separated from or combined with the features of any of the other several aspects without departing from the scope or spirit of the present disclosure.

Any recited method can be carried out in the order of events recited or in any other order that is logically possible. That is, unless otherwise expressly stated, it is in no way intended that any method or aspect set forth herein be construed as requiring that its steps be performed in a specific order. Accordingly, where a method claim does not specifically state in the claims or descriptions that the steps are to be limited to a specific order, it is no way intended that an order be inferred, in any respect. This holds for any possible non-express basis for interpretation, including matters of logic with respect to arrangement of steps or operational flow, plain meaning derived from grammatical organization or punctuation, or the number or type of aspects described in the specification.

All publications mentioned herein are incorporated herein by reference to disclose and describe the methods and/or materials in connection with which the publications are cited. The publications discussed herein are provided solely for their disclosure prior to the filing date of the present application. Nothing herein is to be construed as an admission that the present disclosure is not entitled to antedate such publication by virtue of prior disclosure. Further, the dates of publication provided herein can be different from the actual publication dates, which can require independent confirmation.

While aspects of the present disclosure can be described and claimed in a particular statutory class, such as the system statutory class, this is for convenience only and one of skill in the art will understand that each aspect of the present disclosure can be described and claimed in any statutory class.

It is also to be understood that the terminology used herein is for the purpose of describing particular aspects only and is not intended to be limiting. Unless defined otherwise, all technical and scientific terms used herein have the same meaning as commonly understood by one of ordinary skill in the art to which the disclosed compositions and methods belong. It will be further understood that terms, such as those defined in commonly used dictionaries, should be interpreted as having a meaning that is consistent with their meaning in the context of the specification and relevant art and should not be interpreted in an idealized or overly formal sense unless expressly defined herein.

Prior to describing the various aspects of the present disclosure, the following definitions are provided and should be used unless otherwise indicated. Additional terms may be defined elsewhere in the present disclosure.

A. DEFINITIONS

As used herein, "comprising" is to be interpreted as specifying the presence of the stated features, integers, steps, or components as referred to, but does not preclude the presence or addition of one or more features, integers, steps, or components, or groups thereof. Moreover, each of the terms "by," "comprising," "comprises", "comprised of," "including," "includes," "included," "involving," "involves," "involved," and "such as" are used in their open, non-limiting sense and may be used interchangeably. Further, the term "comprising" is intended to include examples and aspects encompassed by the terms "consisting essentially of" and "consisting of." Similarly, the term "consisting essentially of" is intended to include examples encompassed by the term "consisting of.

As used in the specification and the appended claims, the singular forms "a," "an" and "the" include plural referents unless the context clearly dictates otherwise. Thus, for example, reference to "a monomer," "a lens," or "an initiator," includes, but is not limited to, two or more such monomers, lenses, or initiators, and the like.

Reference to "a" chemical compound refers one or more molecules of the chemical compound, rather than being limited to a single molecule of the chemical compound. Furthermore, the one or more molecules may or may not be identical, so long as they fall under the category of the chemical compound. Thus, for example, "a" poly(DMA) is interpreted to include one or more polymer molecules of the poly(dimethyl acrylamide), where the polymer molecules may or may not be identical (e.g., different molecular weights and/or isomers).

It should be noted that ratios, concentrations, amounts, and other numerical data can be expressed herein in a range format. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. Ranges can be expressed herein as from "about" one particular value, and/or to "about" another particular value. Similarly, when values are expressed as approximations, by use of the antecedent "about," it will be understood that the particular value forms a further aspect. For example, if the value "about 10" is disclosed, then "10" is also disclosed.

When a range is expressed, a further aspect includes from the one particular value and/or to the other particular value. For example, where the stated range includes one or both of the limits, ranges excluding either or both of those included limits are also included in the present disclosure, e.g. the phrase "x to y" includes the range from 'x' to 'y' as well as the range greater than 'x' and less than 'y'. The range can also be expressed as an upper limit, e.g. 'about x, y, z, or less' and should be interpreted to include the specific ranges of 'about x', 'about y', and 'about z' as well as the ranges of 'less than x', less than y', and 'less than z'. Likewise, the phrase 'about x, y, z, or greater' should be interpreted to include the specific ranges of 'about x', 'about y', and 'about z' as well as the ranges of 'greater than x', greater than y', and 'greater than z'. In addition, the phrase "about 'x' to 'y'", where 'x' and 'y' are numerical values, includes "about 'x' to about 'y'".

It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a numerical range of "about 0.1% to 5%" should be interpreted to include not only the explicitly recited values of about 0.1% to about 5%, but also include individual values (e.g., about 1%, about 2%, about 3%, and about 4%) and the sub-ranges (e.g., about 0.5% to about 1.1%; about 5% to about 2.4%; about 0.5% to about 3.2%, and about 0.5% to about 4.4%, and other possible sub-ranges) within the indicated range.

As used herein, the terms "about," "approximate," "at or about," and "substantially" mean that the amount or value in question can be the exact value or a value that provides equivalent results or effects as recited in the claims or taught herein. That is, it is understood that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art such that equivalent results or effects are obtained. In some circumstances, the value that provides equivalent results or effects cannot be reasonably determined. In such cases, it is generally understood, as used herein, that "about" and "at or about" mean the nominal value indicated ±10% variation unless otherwise indicated or inferred. In general, an amount, size, formulation, parameter or other quantity or characteristic is "about," "approximate," or "at or about" whether or not expressly stated to be such. It is understood that where "about," "approximate," or "at or about" is used before a quantitative value, the parameter also includes the specific quantitative value itself, unless specifically stated otherwise.

As used herein, the term "effective amount" refers to an amount that is sufficient to achieve the desired modification of a physical property of the composition or material. For example, an "effective amount" of a DMA in a solution refers to an amount that is sufficient to achieve the desired improvement in the property modulated by the formulation component, e.g. a lubricious surface layer on a contact lens comprising a polymer derived from DMA. The specific level in terms of wt % in a composition required as an effective amount will depend upon a variety of factors including the amount and type of monomer, amount and type of initiator, type of contact lens being modified by the disclosed method, and desired level of lubricity.

The term "contacting" as used herein refers to bringing a disclosed monomer and/or initiator in proximity to a contact lens in such a manner that the disclosed monomer and/or initiator can interact chemically and/or physically with the component contacted, e.g., a contact lens surface.

As used herein, the term "attached" can refer to covalent or non-covalent interaction between two or more molecules. Non-covalent interactions can include ionic bonds, electrostatic interactions, van der Walls forces, dipole-dipole interactions, dipole-induced-dipole interactions, London dispersion forces, hydrogen bonding, halogen bonding, electromagnetic interactions, $\pi$-$\pi$ interactions, cation-$\pi$ interactions, anion-$\pi$ interactions, polar $\pi$-interactions, and hydrophobic effects. For example, if a disclosed surface layer is attached to a contact lens surface, it can comprise covalent or non-covalent interactions between the surface layer molecules, e.g., a poly(dimethyl acrylamide) molecule, and one or more molecules that form the contact lens.

As used herein, the term "contact lens" refers to a structure that can be placed on or within a wearer's eye. A contact lens can correct, improve, or alter a users eyesight, but that need not be the case. A contact lens can be of any appropriate material known in the art or later developed, and can be a soft lens, a hard lens, or a hybrid lens. A "hydrogel contact lens" refers to a contact lens comprising a hydrogel material. A "silicone hydrogel contact lens" refers to a contact lens comprising a silicone hydrogel material.

As used herein, the term "surface layer" in reference to a contact lens means a layer of a material which is the outmost layer on the contact lens and includes the surface of the contact lens. The surface layer need not be limited to interaction with the contact lens only at the surface, but can comprise penetration into the lens to a limited degree.

As used herein, the term "hydrogel" or "hydrogel material" refers to a polymeric material which can absorb at least 10 percent by weight of water when it is fully hydrated. A hydrogel comprises a three dimensional network of polymers that are crosslinked to form water-swellable but water-insoluble structures. The term hydrogel is to be applied to polymers in a dry state (xerogel), as well as in a wet state.

As used herein, the term "silicone hydrogel" refers to a silicone-containing hydrogel obtained by copolymerization of a polymerizable composition comprising at least one silicone-containing monomer or at least one silicone-containing macromer or at least one crosslinkable silicone-containing prepolymer which can absorb at least 10 percent by weight of water when it is fully hydrated.

As used herein, the term "hydrophilic" refers a material or portion thereof that will more readily associate with water than with lipids.

As used herein, the term "polymer" means a material formed by polymerizing one or more monomers.

As used herein, the term "polyacrylamide", refers to a polymer comprising residues derived from acrylamide monomers.

As used herein, the term "thermal initiator" refers to a chemical that initiates radical crosslinking/polymerizing reaction in the presence of thermal energy. The thermal energy may be from a heat source or from microwave irradiation. Examples of suitable thermal initiators include, but are not limited to, 2,2'-azobis(2,4-dimethylpentanenitrile), 2,2'-azobis(2-methylpropanenitrile), 2,2'-azobis(2-methylbutanenitrile), peroxides such as benzoyl peroxide, and the like.

As used herein, the terms "DMA," "N,N-dimethylacrylamide," and "dimethylacrylamide" can be used interchangeably and refer to a chemical compound that act as a monomer in a chemical reaction forming a polymer comprising residues derived from DMA monomer units.

As used herein, the terms "poly(DMA)," "poly(DMA)," and "poly(dimethyl acrylamide)" can be used interchangeably and refer to a homopolymer comprising residues derived from DMA.

As used herein, the term "units" can be used to refer to individual monomer units such that, for example, DMA repeat units refers to individual DMA monomer units in a polymer. It is understood that "unit" and "residue derived from a monomer" can be used interchangeably.

As used herein, the term "water contact angle" refers to a water contact angle (measured by the method disclosed herein below), which is obtained by averaging measurements of at least 3 individual contact lenses.

As used herein, the terms "optional" or "optionally" means that the subsequently described event or circumstance can or cannot occur, and that the description includes instances where said event or circumstance occurs and instances where it does not.

Unless otherwise specified, temperatures referred to herein are based on atmospheric pressure (i.e. one atmosphere).

Disclosed are the components to be used to prepare the compositions of the disclosure as well as the compositions themselves to be used within the methods disclosed herein. These and other materials are disclosed herein, and it is understood that when combinations, subsets, interactions, groups, etc. of these materials are disclosed that while specific reference of each various individual and collective combinations and permutation of these compounds cannot be explicitly disclosed, each is specifically contemplated and described herein. For example, if a particular compound is disclosed and discussed and a number of modifications that can be made to a number of molecules including the compounds are discussed, specifically contemplated is each and every combination and permutation of the compound and the modifications that are possible unless specifically indicated to the contrary. Thus, if a class of molecules A, B, and C are disclosed as well as a class of molecules D, E, and F and an example of a combination molecule, A-D is disclosed, then even if each is not individually recited each is individually and collectively contemplated meaning combinations, A-E, A-F, B-D, B-E, B-F, C-D, C-E, and C-F are considered disclosed. Likewise, any subset or combination of these is also disclosed. Thus, for example, the sub-group of A-E, B-F, and C-E would be considered disclosed. This concept applies to all aspects of this application including, but not limited to, steps in methods of making and using the compositions of the disclosure. Thus, if there are a variety of additional steps that can be performed it is understood that each of these additional steps can be performed with any specific aspect or combination of aspects of the methods of the disclosure.

References in the specification and concluding claims to parts by weight of a particular element or component in a composition or article, denotes the weight relationship between the element or component and any other elements or components in the composition or article for which a part by weight is expressed. Thus, in a compound containing 2 parts by weight of component X and 5 parts by weight component Y, X and Y are present at a weight ratio of 2:5, and are present in such ratio regardless of whether additional components are contained in the compound.

As used herein the terms "weight percent," "wt %," and "wt. %," which can be used interchangeably, indicate the percent by weight of a given component based on the total weight of the composition, unless otherwise specified. That is, unless otherwise specified, all wt % values are based on the total weight of the composition. It should be understood that the sum of wt % values for all components in a disclosed composition or formulation are equal to 100.

Before proceeding to the Examples, it is to be understood that this disclosure is not limited to particular aspects described, and as such may, of course, vary. Other systems, methods, features, and advantages of foam compositions and components thereof will be or become apparent to one with skill in the art upon examination of the following drawings and detailed description. It is intended that all such additional systems, methods, features, and advantages be included within this description, be within the scope of the present disclosure, and be protected by the accompanying claims. It is also to be understood that the terminology used herein is for the purpose of describing particular aspects only, and is not intended to be limiting. The skilled artisan will recognize many variants and adaptations of the aspects described herein. These variants and adaptations are intended to be included in the teachings of this disclosure and to be encompassed by the claims herein.

B. CONTACT LENS COMPRISING A LUBRICIOUS SURFACE LAYER

In one aspect, the present disclosure relates to a contact lens comprising a disclosed lubricious surface layer. In a further aspect, the lubricious surface layer comprises a polyacrylamide, e.g., a poly(N,N-dimethylacrylamide. In various aspects, the lubricious surface layer is formed at the surface of a contact lens. In other aspects, the lubricious coatings are formed at the surface and near the surface of a contact lens, but within the edge region of the contact lens. In a further aspect, the contact lens can be a hydrogel lens. In a further aspect, the contact lens can be a silicone hydrogel lens.

In various aspects, the present disclosure is directed to a contact lens comprising a surface layer comprising polyacrylamide, such that the surface layer is attached to a surface of a contact lens. In some aspects, the surface layer is attached via one or more covalent linkages between one or more molecules of the surface layer, e.g., a polyacrylamide, and one or more molecules in the contact lens, e.g., a hydrogel or silicone hydrogel molecule or polymer used to fabricate the contact lens. In further aspects, one or more covalent linkages between one or more molecules of the surface layer, e.g., a polyacrylamide, and one or more molecules in the contact lens and/or non-covalent interactions between one or more molecules of the surface layer, e.g., a polyacrylamide, and one or more molecules in the contact lens. In some aspects, one or more molecules of the surface layer, e.g., a polyacrylamide, are entangled with one another and form a mat, mesh, or other entangled molecular structure, and that the one or more entangled molecules of the surface layer form covalent and/or non-covalent interactions with molecules in the contact lens.

In various aspects, the polyacrylamide is a homopolymer. In a further aspect, the polyacrylamide is formed from monomers such as, but not limited to, substituted or unsubstituted N,N-dimethyl (meth)acrylamide (alternatively referred to as "N,N-dimethylmethylacrylamide"), N,N-dimethylacrylamide (DMA), methacrylamide, N-methylmethacrylamide, N-(2-hydroxyethyl)methacrylamide, 2-acrylamidoglycolic acid, 3-acryloylamino-1-propanol, N-hydroxyethyl acrylamide, N$^4$tris(hydroxymethyl) methyl]-acrylamide.

In a further aspect, the polyacrylamide is formed from monomers such as, but not limited to, acrylamide; methacrylamide; N-alkylacrylamides such as N-ethylacrylamide, N-isopropylacrylamide or N-tert-butylacrylamide; N-alkylmethacrylamides such as N-ethylmethacrylamide or N-isopropylmethacrylamide; N,N-dialkylacrylamides such as N,N-dimethylacrylamide and N,N-diethyl-acrylamide; N-[(dialkylamino)alkyl]acrylamides such as N-[3dimethylamino)propyl]acrylamide or N-[3-(diethylamino)propyl] acrylamide; N-[(dialkylamino)alkyl]methacrylamides such as N-[3-dimethylamino)propyl]methacrylamide or N-[3-(diethylamino)propyl]methacrylamide.

In various aspects, the polyacrylamide is a copolymer of acrylamide formed from at least two different monomers selected from acrylamide; methacrylamide; N-alkylacrylamides such as N-ethylacrylamide, N-isopropylacrylamide or N-tert-butylacrylamide; N-alkylmethacrylamides such as N-ethylmethacrylamide or N-isopropylmethacrylamide; N,N-dialkylacrylamides such as N,N-dimethylacrylamide and N,N-diethyl-acrylamide; N-[(dialkylamino)alkyl]acrylamides such as N-[3dimethylamino)propyl]acrylamide or N-[3-(diethylamino)propyl]acrylamide; N-[(dialkylamino)alkyl]methacrylamides such as N-[3-dimethylamino)propyl] methacrylamide or N-[3-(diethylamino)propyl]methacrylamide.

In some aspects, the polyacrylamide is a homopolymer that is poly(N,N-dimethylacrylamide), i.e., a polymer formed from N,N-dimethylacrylamide monomers.

In various aspects, the polyacrylamide in the surface layer has an average molecular weight of about 1 kDa to about 5,000 kDa; about 10 kDa to about 5,000 kDa; about 100 kDa to about 5,000 kDa; about 1,000 kDa to about 5,000 kDa; about 10 kDa to about 4,000 kDa; about 10 kDa to about 3,000 kDa; about 10 kDa to about 2,000 kDa; about 10 kDa to about 1,000 kDa; about 100 kDa to about 4,000 kDa; about 100 kDa to about 3,000 kDa; about 100 kDa to about 2,000 kDa; about 100 kDa to about 1,000 kDa; a sub-range within any of the foregoing ranges; or a value within any of the foregoing ranges.

In a further aspect, the polyacrylamide in the surface layer has an average molecular weight of about 1 kDa to about 1,000 kDa; 1 kDa to about 100 kDa; 1 kDa to about 10 kDa; a sub-range within any of the foregoing ranges; or a value within any of the foregoing ranges.

In various aspects, the surface layer has a thickness that is from about 0.1 μm to about 5 μm. In a further aspect, the surface layer has a thickness that is from about 1 μm to about 5 μm. In a still further aspect, the surface layer has a thickness that is from about 2 μm to about 5 μm. In a yet further aspect, the surface layer has a thickness that is from about 31 μm to about 5 μm. In an even further aspect, the surface layer has a thickness that is from about 4 μm to about 5 μm. In a further aspect, the surface layer has a thickness that is from about 1 μm to about 4 μm. In a still further aspect, the surface layer has a thickness that is from about 1 μm to about 3 μm. In a yet further aspect, the surface layer has a thickness that is from about 1 μm to about 2 μm. In an even further aspect, the surface layer has a thickness that is from about 0.1 μm to about 2 μm. In a further aspect, the surface layer has a thickness that is from about 0.1 μm to about 1 μm.

In various aspects, the surface layer has a thickness that is about 0.1 μm, about 0.2 μm, about 0.3 μm, about 0.4 μm, about 0.5 μm, about 0.6 μm, about 0.7 μm, about 0.8 μm, about 0.9 μm, about 1.0 μm, about 1.1 μm, about 1.2 μm, about 1.3 μm, about 1.4 μm, about 1.5 μm, about 1.6 μm, about 1.7 μm, about 1.8 μm, about 1.9 μm, about 2.0 μm, about 2.1 μm, about 2.2 μm, about 2.3 μm, about 2.4 μm, about 2.5 μm, about 2.6 μm, about 2.7 μm, about 2.8 μm, about 2.9 μm, about 3.0 μm, about 3.1 μm, about 3.2 μm, about 3.3 μm, about 3.4 μm, about 3.5 μm, about 3.6 μm, about 3.7 μm, about 3.8 μm, about 3.9 μm, about 4.0 μm, about 4.1 μm, about 4.2 μm, about 4.3 μm, about 4.4 μm, about 4.5 μm, about 4.6 μm, about 4.7 μm, about 4.8 μm, about 4.9 μm, about 5.0 μm; any range encompassed by one or more of the foregoing values; or any combination of the foregoing values.

In various aspects, a contact lens comprising a disclosed lubricious surface layer has an increased water content of about 0.5 wt % to about 75 wt % compared to the same contact lens without the disclosed lubricious surface layer. In a further aspect, a contact lens comprising a disclosed lubricious surface layer has an increased water content of compared to the same contact lens without the disclosed lubricious surface layer, and wherein the increase in water content is about 1 wt %, about 2 wt %, about 3 wt %, about 4 wt %, about 5 wt %, about 6 wt %, about 7 wt %, about 8 wt %, about 9 wt %, about 10 wt %, about 11 wt %, about 12 wt %, about 13 wt %, about 14 wt %, about 15 wt %, about 16 wt %, about 17 wt %, about 18 wt %, about 19 wt %, about 20 wt %, about 21 wt %, about 22 wt %, about 23 wt %, about 24 wt %, about 25 wt %, about 26 wt %, about 27 wt %, about 28 wt %, about 29 wt %, about 30 wt %, about 31 wt %, about 32 wt %, about 33 wt %, about 34 wt %, about 35 wt %, about 36 wt %, about 37 wt %, about 38 wt %, about 39 wt %, about 40 wt %, about 41 wt %, about 42 wt %, about 43 wt %, about 44 wt %, about 45 wt %, about 46 wt %, about 47 wt %, about 48 wt %, about 49 wt %, about 50 wt %, about 51 wt %, about 52 wt %, about 53 wt %, about 54 wt %, about 55 wt %, about 56 wt %, about 57 wt %, about 58 wt %, about 59 wt %, about 60 wt %, about 61 wt %, about 62 wt %, about 63 wt %, about 64 wt %, about 65 wt %, about 66 wt %, about 67 wt %, about 68 wt %, about 69 wt %, about 70 wt %, about 71 wt %, about 72 wt %, about 73 wt %, about 74 wt %, about 75 wt %; any range encompassed by one or more of the foregoing values; or any combination of the foregoing values.

In various aspects, a disclosed lubricious surface layer has a water content of about 100 wt % to about 500 wt %; 200 wt % to about 500 wt %; 300 wt % to about 500 wt %; 400 wt % to about 500 wt %; about 100 wt % to about 400 wt %; about 100 wt % to about 300 wt %; about 100 wt % to about 200 wt %; a sub-range within any of the foregoing ranges; or a value or combination of values within any of the foregoing ranges.

In various aspects, a contact lens comprising a disclosed lubricious surface layer can have a water contact angle of from about 15 degrees to about 60 degrees; about 20 degrees to about 60 degrees; about 25 degrees to about 60 degrees; about 30 degrees to about 60 degrees; about 35 degrees to about 60 degrees; about 40 degrees to about 60 degrees; about 45 degrees to about 60 degrees; a sub-range within any of the foregoing ranges; or a value or combination of values within any of the foregoing ranges.

In a further aspect, a contact lens comprising a disclosed lubricious surface layer can have a water contact angle of from about 15 degrees to about 50 degrees; about 15 degrees to about 45 degrees; about 15 degrees to about 40 degrees; about 15 degrees to about 35 degrees; about 15 degrees to about 30 degrees; about 20 degrees to about 60 degrees; about 20 degrees to about 50 degrees; about 20 degrees to about 45 degrees; about 20 degrees to about 40 degrees; about 20 degrees to about 35 degrees; about 20 degrees to about 30 degrees; about 25 degrees to about 60 degrees; about 25 degrees to about 50 degrees; about 25 degrees to about 45 degrees; about 25 degrees to about 40 degrees; about 25 degrees to about 35 degrees; about 25 degrees to about 30 degrees; about 30 degrees to about 60 degrees; about 30 degrees to about 50 degrees; about 30 degrees to about 45 degrees; about 30 degrees to about 40 degrees; about 30 degrees to about 35 degrees; a sub-range within any of the foregoing ranges; or a value or combination of values within any of the foregoing ranges.

As stated herein above, the contact lens comprising a disclosed lubricious surface layer can be a hydrogel lens. In other further aspects, the contact lens can be a silicone hydrogel lens. A hydrogel or a silicone hydrogel is a hydrated crosslinked polymeric system that contains water in an equilibrium state. The physical properties of hydrogels can vary widely and are mostly determined by their water content. Hydrogels can contain 10% to 90% water by weight and exhibit excellent biocompatibility and as such are used for soft biomedical applications. In further aspects, hydrogels Hydrogels can contain 10% to 90% water by weight Accordingly, hydrogels are copolymers prepared from hydrophilic monomers. In the case of silicone hydrogels, the hydrogel copolymers are generally prepared by polymerizing a mixture containing at least one device-forming silicone-containing monomer and at least one device-forming hydrophilic monomer. Either the silicone-containing monomer or the hydrophilic monomer may function as a crosslinking agent (a crosslinking agent being defined as a monomer having multiple polymerizable functionalities), or alternately, a separate crosslinking agent may be employed in the initial monomer mixture from which the hydrogel copolymer is formed. (As used herein, the term "monomer" or "monomeric" and like terms denote relatively low molecular weight compounds that are polymerizable by free radical polymerization, as well as higher molecular weight compounds also referred to as "prepolymers", "macromonomers", and related terms.) Silicone hydrogels typically have a water content between about 10 to about 80 weight percent.

Examples of useful lens-forming hydrophilic monomers include: amides such as N,N-dimethylacrylamide and N,N-dimethylmethacrylamide; cyclic lactams such as N-vinyl-2-pyrrolidone; (meth)acrylated alcohols, such as 2-hydroxyethyl methacrylate and 2-hydroxyethylacrylate; and (meth)acrylated poly(ethyleneglycol)s; and azlactone-containing monomers, such as 2-isopropenyl-4,4-dimethyl-2-oxazolin-5-one and 2-vinyl-4,4-dimethyl-2-oxazolin-5-one. (As used herein, the term "(meth)" denotes an optional methyl substituent. Thus, terms such as "(meth)acrylate" denotes either methacrylate or acrylate, and "(meth)acrylic acid" denotes either methacrylic acid or acrylic acid.) Still further examples are the hydrophilic vinyl carbonate or vinyl carbamate monomers disclosed in U.S. Pat. No. 5,070,215, and the hydrophilic oxazolone monomers disclosed in U.S. Pat. No. 4,910,277, the disclosures of which are incorporated herein by reference. Other suitable hydrophilic monomers will be apparent to one skilled in the art.

As mentioned, one class hydrogel contact lens materials is silicone hydrogels. In this case, the initial lens-forming monomer mixture further comprises a silicone-containing monomer. Applicable silicone-containing monomeric materials for use in the formation of silicone hydrogels are well known in the art and numerous examples are provided in U.S. Pat. Nos. 4,136,250; 4,153,641; 4,740,533; 5,034,461; 5,070,215; 5,260,000; 5,310,779; and 5,358,995.

In some aspects, a useful silicone hydrogel material, used to prepare contact lenses that can be used with the disclosed lubricious surface layers, comprises (based on the initial monomer mixture that is copolymerized to form the hydrogel copolymeric material) 5 to 50 percent, preferably 10 to 25, by weight of one or more silicone macromonomers, 5 to 75 percent, preferably 30 to 60 percent, by weight of one or more polysiloxanylalkyl (meth)acrylic monomers, and 10 to 50 percent, preferably 20 to 40 percent, by weight of a hydrophilic monomer. In general, the silicone macromonomer is a poly(organosiloxane) capped with an unsaturated group at two or more ends of the molecule. In addition to the end groups in the above structural formulas, U.S. Pat. No. 4,153,641 to Deichert et al. discloses additional unsaturated groups, including acryloxy or methacryloxy. Fumarate-containing materials such as those taught in U.S. Pat. Nos. 5,512,205; 5,449,729; and 5,310,779 to Lai are also useful substrates in accordance with the disclosure. Preferably, the silane macromonomer is a silicon-containing vinyl carbonate or vinyl carbamate or a polyurethane-polysiloxane having one or more hard-soft-hard blocks and end-capped with a hydrophilic monomer.

The hydrogel can be, but is not limited to, the contact lens material classified as Group I by U.S. FDA, i.e., nonionic polymers having a low water content (less than 50 wt %), such as Helfilcon A&B, Hioxifilcon B, Mafilcon, Polymacon, Tefilcon and Tetrafilcon A. Alternatively, the hydrogel can be, but is not limited, to the contact lens material classified as Group II by U.S. FDA, i.e., nonionic polymers having a high water content (greater than 50 wt %), such as Acofilcon A, Alfafilcon A, Hilafilcon B, Hioxifilcon A, Hioxifilcon B, Hioxifilcon D, Nelfilcon A, Nesofilcon A, Omafilcon A and Samfilcon A. Alternatively, the hydrogel can be but is not limited to the contact lens material classified as Group III by U.S. FDA, i.e., ionic polymers having a low water content (less than 50 wt %), such as Deltafilcon A. Alternatively, the hydrogel can be, but is not limited, to the contact lens material classified as Group IV by U.S. FDA, i.e., ionic polymers having a high water content (greater than 50 wt %), such as Etafilcon A, Focofilcon A, Methafilcon A, Methafilcon B, Ocufilcon A, Ocufilcon B, Ocufilcon C, Ocufilcon D, Ocufilcon E, Phemfilcon A and Vifilcon A.

In further aspects, conventional hydrogel contact lenses, useful with the disclosed lubricious surface layers, can be prepared by polymerizing a monomer mixture containing at least one hydrophilic monomer. The term "hydrophilic monomer" as used here denotes a monomer whose homopolymers have the ability to absorb water. The term is not intended to include monomers merely because they have a hydrophilic group. A monomer is "hydrophilic" only if its homopolymer absorbs water. Specific examples of hydrophilic monomers include methacrylamide, N-methylmethacrylamide, N,N-dimethylacrylamide, N,N-dimethylmethylacrylamide, glyceryl methacrylate, N-(2-hydroxyethyl) methacrylamide, N-methacryloyl glycine; (2-hydroxy-3-methacryloylpropyl)-4-methoxy phenylether; hydroxyethyl methacrylate, hydroxyethyl acrylate, acrylamide, methacrylamide, N,N-dimethylacrylamide, allyl alcohol, vinyl pyridine, vinyl pyrrolidone, glycerol methacrylate, N-(1,1-dimethyl-3-oxobutyl) acrylamide, (meth)acrylic acid, hydroxy (C1-C6)alkylacrylates (such as hydroxethyl acrylate), hydroxy(C1-C6)alkylmethacrylates (such as hydroxyethyl methacrylate), and the like. In a further aspect, the contact lens can comprise a hydrogel derived from common hydrogel monomers such as, but not limited to, the following: lactic acid, glycolic acid, acrylic acid, 1-hydroxyethyl methacrylate, ethyl methacrylate, propylene glycol methacrylate, acrylamide, N-vinylpyrrolidone, methyl methacrylate, glycidyl methacrylate, glycol methacrylate, ethylene glycol, fumaric acid, and the like. Common cross linking agents include tetraethylene glycol dimethacrylate and N,N'-methylenebisacrylamide.

In various aspects, a contact lens comprising a disclosed lubricious surface layer can be a preformed contact lenses. Preformed contact lenses suitable for modification to comprise a disclosed lubricious surface layer can be produced in a conventional "spin-casting mold," as described in U.S. Pat. No. 3,408,429, or by the full cast-molding process in a static form, as described in U.S. Pat. Nos. 4,347,198; 5,508,317; 5,583,463; 5,789,464; and 5,849,810, or by lathe cutting of buttons as used in making customized contact lenses. In cast-molding, a lens formulation typically is dispensed into molds and cured (i.e., polymerized and/or crosslinked) in molds for making contact lenses.

For production of preformed hydrogel contact lenses, a hydrogel lens formulation typically is: either (1) a monomer mixture comprising (a) at least one hydrophilic vinylic monomer and (b) at least one component selected from the group consisting of a vinylic crosslinking agent, a hydrophobic vinylic monomer, an internal wetting agent, a free-radical initiator (photoinitiator or thermal initiator), a UV-absorbing agent, a visibility tinting agent (e.g., dyes, pigments, or mixtures thereof), antimicrobial agents (e.g., preferably silver nanoparticles), a bioactive agent, and combinations thereof; or (2) an aqueous solution comprising one or more water-soluble prepolymers and at least one component selected from the group consisting of hydrophilic vinylic monomer, a vinylic crosslinking agent, a hydrophobic vinylic monomer, an internal wetting agent, a free-radical initiator (photoinitiator or thermal initiator), a UV-absorbing agent, a visibility tinting agent (e.g., dyes, pigments, or mixtures thereof), antimicrobial agents (e.g., preferably silver nanoparticles), a bioactive agent, and combinations thereof. Resultant preformed hydrogel contact lenses then can be subjected to extraction with an extraction solvent to remove unpolymerized components from the resultant lenses and to hydration process, as known by a person skilled in the art. It is understood that an internal wetting agent present in a hydrogel lens formulation can improve the hydrophilicity (as measured by water-break-up-time, WBUT) and/or wettability (as measured by water contact angle, WCA) of preformed hydrogel contact lenses compared to those of control preformed hydrogel contact lenses obtained from a control hydrogel lens formulation without the internal wetting agent.

For production of preformed silicone hydrogel (SiHy) contact lenses, a SiHy lens formulation for cast-molding or spin-cast molding or for making SiHy rods used in lathe-cutting of contact lenses generally comprises at least one components selected from the group consisting of a silicone-containing vinylic monomer, a silicone-containing vinylic macromer, a silicone-containing prepolymer, a hydrophilic vinylic monomer, a hydrophobic vinylic monomer, a vinylic crosslinking agent, a free-radical initiator (photoinitiator or thermal initiator), a hydrophilic vinylic macromer/prepolymer, and combination thereof, as well known to a person skilled in the art. A SiHy contact lens formulation can also comprise other necessary components known to a person skilled in the art, such as, for example, a UV-absorbing agent, a visibility tinting agent (e.g., dyes, pigments, or mixtures thereof), antimicrobial agents (e.g., preferably silver nanoparticles), a bioactive agent, internal wetting agents, leachable tear-stabilizing agents, and mixtures thereof, as known to a person skilled in the art. Resultant preformed SiHy contact lenses then can be subjected to extraction with an extraction solvent to remove unpolymerized components from the resultant lenses and to hydration process, as known by a person skilled in the art. It is understood that an internal wetting agent present in a SiHy lens formulation can improve the hydrophilicity and/or wettability of preformed SiHy contact lenses compared to those of control preformed SiHy contact lenses obtained from a control SiHy lens formulation without the internal wetting agent.

Numerous SiHy lens formulations have been described in numerous patents and patent applications published by the filing date of this application. All of them can be used in obtaining a preformed SiHy lens which in turn becomes the inner layer of a SiHy contact lens of the disclosure, so long as they will yield a SiHy material free of carboxyl group(s). A Silly lens formulation for making commercial SiHy lenses, such as, lotrafilcon A, lotrafilcon B, balafilcon A, galyfilcon A, senofilcon A, narafilcon A, narafilcon B, comfilcon A, enfilcon A, asmofilcon A, somofilcon A, stenfilcon A, smafilcon A, smafilcon B, smafilcon C, enfilcon A, and efrofilcon A can also be used in making preformed SiHy contact lenses.

Any suitable hydrophilic vinylic monomers can be used in the disclosure. Examples of preferred hydrophilic vinylic monomers include without limitation (meth)acrylamide, N,N-dimethyl (meth)acrylamide, 2-acrylamidoglycolic acid, N-hydroxypropylacrylamide, N-hydroxyethyl acrylamide, N-[tris(hydroxymethyl)methyl]-acrylamide, N-vinylpyrrolidone, N-vinyl formamide, N-vinyl acetamide, N-vinyl isopropylamide, N-vinyl-N-methyl acetamide, N-methyl-3-methylene-2-pyrrolidone, 1-methyl-5-methylene-2-pyrrolidone, 5-methyl-3-methylene-2-pyrrolidone, 2-hydroxyethylmethacrylate (HEMA), 2-hydroxyethyl acrylate (HEA), hydroxypropyl acrylate, hydroxypropyl methacrylate (HPMA), trimethylammonium 2-hydroxy propylmethacrylate, N-2-aminoethyl (meth)acrylamide hydrochloride, N-3-aminopropyl (meth)acrylamide hydrochloride, aminoethyl methacrylate hydrochloride, aminopropyl methacrylate hydrochloride, dimethylaminoethyl methacrylate (DMAEMA), glycerol methacrylate (GMA), a C1-C4-alkoxy polyethylene glycol (meth)acrylate having a weight average molecular weight of up to 1500, (meth)acrylic acid, and mixtures thereof. Preferably, a polymerizable composition comprises at least about 25% by weight of one or more hydrophilic vinylic monomers listed above.

Examples of water-soluble prepolymers include without limitation: a water-soluble crosslinkable poly(vinyl alcohol) prepolymer described in U.S. Pat. Nos. 5,583,163 and 6,303,687; a water-soluble vinyl group-terminated polyurethane prepolymer described in U.S. Pat. No. 6,995,192; derivatives of a polyvinyl alcohol, polyethyleneimine or polyvinylamine, which are disclosed in U.S. Pat. No. 5,849,841; a water-soluble crosslinkable polyurea prepolymer described in U.S. Pat. Nos. 6,479,587 and 7,977,430; crosslinkable polyacrylamide; crosslinkable statistical copolymers of vinyl lactam, MMA and a comonomer, which are disclosed in U.S. Pat. No. 5,712,356; crosslinkable copolymers of vinyl lactam, vinyl acetate and vinyl alcohol, which are disclosed in U.S. Pat. No. 5,665,840; polyether-polyester copolymers with crosslinkable side chains which are disclosed in U.S. Pat. No. 6,492,478; branched polyalkylene glycol-urethane prepolymers disclosed in U.S. Pat. No. 6,165,408; polyalkylene glycol-tetra(meth)acrylate prepolymers disclosed in U.S. Pat. No. 6,221,303; crosslinkable polyallylamine gluconolactone prepolymers disclosed in U.S. Pat. No. 6,472,489.

Examples of preferred vinylic crosslinking agents include without limitation di-(meth)acrylate-terminated polyethylene glycol, di-(meth)acrylate-terminated polyoxyethylene-polyoxypropylene block copolymer, tetraethyleneglycol diacrylate, triethyleneglycol diacrylate, diethyleneglycol diacrylate, ethyleneglycol diacrylate, tetraethyleneglycol dimethacrylate, triethyleneglycol dimethacrylate, diethyleneglycol dimethacrylate, ethyleneglycol dimethacrylate, tetraethyleneglycol divinyl ether, triethyleneglycol divinyl ether, diethyleneglycol divinyl ether, ethyleneglycol divinyl ether, trimethylopropane trimethacrylate, pentaerythritol tetramethacrylate, bisphenol A dimethacrylate, vinyl methacrylate, ethylenediamine dimethyacrylamide, ethylenediamine diacrylamide, glycerol dimethacrylate, triallyl isocyanurate, triallyl cyanurate, allylmethacrylate, allylacrylate, N-allyl-methacrylamide, N-allyl-acrylamide, 1,3-bis(methacrylamidopropyl)-1,1,3,3-tetrakis(trimethyl-siloxy)disiloxane, N,N'-methylenebisacrylamide, N,N'-methylenebismethacrylamide, N,N'-ethylenebisacrylamide, N,N'-ethylenebismethacrylamide, 1,3-bis(N-methacrylamidopropyl)-1,1,3,3-tetrakis-(trimethylsiloxy) disiloxane, 1,3-bis(methacrylamidobutyl)-1,1,3,3-tetrakis (trimethylsiloxy)-disiloxane, 1,3-bis(acrylamidopropyl)-1, 1,3,3-tetrakis(trimethylsiloxy)-disiloxane, 1,3-bis (methacryloxyethylureidopropyl)-1,1,3,3-tetrakis (trimethylsiloxy)disiloxane, and combinations thereof. A preferred cross-linking agent is di-(meth)acrylate-terminated polyethylene glycol, di-(meth)acrylate-terminated polyoxyethylene-polyoxypropylene block copolymer, tetra (ethyleneglycol) diacrylate, tri(ethyleneglycol) diacrylate, ethyleneglycol diacrylate, di(ethyleneglycol) diacrylate, methylenebisacrylamide, triallyl isocyanurate, allyl (meth) acrylate, or triallyl cyanurate. The amount of a cross-linking agent used is expressed in the weight content with respect to the total polymer and is preferably in the range from about 0.05% to about 3% (more preferably from about 0.1% to about 2%).

Examples of preferred hydrophobic vinylic monomers include methylacrylate, ethyl-acrylate, propylacrylate, isopropylacrylate, cyclohexylacrylate, 2-ethylhexylacrylate, methylmethacrylate, ethylmethacrylate, propylmethacrylate, vinyl acetate, vinyl propionate, vinyl butyrate, vinyl valerate, styrene, chloroprene, vinyl chloride, vinylidene chloride, acrylonitrile, 1-butene, butadiene, methacrylonitrile, vinyl toluene, vinyl ethyl ether, perfluorohexylethylthio-carbonyl-aminoethyl-methacrylate, isobornyl methacrylate, trifluoroethyl methacrylate, hexafluoro-isopropyl methacrylate, hexafluorobutyl methacrylate.

C. METHODS OF PREPARING THE DISCLOSED LUBRICIOUS SURFACE LAYERS

In various aspects, the present disclosure pertains to methods of preparing a disclosed lubricious surface layer that is attached to a contact lens. In some aspects, the contact lens is preformed, and the disclosed lubricious surface layer is synthesized and attached to the contact lens after fabrication of the contact lens itself.

In various aspects, the method of preparing the surface layer to assure a crosslinking at the surface of the lens includes: controlling the concentrations of acrylamide monomers, e.g., DMA, and a water soluble radical initiating oxidizing agent for reaction with a tertiary amine, for example, but not limited to, ammonium persulfate (APS), to form a radical in an aqueous phase at the surface of the contact lens; loading the lens with a desired amount of a tertiary amine, for example, but not limited to, N,N,N',N'-Tetramethylethane-1,2-diamine (TEMED) from an aqueous solution; and polymerizing acrylamide monomoers, e.g. DMA, for a desired period of time to achieve a desired film thickness. In this manner the initiation occurs at the surface of the lens where the TEMED and the APS interact. In this manner a thin film of polyacrylamide, e.g., poly(DMA), is formed at the surface of the contact where the initiator forms and polymerization results in a thin film at the lens surface. Operating parameters are optimized to assure that DMA polymerization occurs at the lens surface without acrylamide monomer, e.g., DMA infusion, and polymerization within the lens such that changes in lens shape and physical properties are avoided.

In a further aspect the solution comprising the acrylamide monomer and the radical initiating oxidizing, e.g., APS, can be purged of oxygen as known to the skilled artisan, e.g., by in vacuo treatment of the solution or bubbling nitrogen into the solution. Similarly, in some aspects, the loading solution comprising the tertiary amine can be purged of oxygen by similar methods.

In a further aspect, the tertiary amine can be any water-soluble tertiary amine. Preferably, the tertiary amine is N,N,N',N'tetramethylethylenediamine or 3-dimethylamino) propionitrile. In a still further aspect, the tertiary amine is N,N,N',N'tetramethylethylenediamine (TEMED).

In various aspects, for the foregoing method, it may be more effective for ACUVUE® TruEye® contact lens. For O2 Optix™ and other lenses that do not display slow diffusion of APS, DMA can be pre-polymerizde to higher molecular weight to reduce DMA uptake into the lens. Alternatively, more poorly diffusing initiator systems can be used.

In other aspects, the method of preparing the surface layer to assure a crosslinking at the surface of the lens includes: loading a contact lens with a solution comprising a hydrophobic thermal initiator, thereby providing a hydrophobic thermal initiator loaded contact lens; optionally rinsing the contact lens following equilibration; contacting the hydrophobic thermal initiator loaded contact lens with an aqueous solution comprising at least one acrylamide monomer; and heating the hydrophobic thermal initiator loaded contact lens and the aqueous solution comprising at least one acrylamide monomer. The heating can be thermal (e.g., heating the solution by heat transfer from a heat source such as an oven, heating plate and the like), UV irradiation, or a combination thereof, thereby polymerizing acrylamide monomers for a desired period of time to achieve a desired film thickness. Similarly, as described immediately above, in this manner the initiation occurs at the surface of the lens where hydrophobic thermal initiators and the acrylamide monomers interact. Accordingly, a thin film of polyacrylamide, e.g., poly(DMA), is formed at the surface of the contact where the polymerization results in a thin film at the lens surface.

In a further aspect, the hydrophobic thermal initiator, includes, but not limited to, but are not limited to, 2,2'-azobis(2,4-dimethylpentanenitrile), 2,2'-azobis(2-methylpropanenitrile), 2,2'-azobis(2-methylbutyronitrile), 2,2'-azobis(2,4-dimethylvaleronitrile), 1,1'-azobis(cyclohexanecarbonitrile), peroxides such as benzoyl peroxide, and the like, and combinations of the foregoing. In a still further aspect, the hydrophobic thermal initiator is azobisisobutyronitrile (AIBN).

In various aspects, the hydrophobic thermal initiator can be loaded into a lens from a non-aqueous solution, for example, a C1-C6 alcohol including, but not limited to, an ethanol or methanol solution. In some aspects, it is desirable that the alcohol used as a solvent for the non-aqueous solution can be extracted into water. In an alternate aspect, a hydrophobic UV initiator can be loaded into the lens and the irradiation of the lens initiates the polymerization to form the surface film.

In some aspects, the initiators employed in the present disclosure can be a commercially available free-radical initiator. The initiators are preferably water-soluble initiators and/or monomer-soluble initiators, but can also include non-aqueous solvent-soluble initiators. More specifically, suitable free radical initiators include any thermal, redox or photo initiators, including, for example, alkyl peroxides, substituted alkyl peroxides, aryl peroxides, substituted aryl peroxides, acyl peroxides, alkyl hydroperoxides, substituted alkyl hydroperoxides, aryl hydroperoxides, substituted aryl hydroperoxides, heteroalkyl peroxides, substituted heteroalkyl peroxides, heteroalkyl hydroperoxides, substituted heteroalkyl hydroperoxides, heteroaryl peroxides, substituted heteroaryl peroxides, heteroaryl hydroperoxides, substituted heteroaryl hydroperoxides, alkyl peresters, substituted alkyl peresters, aryl peresters, substituted aryl peresters, azo compounds and halide compounds. Specific initiators include cumene hydroperoxide (CHP), t-butyl hydroperoxide (TBHP), t-butyl perbenzoate (TBPB), sodium carbonateperoxide, benzoyl peroxide (BPO), lauroyl peroxide (LPO), methylethylketone peroxide 45%, potassium persulfate, ammonium persulfate, 2,2-azobis(2,4-dimethyl-valeronitrile) (VAZO®-65), 1,1-azobis(cyclo-hexanecarbonitrile) (VAZO®-40), 2,2-azobis(N,N'-dimethyleneisobutyramidine) dihydrochloride (VAZO®-044), 2,2-azobis(2-amidinopropane) dihydrochloride (VAZO®-50) and 2,2-azobis(2-amido-propane) dihydrochloride. Redox pairs such as persulfate/sulfite and Fe(2+)/peroxide are also useful. As noted above, and as used herein, the initiator may be added to the polymerization mixture independently or may be incorporated into another molecule, such as a monomer (discussed below for hyper branching) or a polymer or polymer fragment (for grafting, etc.). Initiation may also be by heat or UV light, as is known in the art, depending on the embodiment being practiced. Those of skill in the art can select a proper initiator within the scope of this disclosure, but the most preferred initiator for the separation copolymers is a redox pair comprising ammonium persulfate and N,N,N'N'-tetramethylethylenediamine (TEMED).

In a further aspect, the free-radical initiators suitable for use in the disclosed methods include azo and diazo compounds as discussed herein above, such as azo-bis-isobutyronitrile ("AIBN"), organic peroxides, hydroperoxides, persulfates and hydropersulfates, such as benzoyl peroxide, inorganic peroxides and persulfates, such as the peroxide-redox systems, carbon-carbon initiators, such as hexasubstituted ethanes, and photoinitiators; numerous examples are known in the art. See Sanchez et al., "Initiators (Free-Radical)" in Kirk-Othmer Encyc. of Chem. Technol., 4th Ed., John Wiley & Sons, New York, 1995, Vol. 14, pp. 431-460.

Control of the polymerization reaction for preparing the polyacrylamides in the disclosed lubricious surface layer can be provided by controlling various combinations of the following: selection of initiator; the ratio of monomer to initiator; and polymerization reaction conditions. These ratios can vary depending upon the desired molecular weight, initiator efficiency and conversion.

While specific elements and steps are discussed in connection to one another, it is understood that any element and/or steps provided herein is contemplated as being combinable with any other elements and/or steps regardless of explicit provision of the same while still being within the scope provided herein.

It will be understood that certain features and subcombinations are of utility and may be employed without reference to other features and subcombinations. This is contemplated by and is within the scope of the claims.

Since many possible aspects may be made without departing from the scope thereof, it is to be understood that all matter herein set forth or shown in the accompanying drawings and detailed description is to be interpreted as illustrative and not in a limiting sense.

It is also to be understood that the terminology used herein is for the purpose of describing particular aspects only, and is not intended to be limiting. The skilled artisan will recognize many variants and adaptations of the aspects described herein. These variants and adaptations are intended to be included in the teachings of this disclosure and to be encompassed by the claims herein.

Now having described the aspects of the present disclosure, in general, the following Examples describe some additional aspects of the present disclosure. While aspects of the present disclosure are described in connection with the following examples and the corresponding text and figures, there is no intent to limit aspects of the present disclosure to this description. On the contrary, the intent is to cover all alternatives, modifications, and equivalents included within the spirit and scope of the present disclosure.

D. EXAMPLES

The following examples are put forth so as to provide those of ordinary skill in the art with a complete disclosure and description of how the compounds, compositions, articles, devices and/or methods claimed herein are made and evaluated, and are intended to be purely exemplary of the present disclosure and are not intended to limit the scope of what the inventors regard as their disclosure. Efforts have been made to ensure accuracy with respect to numbers (e.g., amounts, temperature, etc.), but some errors and deviations should be accounted for. Unless indicated otherwise, parts are parts by weight, temperature is in ° C. or is at ambient temperature, and pressure is at or near atmospheric.

Example 1: Representative Lubricious Coating Prepared Using DMA, TEMED and APS General Materials and Methods.

A 30 wt % TEMED solution was prepared by pipetting 4.2 mL of deionized water (DI water) and 1.8 mL of N, N, N', N'-tetramethylethane-1,2-diamine ("TEMED"; Sigma-Aldrich Corporation, St. Louis, Mo.; Cat. No. T22500) into glass vial. A 40 wt % DMA solution was prepared by pipetting 3.6 mL of DI water and 2.4 mL of N, N-dimethylacrylamide ("DMA"; Sigma-Aldrich; Cat. No. 274135) into another glass vial. A 1-Day Acuvue® TruEye® (narafilcon A; Vistakon Division of Johnson & Johnson Vision Care, Inc.) contact lens was removed from a blister pack and placed in a vial of DI water. The lens was washed using DI water several times and soaked into the 30 wt % TEMED solution for 30 minutes. Without wishing to be bound by a particular theory, it is believed that the soaking of the lens in TEMED for 30 minutes was in excess of the time required to reach equilibrium. It is believed that under these conditions equilibration of a lens with the TEMED solution is about 15 minutes. In various aspects, it is believed that sufficient partial equilibration can be achieved in about 5 minutes if TEMED is only needed near the surface of the lens.

The DMA solution was degassed using compressed nitrogen for 30 minutes. After degassing the DMA solution, 3 wt % of ammonium persulfate (APS; Fisher Scientific International, Inc., Hampton, N. H.; Cat. No. BP179) was added to the DMA solution. The blister pack was filled with 1 mL of the foregoing DMA solution. The lens which had been soaking in the TEMED solution was transferred to the blister pack having the DMA solution as described, and polymerization allowed to proceed for 15 seconds. After 15 seconds, the lens was removed and immediately dropped into a beaker of 400 mL DI water to quench the reaction. In an alternative approach, the reaction termination was achieved by submerging the lens in a blister pack containing 10 mL of DI water that was previously sparged with $O_2$. Without wishing to be bound by a particular theory, it is believed that a high concentration of oxygen, a free radical inhibitor, terminates the reaction rapidly. Following reaction termination, the modified lens was washed by DI water several times. The modified lubricious lens was placed into a vial with 5 mL phosphate buffered saline ("PBS") 1× without calcium and magnesium (Mediatech Inc., Manassas, Va.; Cat. No. 21-040-CN).

Reaction Parameters.

The foregoing method has at least the following four parameters that can be modulated: concentrations of DMA and APS in the external phase, concentration of TEMED in the loading solution and the reaction time. In some aspects, the disclosed methods are optimized to provide a thin film near the surface of a contact lens. In the foregoing described method, the concentration of the initiator is high near the surface of a contact lens, and accordingly, without wishing to be bound by a particular theory, it is believed that polymerization occurs only in a thin film at and/or near the surface of the contact lens. Moreover, it is believed that it is important to ensure that DMA penetration and the resulting reaction inside the lens is minimized to prevent changes in lens shape and physical properties. Thus, measurement of diffusion coefficients of all the components in the lens was determined be an important variable in choosing the best operating parameters. Herein below measurements of transport of these components in lenses of interest are provided. Also, herein below, the surface layer is characterized for a range of operating parameters and conclude by determining parameters for a specific commercially available lens, ACUVUE® TruEye® (Vistakon Division of Johnson & Johnson Vision Care, Inc.). Although aspects of the disclosure are described herein using a commercially available ACUVUE® TruEye® lenses, it can be appreciated that the disclosed methods and compositions can be carried out with other hydrogel contact lens, silicon hydrogel lens, and/or other devices that requires the lubricity imparted by the disclosed compositions and methods.

Diffusion Coefficients and Diffusivity.

Diffusion coefficients of all the components in the lens were determined to establish desired operating parameters for formation of the poly(DMA) surface layer on the lens, according to an aspect of the disclosure. The surface layer on the lens, according to an aspect of the disclosure, was characterized for poly(DMA) layers formed over a range of operating parameters. Diffusion and partition coefficients of TEMED, DMA, and APS were determined for unmodified ACUVUE® TruEye® and 02 Optix™. Each component was loaded individually into a lens by soaking the lens in a PBS-solution containing the component for 24 hours. Subsequently, the lenses were removed from the solution and placed in fresh component free PBS-solution. The PBS solution was analyzed by UV-vis spectrophotometry to determine the dynamic concentration of the component released from the component infused lens into the PBS. The spectral results were fitted using a perfect-sink solution to Fick's $2^{nd}$ Law of Diffusion, Eq. 2, to determine a diffusion coefficient, D for that component. The partition coefficient, K, is calculated by using the volume ratio of lens and release medium, $V_{lens}$ and $V_{release}$, the concentration of the loading solution and of the final measurement of the release medium, $C_{loading}$ and $C_{release,final}$ as seen in Eq. 1. The resulting D and K values are tabulated in Table 1, below.

$$K = \frac{V_{release} C_{release,final}}{V_{lens} C_{loading}} \quad (1)$$

$$C_w = \sum_{n=0}^{\infty} \frac{16 A_s h C_i}{V_w (2n+1)^2 \pi^2} e^{-\frac{(2n+1)^2 \pi^2}{4h^2} Dt} \quad (2)$$

TABLE 1

Diffusive properties of components for lubricious layer.

| Lens | Component | Partition Coefficient, K | Diffusion Coefficient, D (mm$^2$/hr) |
|---|---|---|---|
| TruEye | TEMED | 0.776 | 0.0071 |
| | DMA | 0.982 | 0.0118 |
| | APS | 0.690 | 0.0006 |
| O2 Optix | TEMED | 0.386 | 0.0285 |
| | DMA | 0.561 | 0.0466 |
| | APS | 0.442 | 0.0722 |

Figure 1B:
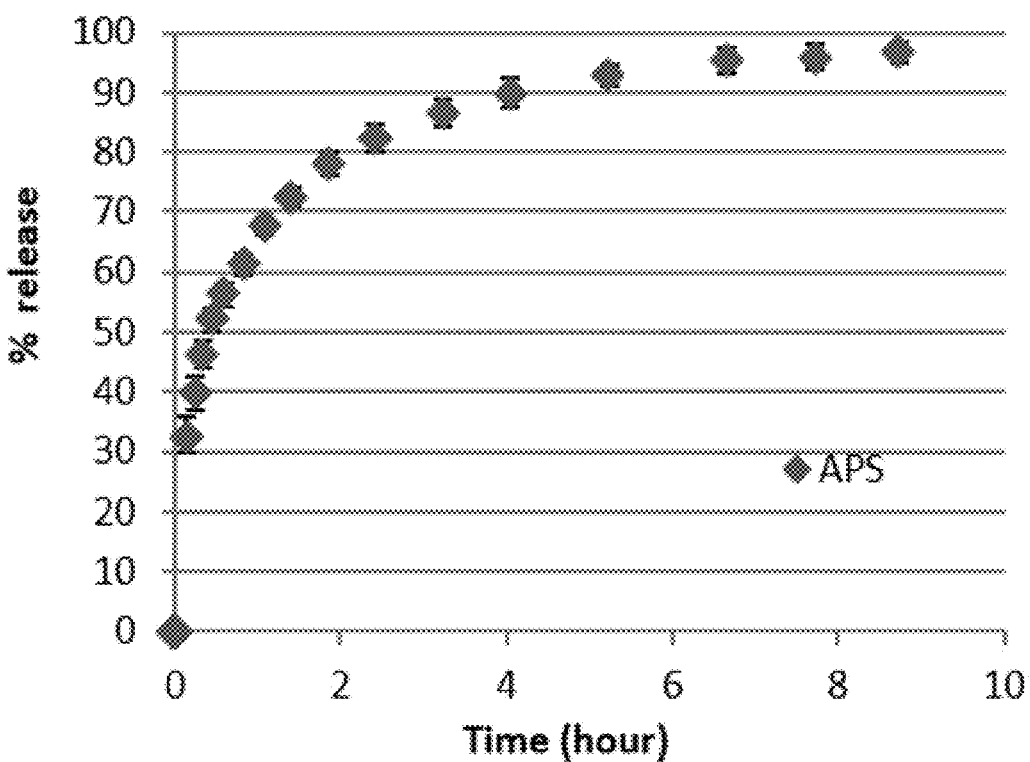
Figure 2:
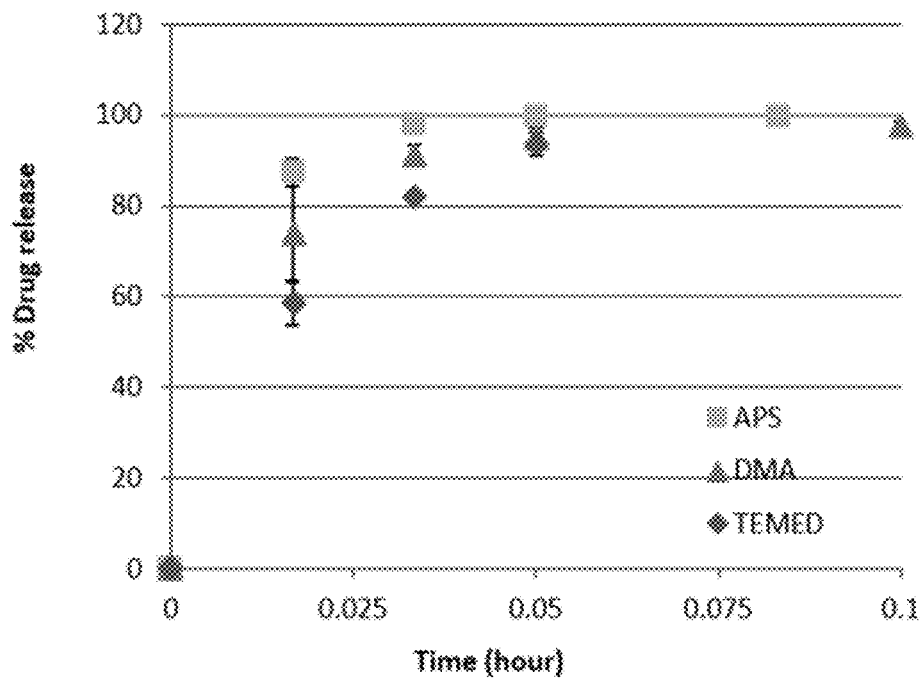
FIG. 2 shows representative data for release of APS, DMA and TEMED versus time from O2 Optix™ lens infused with the component measured (i.e., test lens was infused with APS, DMA, or TEMED to measure the respective release of each).

As shown in FIG. 1A and FIG. 1B, DMA and TEMED were found to have rapid releases of around 15 minutes from ACUVUE® TruEye®, while APS was found to have a slower release, on the order of 8 hours. Hence, the APS is placed on the outside of the lens, as its penetration into the lens will be low relative to the rate of polymerization. The release of APS from O2 Optix™ was similar to that of DMA and TEMED, as indicated in FIG. 2, which can permit greater penetration of APS into the lens during polymerization.

Determination of the Surface Layer Thickness and Water Content.

The thickness of the layer is determined by measuring the difference in hydrated weight of the lenses after and before polymerization using the assumption that the DMA layer has a density of 1.00. Separately, the increase in dry weight determined is attributed to the mass of DMA polymerized on the surface. The ratio of these weights is attributed to the water within the coating. The weight of the lens was determined after soaking in DI water and after a 24 hour drying period to determine the hydrated and dried weights respectively. After lens modification as described above but before PBS storage, the lens is weighed to determine its new hydrated weight. The lens is dried for 24 hours and weighed to determine the new dried weight. The weight differences can then by calculated to determine both the change in water content and the thickness of the layer DMA. The thickness is calculated assuming that added dry weight is due solely to DMA in the lubricious layer. Assuming a uniform density and uniform thickness across the surface of the lens, the layer thickness is determined. Results for TruEye® and O2 Optix are shown in Tables 2 and 3.

TABLE 2

Results obtained with ACUVUE ® TruEye ® Contact Lens.

| | Hydrated weight (mg) | Dried weight (mg) | Measured water content (%) | Manufacturer water content (%) |
|---|---|---|---|---|
| TruEye ® (control) | 38.5 ± 0.4 | 20.8 ± 0.5 | 45.9 ± 0.9 | 46 |

| | Hydrated weight (mg) | Dried weight (mg) | Measured water content (%) | Water Content Increase (%) |
|---|---|---|---|---|
| Formula 1 | 39.6 ± 0.5 | 21.1 ± 0.4 | 46.7 ± 0.6 | 1.6 |
| TEMED 30% | | | | |
| DMA 40% | | | | |
| APS 3% | | | | |
| Time (s) 10 | | | | |
| Formula 2 (Selected) | 40.9 ± 1.4 | 21.3 ± 0.3 | 47.9 ± 1.0 | 4.3 |
| TEMED 30% | | | | |
| DMA 40% | | | | |
| APS 3% | | | | |
| Time (s) 15 | | | | |
| Formula 3 | 41.3 ± 0.9 | 21.5 ± 0.2 | 48.1 ± 0.8 | 4.7 |
| TEMED 30% | | | | |
| DMA 40% | | | | |
| APS 3% | | | | |
| Time (s) 20 | | | | |
| Formula 4 | 40.5 ± 0.1 | 21.3 ± 0.3 | 47.4 ± 0.6 | 3.3 |
| TEMED 30% | | | | |
| DMA 20% | | | | |
| APS 3% | | | | |
| Time (s) 15 | | | | |
| Formula 5 | 40.2 ± 0.3 | 21.3 ± 0.2 | 47.0 ± 0.3 | 2.3 |
| TEMED 30% | | | | |
| DMA 10% | | | | |
| APS 3% | | | | |
| Time (s) 15 | | | | |
| Formula 6 | 43.0 ± 0.4 | 21.5 ± 0.1 | 50.0 ± 0.6 | 8.9 |
| TEMED 50% | | | | |
| DMA 40% | | | | |
| APS 3% | | | | |
| Time (s) 15 | | | | |
| Formula 7 | 43.4 ± 0.4 | 21.4 ± 0.2 | 50.7 ± n/a | 10.3 |
| TEMED 40% | | | | |
| DMA 40% | | | | |
| APS 3% | | | | |
| Time (s) 15 | | | | |

TABLE 2-continued

Results obtained with ACUVUE ® TruEye ® Contact Lens.

| Forumula 8 | | 41.5 ± 1.6 | 21.2 ± 0.2 | 49.0 ± n/a | 6.6 |
|---|---|---|---|---|---|
| TEMED | 20% | | | | |
| DMA | 40% | | | | |
| APS | 3% | | | | |
| Time (s) | 15 | | | | |

TABLE 3

Results obtained with O2 Optix ® Contact Lens.

| | Water Content (mg) |
|---|---|
| Air Optix aqua | 10.5 |

| | Water content after coating (mg) | Change in dry weight (mg) | Dry film thickness (um) | Water content increase (mg) | % increase in Water Content |
|---|---|---|---|---|---|
| Air Optix aqua (10% 15 s) | 11.1 | 0.33 | 1.39 | 0.5 | 3.3 |
| Air Optix aqua (20% 15 s) | 12.8 | 1.18 | 4.93 | 2.3 | 13.2 |
| Air Optix aqua (40% 15 s) | 11.1 | −0.02 | 0.00 | 0.5 | 3.3 |

Figure 3:
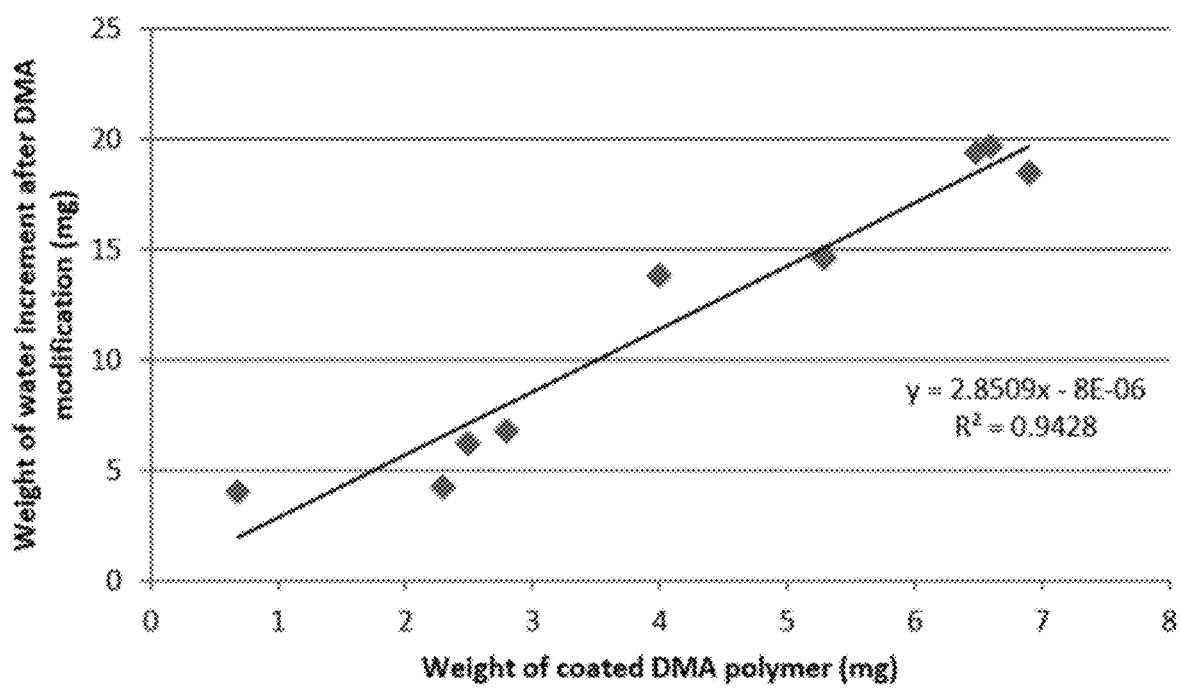
FIG. 3 shows a representative plot of the water weight versus poly(DMA) film thickness on an ACUVUE® TruEye® lens, according to an aspect of the present disclosure by weight.
Figure 4:
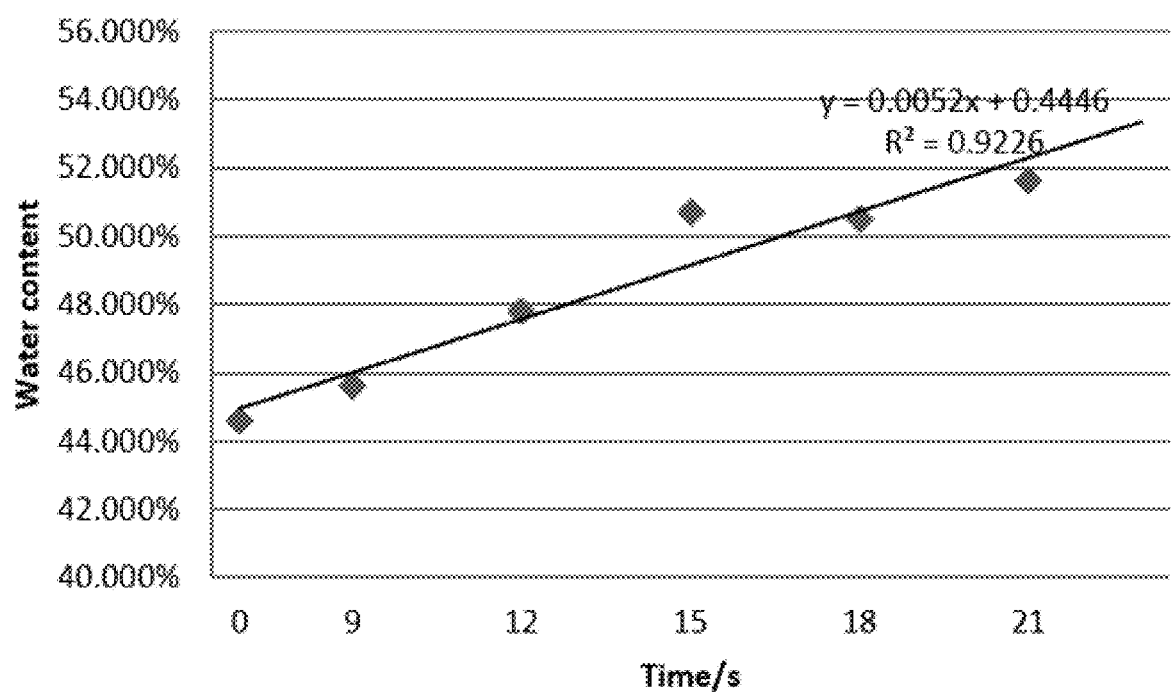
FIG. 4 shows a representative plot of water content of the contact lens versus polymerization time for an ACUVUE® TruEye® contact lens modified to have a poly(DMA) lubcricious coating, according to an aspect of the present disclosure, made by using 40 wt % DMA, 30 wt % TEMED and 3 wt % APS where the polymerization time was varied.
Figure 5:
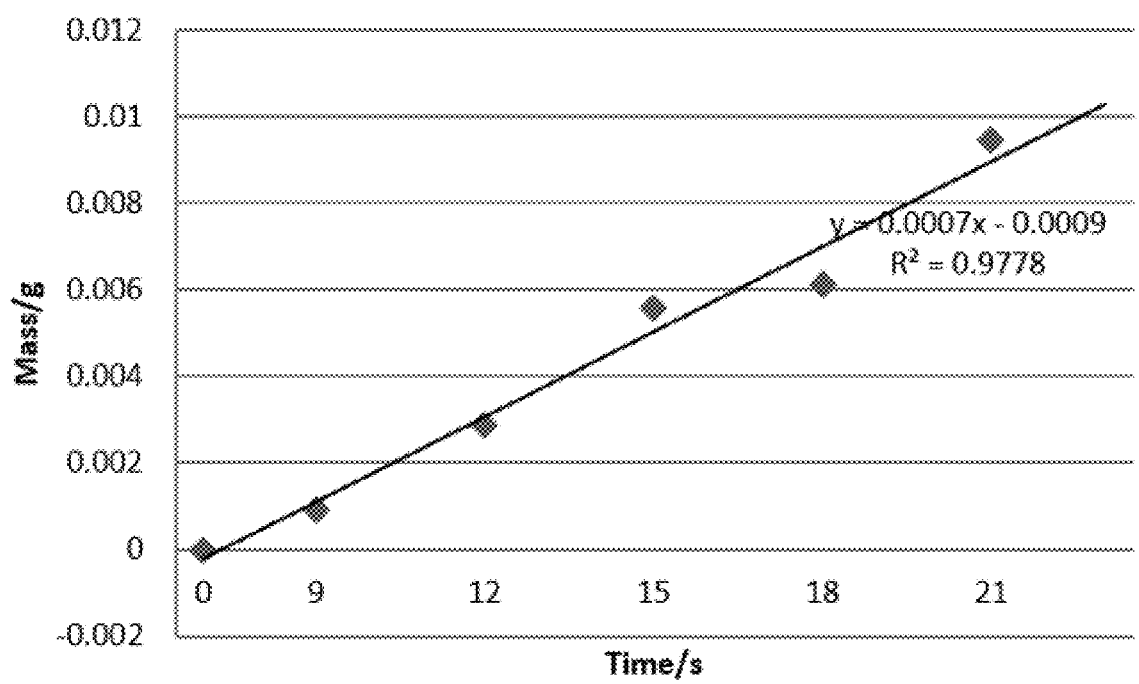
FIG. 5 shows a representative plot of water and poly (DMA) mass of the contact lens versus polymerization time for an ACUVUE® TruEye® contact lens modified to have a poly(DMA) lubricious coating, according to an aspect of the present disclosure, made by using 40 wt % DMA, 30 wt % TEMED and 3 wt % APS where the polymerization time was varied.
Figure 6:
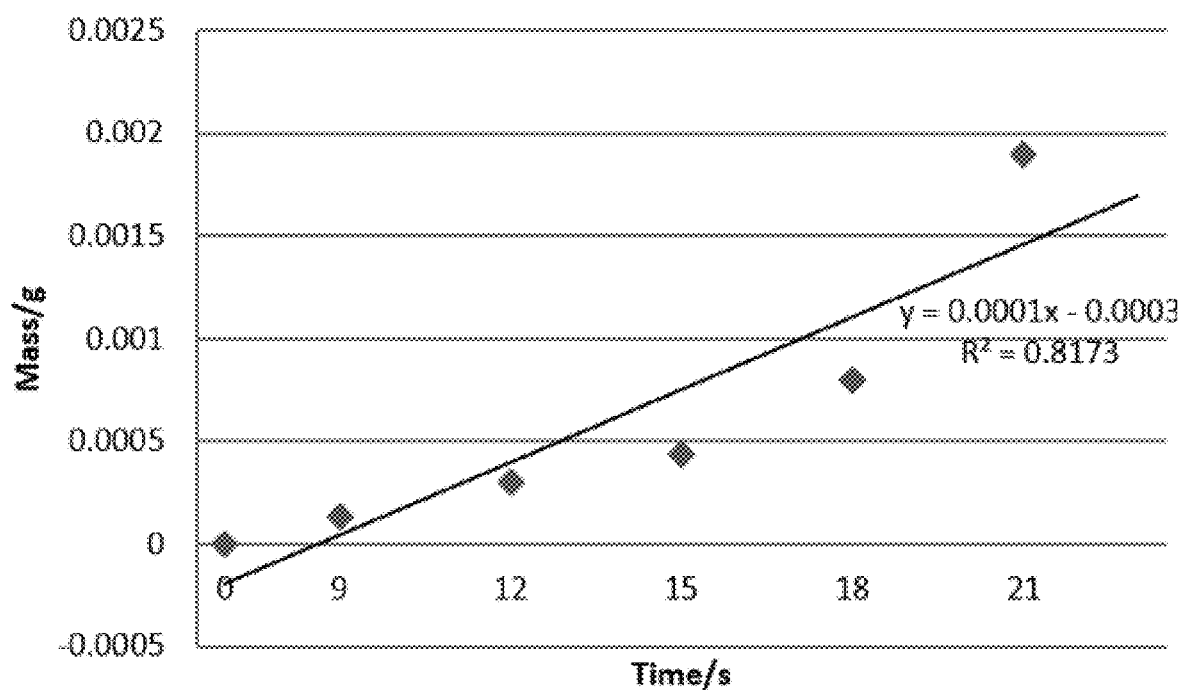
FIG. 6 shows a representative plot of the dried poly (DMA) layer mass of the contact lens versus polymerization time for an ACUVUE® TruEye® contact lens modified to have a poly(DMA) lubricious coating, according to an aspect of the present disclosure, made by using 40 wt % DMA, 30 wt % TEMED and 3 wt % APS where the polymerization time was varied.

FIG. 3 shows a linear relationship between the increase in water weight and DMA weight. The slope of the line is roughly 2.85 which can be interpreted to mean that the coated DMA polymer layer has a water content of 285%. Furthermore, the data suggest that the water content is independent of the substrate material. FIGS. 4-6 show that water content of the coated lens, wet weight of the film, and the dry weight of the film increase linearly with the reaction time. These results suggest that the volume of the DMA film on the surface grows with time, leading to increase in both the dry and the hydrated weight. The data from these studies are summarized in Table 4 below.

TABLE 4

Hydration for Various Formulations of ACUVUE TruEye ® lens.

| | | | | | Hydrated weight (mg) | | Dried weight (mg) | | Weight of DMA coated (mg) | | Thickness of DMA Layer (μm) | |
|---|---|---|---|---|---|---|---|---|---|---|---|---|
| | | | | | Average | Std. Dev. (±) | Average | Std. Dev. (±) | Average | Std. Dev. (±) | Average | Std. Dev. (±) |
| 1. Changing polymerization time | | | | | | | | | | | | |
| Control Lens | | | | | 38.5 | 0.4 | 20.8 | 0.5 | | | | |
| | DMA | TEMED | APS | Time | | | | | | | | |
| TE 1 | 40 | 30 | 3 | 10 | 39.6 | 0.5 | 21.1 | 0.4 | 0.3 | 0.4 | 1.4 | 1.7 |
| TE 2 | 40 | 30 | 3 | 15 | 40.9 | 1.4 | 21.3 | 0.3 | 0.5 | 0.3 | 2.1 | 1.4 |
| TE 3 | 40 | 30 | 3 | 20 | 41.3 | 0.9 | 21.5 | 0.2 | 0.7 | 0.2 | 2.8 | 1.0 |
| 2. Changing monomer concentration | | | | | | | | | | | | |
| Control Lens | | | | | 38.5 | 0.4 | 20.8 | 0.5 | | | | |
| | DMA | TEMED | APS | Time | | | | | | | | |
| TE 1 | 10 | 30 | 3 | 15 | 40.2 | 0.3 | 21.3 | 0.2 | 0.5 | 0.2 | 2.2 | 0.9 |
| TE 2 | 20 | 30 | 3 | 15 | 40.5 | 0.1 | 21.3 | 0.3 | 0.5 | 0.3 | 1.9 | 1.0 |
| TE 3 | 40 | 30 | 3 | 15 | 40.9 | 1.4 | 21.3 | 0.3 | 0.5 | 0.3 | 2.1 | 1.4 |

TABLE 4-continued

Hydration for Various Formulations of ACUVUE TruEye ® lens.

3. Changing TEMED (inside) concentration

| | DMA | TEMED | APS | Time | | | | | | | |
|---|---|---|---|---|---|---|---|---|---|---|---|
| Control Lens | | | | | 38.5 | 0.4 | 20.8 | 0.5 | | | |
| TE 1 | 40 | 20 | 3 | 15 | 41.5 | 1.6 | 21.2 | 0.2 | 0.4 | 0.2 | 1.5 | 0.6 |
| TE 2 | 40 | 30 | 3 | 15 | 40.9 | 1.4 | 21.3 | 0.3 | 0.5 | 0.3 | 2.1 | 1.4 |
| TE 3 | 40 | 40 | 3 | 15 | 43.1 | 0.6 | 21.4 | 0.2 | 0.6 | 0.2 | 2.5 | 0.8 |
| TE 4 | 40 | 50 | 3 | 15 | 42.3 | 1.5 | 21.4 | 0.3 | 0.7 | 0.1 | 2.9 | 0.4 |

Characterization of Layer Thickness by Drug Release.

Figure 7:
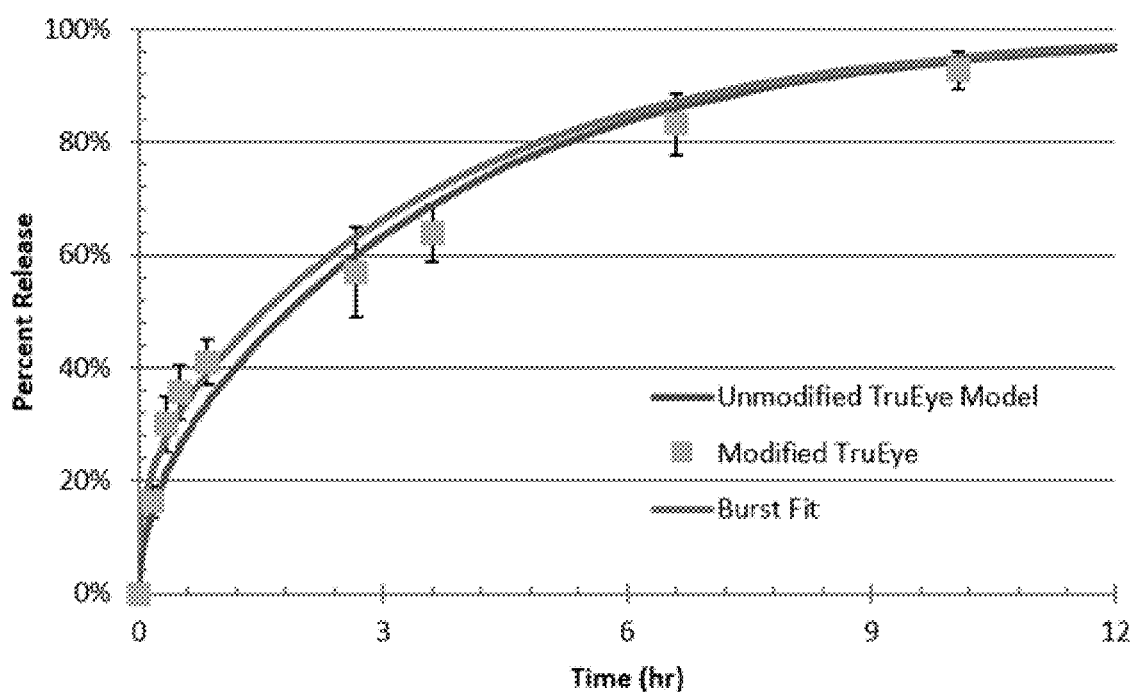
FIG. 7 shows a representative plot of the release of timolol from ACUVUE® TruEye® contact lens modified to have a poly(DMA) lubricious coating, according to an aspect of the present disclosure, using 40 wt % DMA, 30 wt % TEMED, and 3 wt % APS.

To assign a thickness of the surface layer upon polymerization, the differences in diffusivity of a component within the surface layer and the bulk of the lens was determined. The DMA layer offers a much lower diffusive resistance relative to the silicone hydrogel core. This difference is manifested as a burst release of a compound loaded into the modified contact lens, where a portion of the compound's release is nearly instantaneous. Timolol maleate, a highly hydrophilic compound, was loaded into both modified and unmodified ACUVUE® TruEye® contact lenses. The fraction of timolol maleate released through burst release can be used to approximate the added thickness of poly(DMA). Results from the release, shown in FIG. 7, give a burst release of 7±1% of the timolol maleate. This fraction is lower than the fractional increase in the wet weight of the poly(DMA) coated lens. The hydrated weight of the ACUVUE® TruEye® increases by about 6 mg after 15 sec polymerization duration, which is about 20% of the weight of the original lens. These differences appear to result because the partition coefficient of timolol in the DMA coating is likely lower than that in the bulk lens because of binding to the silicone-hydrogel polymer. The partition coefficient of timolol in the DMA film is close to 1 due to the very high water content, while the partition coefficient in the ACUVUE® TruEye® lens is about 4. The burst of 7±1% is consistent with a DMA film that is about 28±4% of the total thickness, which is within the range obtained by the weight measurements.

Characterization of the Surface Layer Composition by ATR-FTIR.

Figure 8:
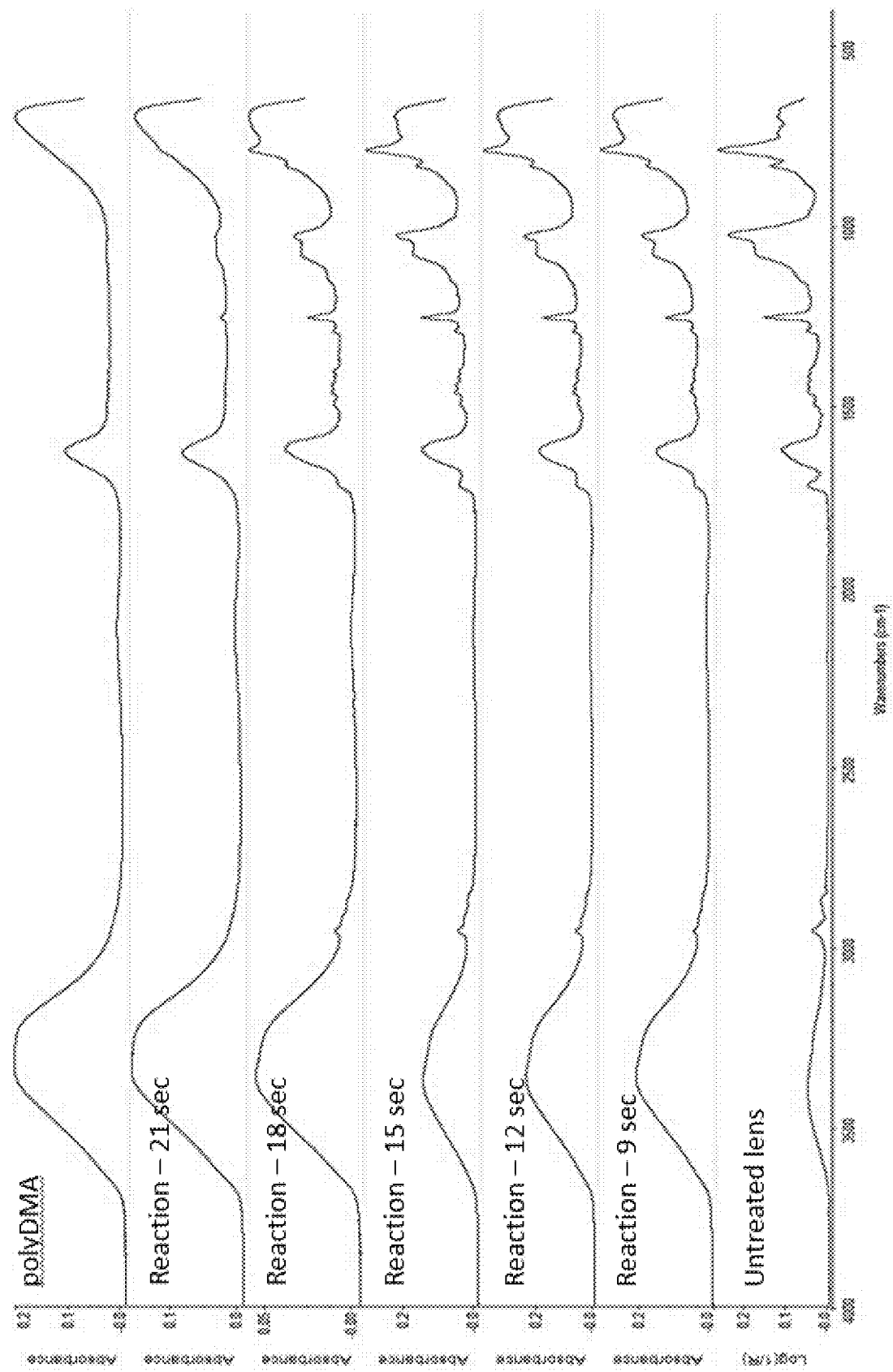
FIG. 8 shows representative stacked FTIR spectra for pure poly(DMA) and an untreated ACUVUE® TruEye® contact lens as indicated, and also for a ACUVUE® TruEye® contact lens modified using 40 wt % DMA, 30 wt % TEMED and 3 wt % APS for the indicated reaction times, according to an aspect of the present disclosure. The comparison sample, poly(DMA) was prepared as described herein below in the Examples.

FTIR spectra of contact lenses modified using different polymerization times and pure poly(DMA) are shown in FIG. 8. The pure poly(DMA) used for comparison was prepared as follows: a 40 wt % DMA solution was polymerized using 3% APS, and polymerization was carried out for 2 hours under a UVB-10 transilluminator (ULTRA•LUM INC, Carson, Calif., USA) with an intensity of 16.50 mW/cm$^2$ and peak output at 310 nm.

Figure 9:
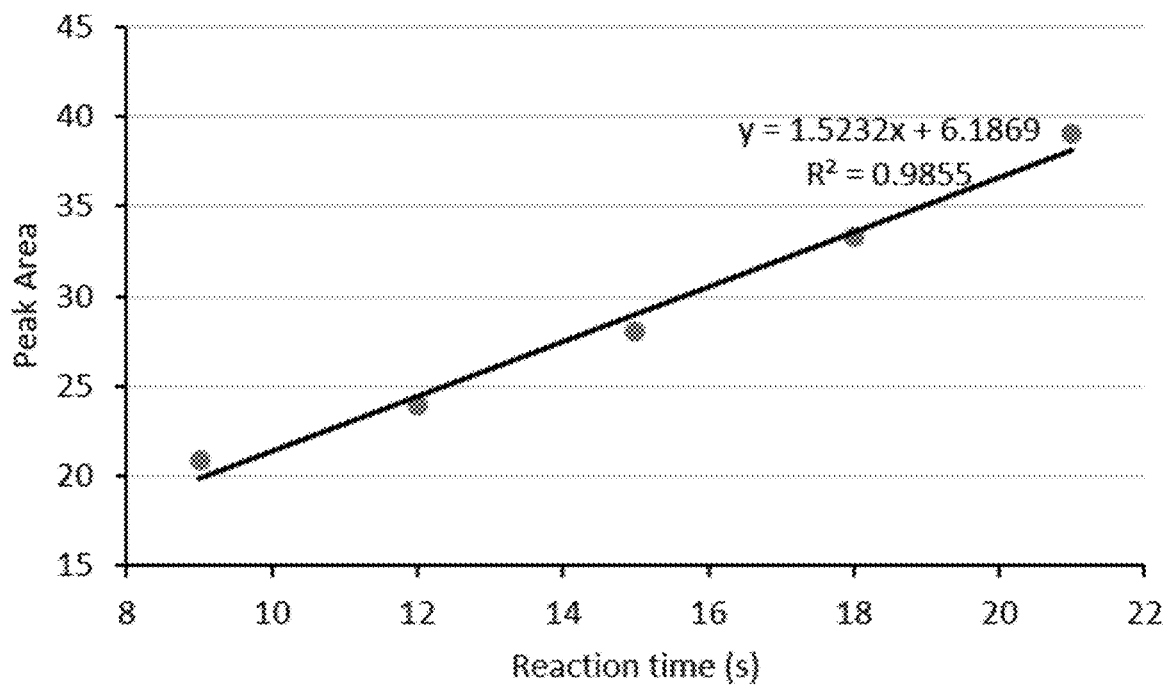
FIG. 9 shows a representative plot of peak area at 1630 $cm^{-1}$ vs. polymerization time, for ACUVUE® TruEye® contact lenses modified using 40 wt % DMA, 30 wt % TEMED and 3 wt % APS.
Figure 10:
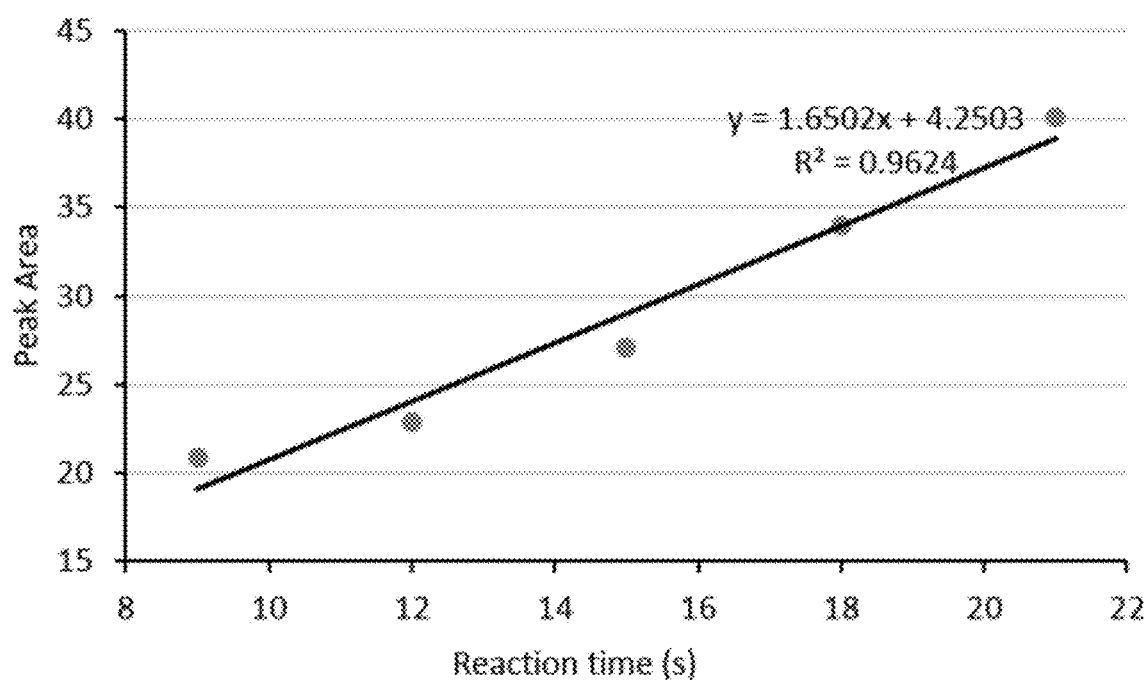
FIG. 10 shows a representative plot of peak area at 700 $cm^{-1}$ vs. polymerization time, for ACUVUE® TruEye® contact lenses modified using 40 wt % DMA, 30 wt % TEMED and 3 wt % APS.
Figure 11A:
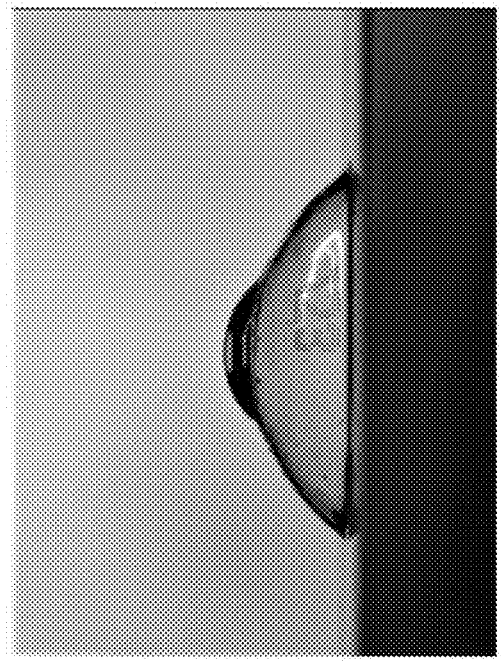
FIGS. 11A-11D shows representative photographs of the water contact angle of an ACUVUE® TruEye® lens (FIGS. 11A and 11C) and modified with a disclosed lubricious coating (FIGS. 11B and 11D), according to an aspect of the present disclosure where the contact lenses were modified using 40 wt % DMA, 30 wt % TEMED and 3 wt % APS with a polymerization time of 15 seconds and oxygen exposure to terminate the polymerization.
Figure 11B:
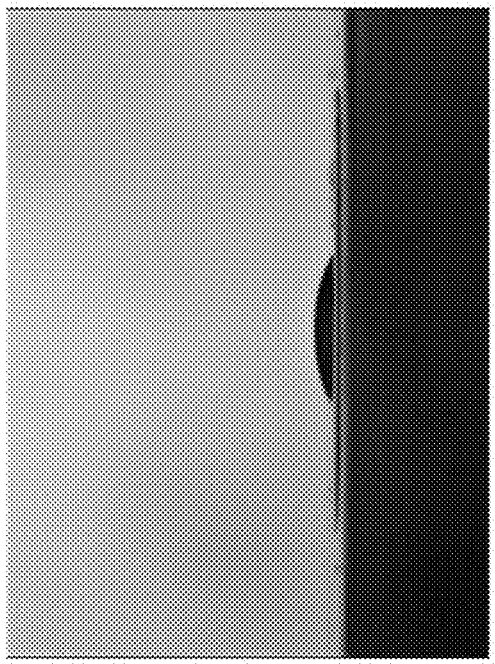
Figure 11C:
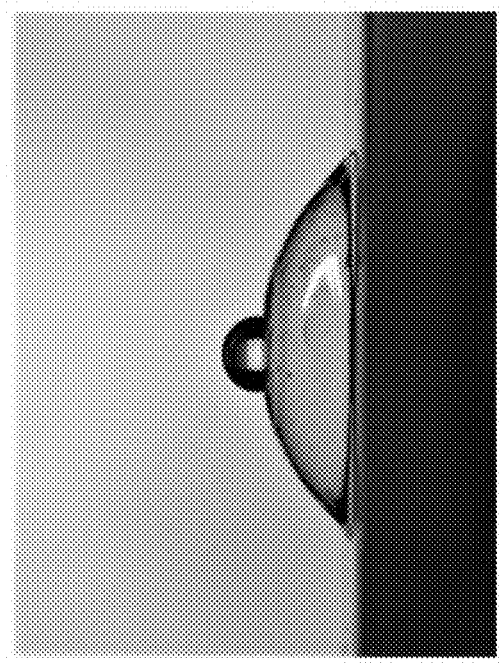
Figure 11D:
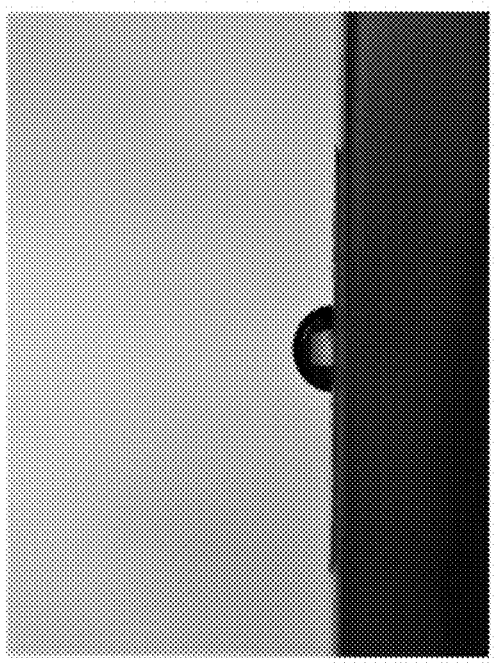

The data show that the lubricious surface layer has a unique functional group, a C=O carbonyl bond. In particular, a C=O bending is observed at 1630 cm$^{-1}$ in both the pure Poly(DMA) and modified contact lens, thus suggesting that the lubricious surface layer comprises poly(DMA). From FIG. 9, it is observed that with increasing time, the peak area at 1630 cm$^{-1}$ increases linearly. The peak at 700 cm$^{-1}$ corresponds to C=C bending. FIG. 10 also shows a linear relationship between peak area at 700 cm$^{-1}$ and reaction time. All the results indicate that the composition of the surface layer is poly(DMA) and the thickness of the surface layer increases with longer reaction time.

Contact Angle of a Modified Contact Lens.

Figure 12:
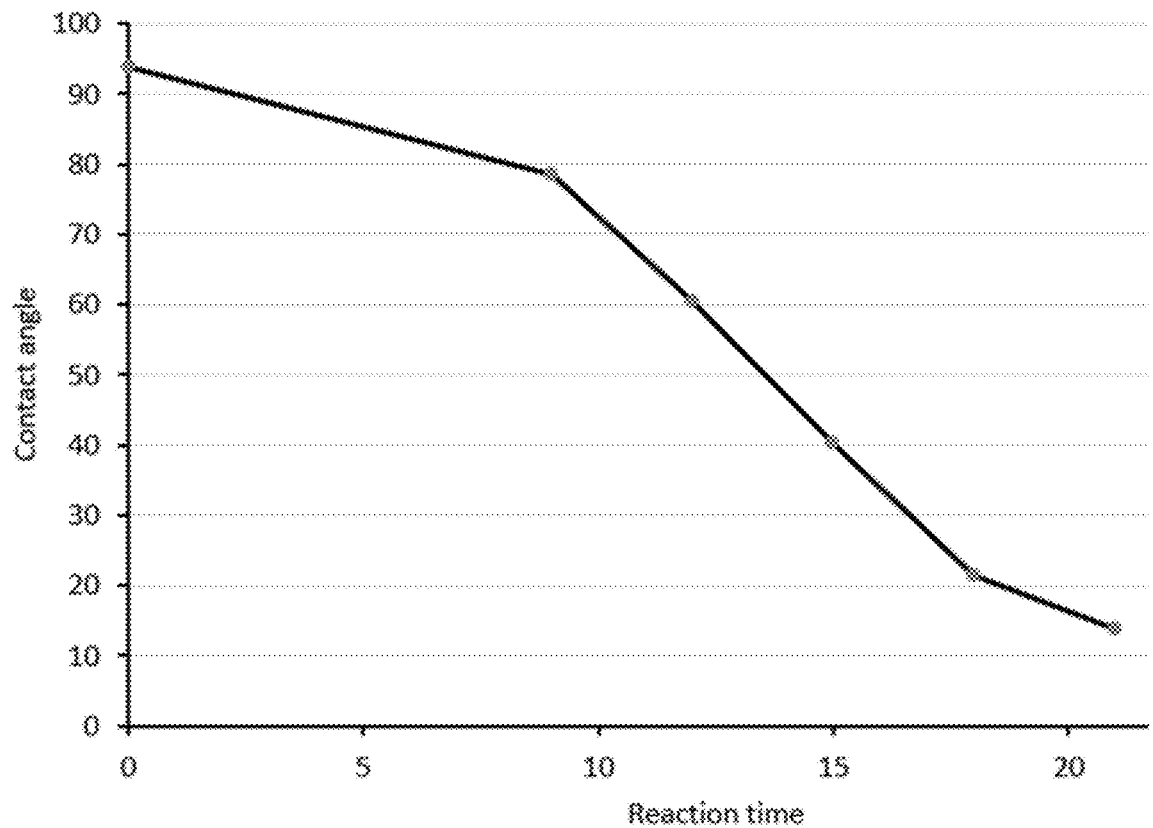
FIG. 12 shows representative contact angle data for an ACUVUE® TruEye® lens, according to an aspect of the present disclosure, modified using 40 wt % DMA, 30 wt % TEMED and 3 wt % APS with oxygen exposure to terminate the polymerization, thereby providing a lubricious layer comprising poly(DMA).
Figure 13:
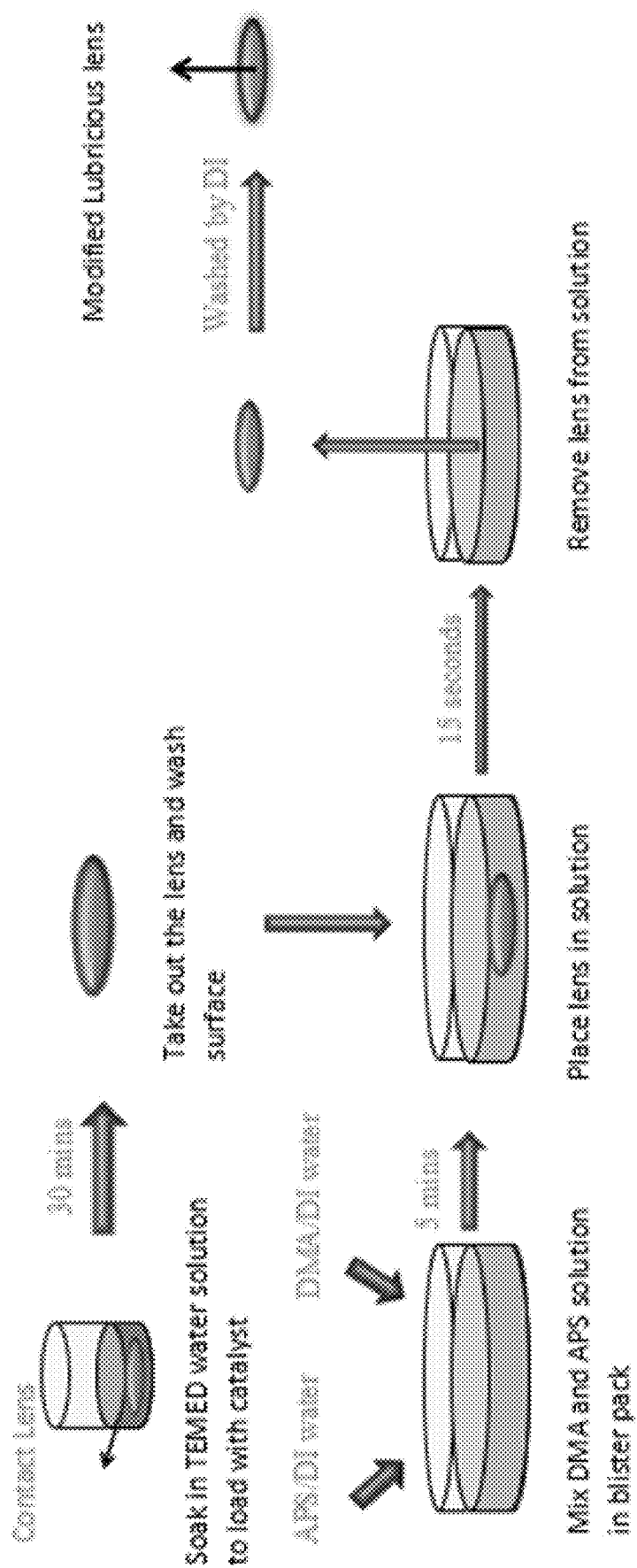
FIG. 13 shows a scheme for a disclosed process of redox initiated polymerization which can provide a thin lubricious layer of poly(DMA) on the surface of the contact lens, according to an aspect of the present disclosure.

Water contact angles of ACUVUE® TruEye® lens, before and after modification by the disclosed methods and compositions, was measured by KRUSS drop shape analyzer (DSA 100) by placing a drop of water on the surface of the lens. For lenses with a very lubricious film, the water drop could not be kept on the surface, so the lens was cut into a small piece that was then stretched flat on a solid support and the drop was placed on the flattened lens. When compared to the unmodified commercial contact lens, the modified contact lens has a lower water contact angle as shown in FIG. 11, which means a hydrophilic surface layer was synthesized on the surface. The contact angle decreases monotonically with increasing polymerization time FIG. 12, consistent with thickness and density of the poly(DMA) increasing with increasing polymerization time.

Sliding Velocity Lubricity Test of a Modified Contact Lens.

The lubricity of lenses was characterized by measuring the sliding velocity on the surface of a glass inclined plane that is fully submerged in water. The angle of incline for the glass plate was 15°; and the glass plate had dimensions of 32 cm×10 cm×0.5 cm. Plates were cleaned using (in order): acetone, methanol, and DI water prior to a series of runs. A contact lens with a mold and a small weight was placed on the lens to maintain contact between the lens and the glass surface. The modified and commercial contact lenses were placed at the same starting location and help stationary by a glass barrier. Upon removal of the barrier the time required for the lens to reach the bottom of the inclined plane was determined. The same procedure was repeated 10 times. Table 5 shows the total time for lenses to travel the length of the device during each trial. The modified contact lens travels significantly faster than commercial lens, suggesting a lower coefficient of friction. The ratio of the transit times cannot be inferred as the ratio of the friction coefficients because the motion of the lens is resisted by the surrounding water in addition to the friction with the lens. However the significant decrease in the transit time suggests an increase in lubricity, which is clearly supported by tactile impressions while rubbing the lens' surface with a finger. The data in Table 5 were obtained with ACUVUE® TruEye® lens either unmodified or modified according to the disclosed procedures using 40 wt % DMA, 30 wt % TEMED and 3 wt % APS. The polymerization time was 15 seconds and oxygen exposure was used to terminate the reaction. The sliding velocity data in Table 5 are provided in elapsed time (seconds).

TABLE 5

Sliding Velocity Data for ACUVUE ® TruEye ® lens (unmodified and modified).

|  | Run 1 | Run 2 | Run 3 | Run 4 | Run 5 | Run 6 | Run 7 | Run 8 | Run 9 | Run 10 | Mean |
|---|---|---|---|---|---|---|---|---|---|---|---|
| Lens - Commercial | | | | | | | | | | | |
| Time for unmodified lens | 2.69 | 2.06 | 2.32 | 1.97 | 2.34 | 2.34 | 2.67 | 2.50 | 2.41 | 2.22 | 2.35 |
| Lens - Modified | | | | | | | | | | | |
| Time for modified lens | 1.72 | 2.10 | 2.15 | 1.60 | 2.19 | 1.81 | 2.31 | 1.75 | 1.82 | 2.18 | 1.96 |

Torque Meter Lubricity Test of a Modified Contact Lens.

In this study, a cadaver rabbit cornea was used to measure the dynamic friction coefficient of ACUVUE® TruEye® lens either unmodified or modified according to the disclosed procedures using 40 wt % DMA, 30 wt % TEMED and 3 wt % APS. FIGS. 44A-44D show images of the lubricity testing device. Briefly, a domed rod with a cornea was fixed in a torque meter while another concaved rod with a contact lens was placed on the cornea. The rod holding the lens was connected to a motor that provided a constant angular speed. The value that was output by the torque was used to calculate the friction coefficient of each individual lens.

A rabbit cornea was excised from a cadaver rabbit eye provided by Pel-Freez and adhered to the top of a hemispherical domed rod using Pelco® Pro CA44 instant tissue adhesive. The domed rod was clamped in the center of a SHIMPO TNP0.5 0.5 Capacity Torque Meter and a test lens fixed on the concaved rods. The various lenses were adhered to the concaved rods using Elco® Pro CA44 instant tissue adhesive. The specialized adhesive was used because of the inherent ability that allowed the lens to stay well fixated on the domed rod even with the lens fully hydrated. The concaved rods and lens assemblies were inserted into the chuck and placed atop the cornea which was held in place by tracks on a forked tongue. The forked tongue was connected to a motor set to an angular speed of 18 RPM and had an additional weight (0.5 kg) placed atop the chuck to provide sufficient normal force for friction measurements. The entire assembly was held in place using a large bracket the had the same height at the base as the clearance of the torque meter, ensuring that the entire apparatus was stable during the experiments and minimizes precession of the forked tongue, chuck, and concaved rod about the cadaver rabbit cornea. Since the friction between the chuck and the forked tongue was considered equal to the gravity force of the chuck with the concaved rod, the gravity force of the weight is the normal force (G), which was 5N. The torque (T) was measured for different lenses. The friction coefficient ($\mu$) was calculated using Equation 3 below where R is the radius of the rod.

$$T = \int_0^R \frac{G}{\pi R^2} \mu r dr \cdot 2\pi r = \frac{G}{\pi R^2} \mu \cdot 2\pi \frac{R^3}{3} \quad 3$$

Figure 45:
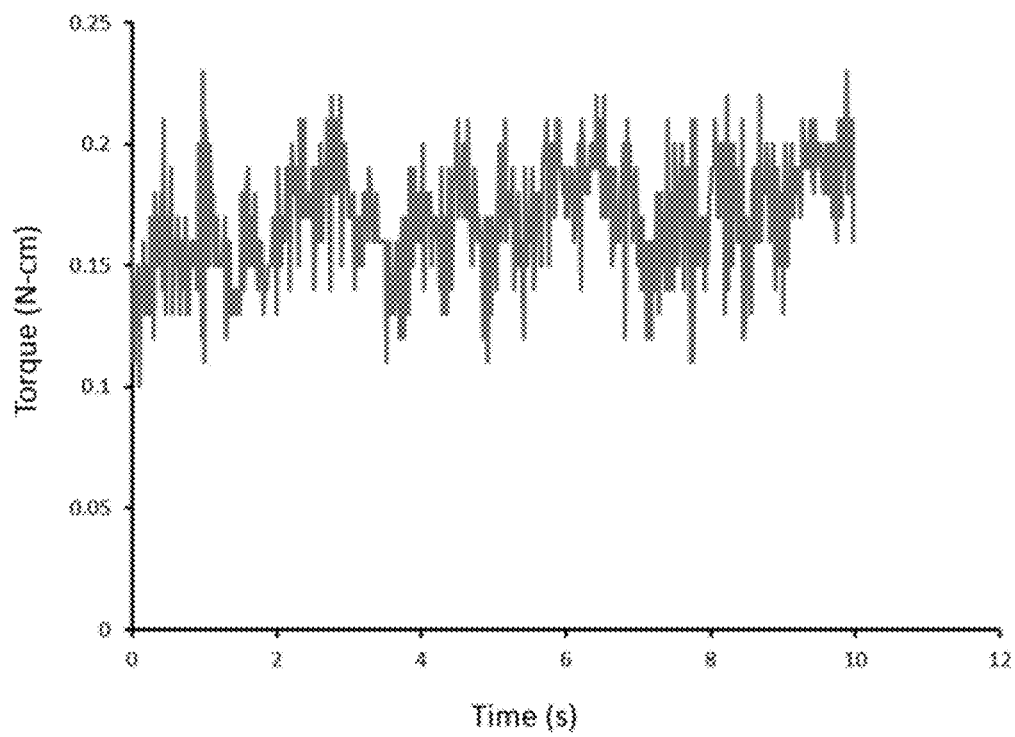
FIG. 45 shows representative torque test data obtained for a commercial contact lens (ACUVUE® 2 contact lens) in the device shown in FIGS. 44A-44D.

FIG. 45 shows representative data and indicates that torque between a test contact lens (ACUVUE® 2) and the cornea is changing periodically. Every period, or complete revolution of the motor, takes about 3.3 seconds, which matches the angular speed of the motor. Each lens trial consisted of 3 full revolutions of the motor for a total duration of 10 s which output 500 data points and each trial was conducted 3 times. Each lens was tested for 1 minute and there was no data acquisition for the first 30 seconds in order to completely negate any influence from static friction. The torque was calculated from the mean value from all 3 trials and using the relation in Equation 3, the friction coefficient for each contact lens was found. It is important to note that torque depends on the condition of the excised cornea, the rinsing or soaking solution of the lens and concave rod assembly, the normal force, and the contact lens material. All of these variables were consistent for each experiment with the exception of the lens material which is dependent on the proprietary recipes and synthesis methods for each of the commercial lenses. The tested lenses were rinsed with phosphate-buffered saline (PBS), and the residual or superficial PBS on the lens was removed by dabbing a Kimwipe on the lens surface.

Figure 18:
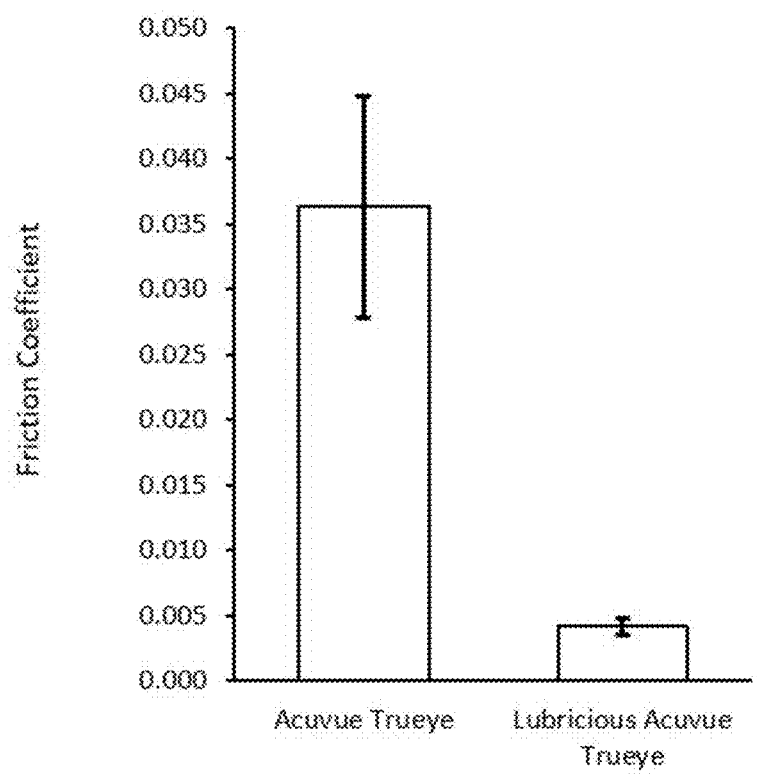
FIG. 18 shows representative friction coefficient data for an unmodified ACUVUE® TruEye® contact lens and an ACUVUE® TruEye® contact lens modified using 40 wt % DMA, 30 wt % TEMED and 3 wt % APS (reaction time 15 seconds) according to aspects of the disclosed compositions and methods.

The friction coefficient of a ACUVUE® TruEye® lens either unmodified or modified according to the disclosed procedures using 40 wt % DMA, 30 wt % TEMED and 3 wt % APS. Each lens was run 3 times in one direction. FIG. 18 shows that the friction coefficient of the modified lubricious lens was decreased by a factor of 9, which means the lubricity of the modified contact lens was highly improved.

Figure 46:
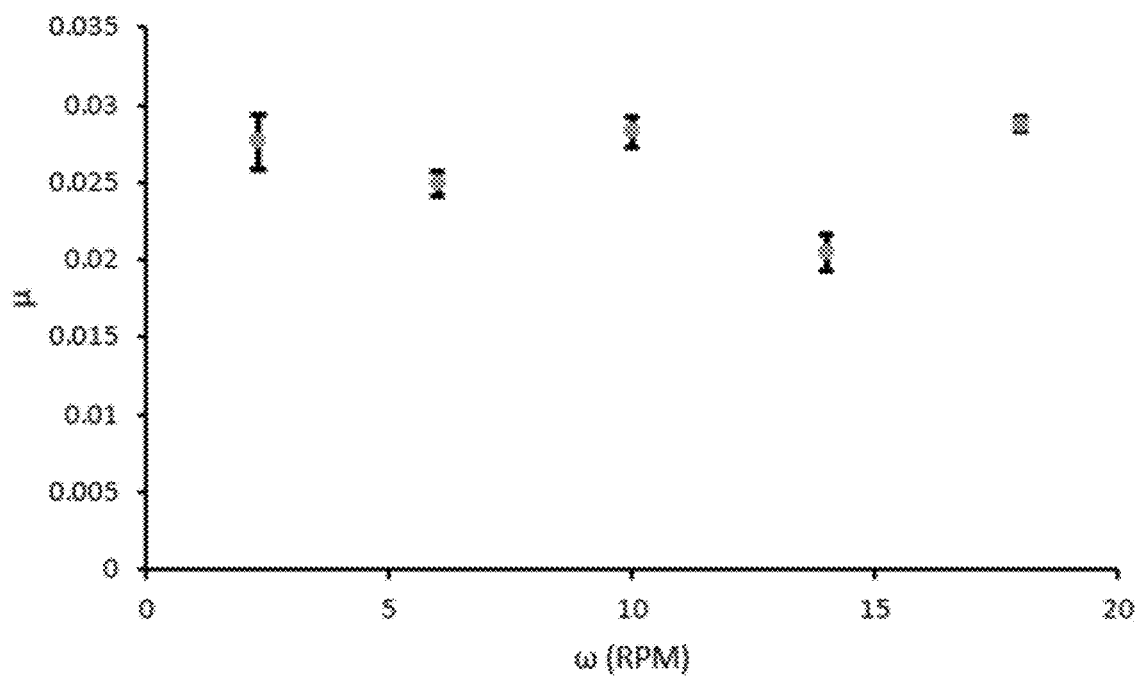
FIG. 46 shows representative friction coefficient data determined at different angular frequencies. The test lens was an unmodified ACUVUE® TruEye® lens.
Figure 47:
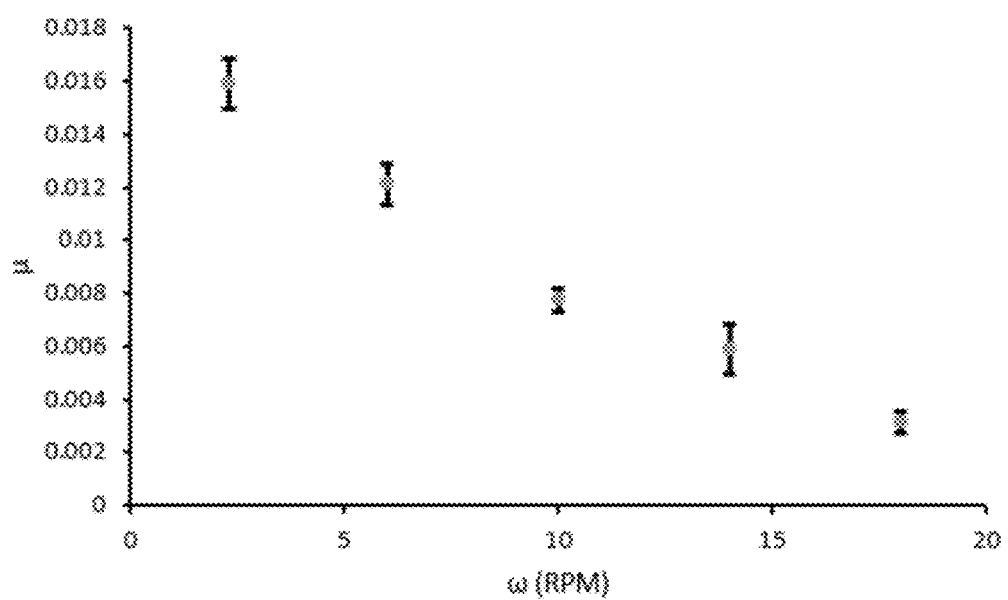
FIG. 47 shows representative friction coefficient data determined at different angular frequencies. The test lens was an ACUVUE® TruEye® lens, according to an aspect of the present disclosure, modified using 40 wt % DMA, 30 wt % TEMED and 3 wt % APS with oxygen exposure to terminate the polymerization.

The friction coefficient was also examined as it varies with rotation frequency. The frequency of the motor in the test method described above was varied by the varying the voltage of the power source. Data were for 3 runs in one direction only, and the normal force was kept constant. Friction coefficient data at different angular frequencies are shown FIG. 46 for an unmodified ACUVUE® TruEye® lens. The data show that for this commercially available lens that the friction coefficient is relatively constant over the range of 2.3 to 18 rpm. In contrast, data for a modified ACUVUE® TruEye® lens, i.e., modified using 40 wt % DMA, 30 wt % TEMED and 3 wt % APS with oxygen exposure to terminate the polymerization, are shown in FIG. 47. The data show that friction coefficient decreases as the rotation frequency increases for modified lens having a lubricious layer per the disclosed compositions and methods.

The data regarding friction coefficient and rotation frequency are relevant in view of the shear rates associated with contact lens and the eye are high. Without wishing to be bound by a particular theory, it is believed that the decrease in friction coefficient with increasing rotation frequency for the modified contact lens is related to the normal stress component that is generated within the disclosed lubricious layer due to non-Newtonian rheology of the disclosed lubricious film. That is, the normal stress reduces the overall normal force on the surface, and thereby reduces the effective shear force, i.e., effective friction. In terms of use by a contact lens wearer, these data are interesting because the friction coefficient is higher during placing the lens in the eye or removing the lens from eye, but lower during an eye blink.

Summary

The approach discussed herein above comprises creating a thin region near the surface where it is believed that the polymerization rates are high due to a high concentration of free radicals. The high concentration of the radicals was achieved by loading one component of a redox pair in the lens and the other component in the aqueous solution into which the lens is submerged. Free radicals were produced by reaction of the two components. Free radical production was likely limited to a very thin diffusion boundary layer near the surface, both inside and outside the lens. DMA was used as the monomer because of the known high water content of poly(DMA), although other acrylamide monomers can be used. It is believed that the monomer diffuses inside the lens as well, resulting in polymerization near the surface both in the film and outside, which results in anchoring of the film in the lens. The data herein show that the thickness of the layer grows linearly with time, which is somewhat surprising because the diffusion control boundary layer thickness increases as square-root of time. These data suggest that the mixing in the outer fluid could play an important role, and could possibly serve as another variable that may be useful to achieve the desired film thickness. Although the disclosed method does not include the addition of any crosslinker in the reaction step, it is possible that the surface film could potentially be at least partially crosslinked through chain transfer reactions. The anchoring of the disclosed lubricious film to a lens could either be due to covalent attachment with a few vinyl groups in the lens that were available for reaction, or due to entanglement of the polymeric DMA film inside the lens with the original lens matrix. The reaction time should be kept short to minimize growth of the diffusion boundary layer. It is likely that excessive reaction times could result in thick films and reaction inside the lens, which could cause shape change of the lens. In fact, the data herein suggest that the optimal reaction time for the 1-DAY ACUVUE® TruEye® is 15 seconds.

The reaction time could potentially be increased if the diffusion of all the components into the lens is slowed. To achieve this, the process was modified by first partially polymerizing the DMA monomer to obtain poly(DMA), which is then used in the reaction step. Pre-polymerizing DMA decreases the diffusivity of the poly(DMA) in the lens compared to the DMA monomer, and additionally the increased viscosity of the solution reduces the diffusivity for the redox pair molecules as well. The poly(DMA) was prepared by adding 5.76 mL DI water, 4% (0.24 mL) DMA and 0.3% (18 mg) thermal initiator APS into a glass vial and then polymerizing at 60° C. for 30 minutes. Then, 2-8 wt % monomeric DMA and 1 wt % APS were added into the 4 wt % PDMA which was made in the previous step. This was done because the poly(DMA) may not diffuse into the lens, so the polymerized film would not form entanglements with the lens matrix. The 1-Day Acuvue® Tru Eye® lens was soaked into a solution of 40 wt % TEMED and 2-8 wt % DMA for 5 minutes. The loading time of TEMED was reduced because TEMED was only needed near the surface. The concentration was increased from 30 wt % to 40 wt % to ensure that there was sufficient TEMED to drive the rapid reaction. Monomeric DMA was loaded into the lens to help anchor the lubricious film onto the lens. After 5 minutes, the lens was removed from TEMED and placed into the 4 wt % PDMA solution with 2-8 wt % DMA and 1 wt % APS for a range of reaction times from 45-130 seconds. Finally, oxygen sparged DI water was added to terminate the reaction. The lens was placed into a vial of PBS for storage.

The results of studies with varying concentration of DMA inside the lens, concentration in the outside fluid, and varying reaction time are summarized below in Table 6. The first four columns summarize the process parameters and the last three summarize the quality of the surface film. We first determined whether the shape of the lenses were changed by visual observations. Additionally, the surface layer was rubbed to determine whether the layer peeled. Finally, the lubricity of the layer on the surface after the rubbing was qualitatively evaluated by a finger rub test. As shown in Table 6, many of the combinations of parameters resulted in a lubricious surface film that did not rub-off and did not have a lens shape change. The studies also showed that when the concentration of outside monomeric DMA (the DMA which is mixed with poly(DMA)) was increased to 8%, the shape of the lens started to change. Furthermore, when the DMA concentration both inside and outside was increased, the reaction time also increased. This was a beneficial result because the approach was designed to increase the effective reaction time. Finally, when there was no DMA present in either the inside or the outside, the surface layer was easily peeled off. Without wishing to be bound by a particular theory, it is hypothesized that the link between the surface layer and lens is formed by chemical bonds and entanglement. The presence of DMA both inside and outside of the lens helps facilitate this linkage. Based on these studies, an effective approach for polymerizing a lubricious film on 1-DAY ACUVUE® TruEye® lens uses about 4 wt % poly(DMA)+4 wt % monomeric DMA in the reaction mixture and 4 wt % monomeric DMA to load the lens, with a polymerization duration of 100 s.

TABLE 6

Modified approach based on poly(DMA).

| poly(DMA) (Reaction Mixture) | Monomer DMA (Lens loading solution) | Monomer DMA (Reaction Mixture) | Optimal Reaction Time/s | Shape change | Effort required for peeling | Lubricity after rubbing/peeling |
|---|---|---|---|---|---|---|
| 4% | 4% | 4% | 100 | N | Hard | Y |
| 4% | 0% | 4% | 45 | N | Easy | N |
| 4% | 4% | 0% | 90 | N | Easy | N |
| 4% | 0% | 0% | 45 | N | Easy | N |
| 4% | 2% | 4% | 100 | N | Medium Hard | Y |

TABLE 6-continued

Modified approach based on poly(DMA).

| poly(DMA) (Reaction Mixture) | Monomer DMA (Lens loading solution) | Monomer DMA (Reaction Mixture) | Optimal Reaction Time/s | Shape change | Effort required for peeling | Lubricity after rubbing/peeling |
|---|---|---|---|---|---|---|
| 4% | 4% | 2% | 75 | N | Medium Hard | Y |
| 4% | 2% | 2% | 70 | N | Medium Easy | N |
| 4% | 8% | 4% | 100 | Y | Very Hard | Y |
| 4% | 4% | 8% | 110 | N | Hard | Y |
| 4% | 8% | 8% | 130 | Y | Extremely Hard | Y |

The results herein show that a lubricious layer in a commercial lens can be obtained by polymerizing DMA into poly(DMA) using a redox pair initiator. Altering the concentration of the redox initiation pair, TEMED or APS, changed the rate of polymerization. Increasing these concentrations caused very rapid reactions. Lower concentrations led to slower reaction times. For the selected formulation, 10 seconds of reaction time resulted in a lubricious layer that detached after rinsing, and 20 seconds resulted in a layer with a large thickness that altered the lens shape. These parameters are based, in part, on the partition coefficients and diffusivities of the components. The following parameters were considered effective for the 1-Day ACUVUE® Tru Eye®: 40 wt % DMA and 3 wt % APS for external solution, 30 wt % TEMED for loading solution, and 15 second reaction time. Other configurations can be utilized, but may provide less desirable results. When DMA was added to the loading solution, lens shape changed after polymerization, which shows that polymerization occurred internally in the lens. The results from FTIR also proved that the composition of the lubricious layer was poly(DMA), and the thickness of the layer increased with increasing reaction time. The lubricious layer created by this method was estimated to be 2.1±1.4 µm thick by characterization by weight and 3.5±0.5 µm thick by characterization from drug release. The results from water contact angle test and sliding test, showed the modified lens has a higher hydrophilicity and lubricity than the commercial lens, respectively.

As an alternative to increase reaction time, which may be desirable for control during production, is based on pre-formed poly(DMA) and DMA reacting. Effective parameters for polymerizing the lubricious film on 1-DAY ACUVUE® TruEye® lens by this modified approach used 4 wt % poly(DMA)+4 wt % monomeric DMA in the reaction mixture and 4 wt % monomeric DMA in the loading solution, with a polymerization reaction time of about 100 seconds. Both approaches described above can be adapted to modify other commercial lenses, and potentially other materials.

Example 2: Representative Lubricious Coating Prepared Using DMA, AIBN and Heat

General Materials and Methods.

Figure 14:
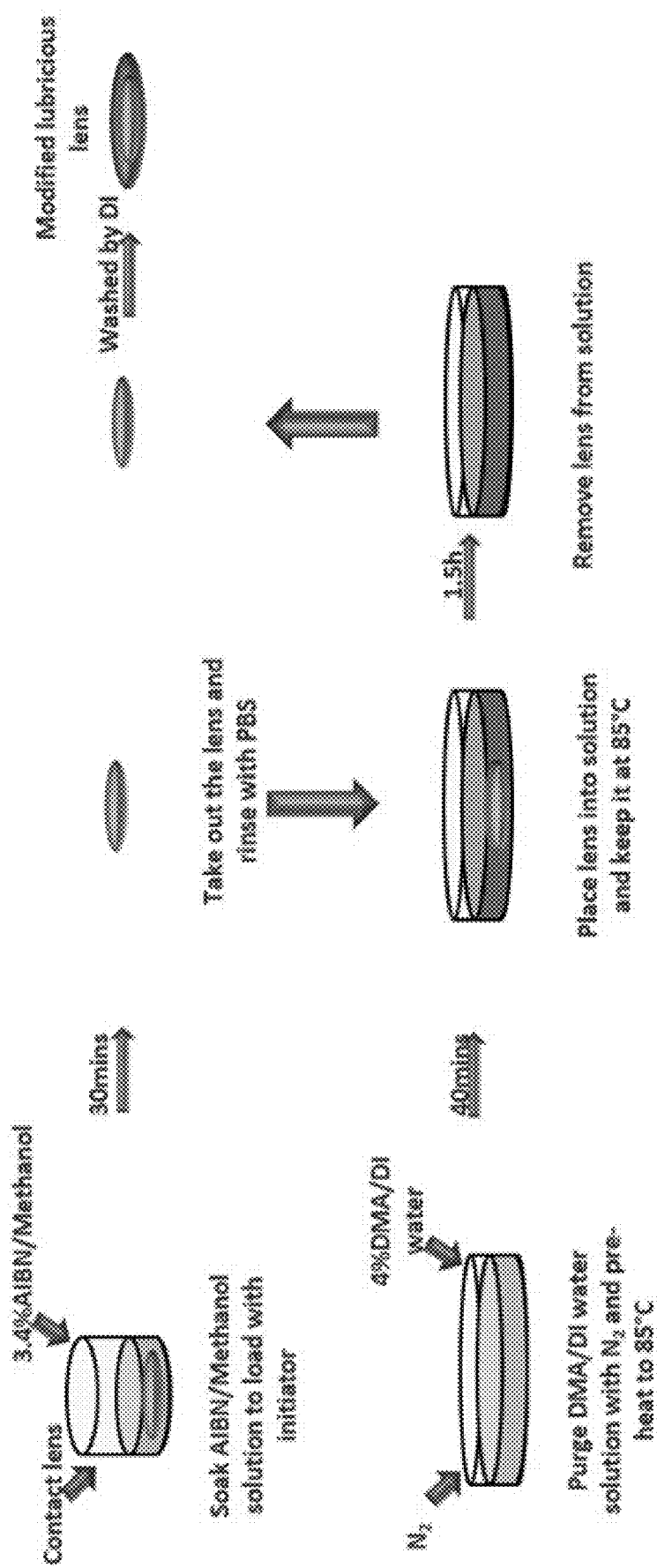
FIG. 14 shows a scheme for the process of thermal initiated polymerization which can provide a thin lubricious layer of poly(DMA) on the surface of the contact lens, according to an aspect of the present disclosure.

3.4% wt. AIBN solution was prepared in a glass vial using 5.0 mL methanol (Sigma-Aldrich Corporation, St. Louis, Mo.; Cat. No. 34860) and 0.17 g azobisisobutyronitrile (AIBN). 4% wt. DMA solution was prepared by pipetting 4.8 mL of deionized water (DI water) and 0.2 mL N,N-dimethylacrylamide ("DMA"; Tokyo Chemical Industry Co., Ltd., Singapore; Cat. No. D1091) into another glass vial. A contact lens was washed by DI water several times and soaked into the 3.4 wt % AIBN solution for 30 minutes. Then, the lens was transferred to PBS and rinsed for 5 minutes. The contact lens was placed into the 4 wt % DMA solution which has been purged with $N_2$ for 40 minutes. The 4 wt % DMA solution with the contact lens was kept at 70° C. for 12 hours. If the temperature is kept at 85° C., the reaction time can be reduced to 1.5 hours. Then, the modified lubricious lens was washed by DI water several times and placed into a glass vial with 5 mL phosphate buffered saline 1×("PBS") without calcium and magnesium (Mediatech Inc., Manassas, Va.; Cat. No. 21-040-CN). The foregoing method is schematically illustrated in FIG. 14.

Reaction Parameters.

It is important to note that the initiator used in the foregoing method to initiate the reaction, AIBN, is hydrophobic. As such, it does not diffuse into the aqueous phase, and accordingly limiting the possibility of polymerization in the external phase. However, since AIBN can be broken into free radicals and nitrogen gas at high temperature (Bartlett P. D., et al., J. Amer. Chem. So. (1960) 82(7):1762-1768), and the free radicals have a high solubility in water. Accordingly, it is believed, in the foregoing method, that the concentration of the free radicals near the lens surface is high. Moreover, the termination rate of the free radical is high ($k=6.32*10^6$ min$^{-1}$; see Achilias D. and Kiparissides C. Poly. Sci. (2010) 35(5):1303-1323). Thus, it is believed that polymerization occurs only in the coating film. Different concentrations of DMA may alter the diffusion rate into a lens, which can lead to a shape change and loss of lubricity. The foregoing method has at least the following parameters that can be modulated: concentration of DMA in the aqueous phase, i.e., external phase to the lens; concentration of AIBN loaded in the lens; and the reaction time. In the experiments described herein below, the lubricious surface layer was characterized as related to these three parameters. Moreover, the parameters were examined as they relate to the lubricious surface characteristics with regard to a commercially available lens, ACUVUE® ADVANCE® ((Vistakon Division of Johnson & Johnson Vision Care, Inc.). Although aspects of the disclosure are described herein using a commercially available ACUVUE® ADVANCE® lens, it can be appreciated that the disclosed methods and compositions can be carried out with other hydrogel contact lens, silicon hydrogel lens, and/or other devices that requires the lubricity imparted by the disclosed compositions and methods, e.g., AIR OPTIX® contact lens (Alcon Laboratories, Inc., Fort Worth, Tex.).

Determination of the Water Content in Modified Lens.

The water content of the modified lens was assessed by measuring the difference between hydrated weight and dry weight of the lubricious lenses. Table 7 below shows the dry weight and hydrated weight for both a commercial lens and a modified lens. The weight of the hydrated layer and the dry layer was calculated by subtracting the weight of the commercial lens from the weight of the modified one. The ratio of the weights (in grams) of the hydrated layer and the dry layer yields the water content in the lubricious layer (see Table 7). The data Table 7 were obtained using an ACUVUE® ADVANCE® lens that was unmodified or modified according to the preceding method using 3.4 wt % AIBN and 4 wt % DMA, and reaction at 70° C. for 12 hours.

TABLE 7

Characterization of modified contact lens weight.

| Type | Lens Hydrated mass | Lens Hydrated mass (average) | Layer Hydrated mass | Lens Dried mass | Lens Dried mass (average) | Layer Dried mass | Water content (lens) | Water content (layer) |
|---|---|---|---|---|---|---|---|---|
| Unmodified Lens | 0.0333 | 0.0333 | — | 0.0168 | 0.0168 | — | 49.550% | — |
| Modified Lens | 0.0475 0.0467 0.0480 | 0.0474 | 0.0141 | 0.0202 0.0190 0.0194 | 0.0195 | 0.00273 | 58.790% | 415.854% |

Figure 19:
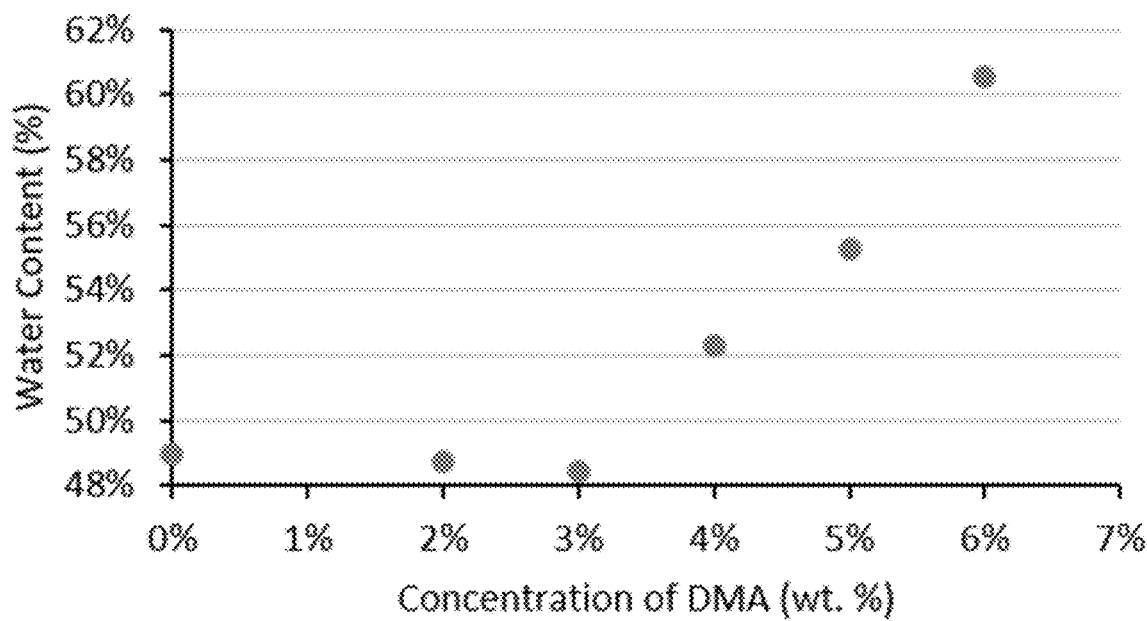
FIG. 19 shows representative data for water content versus concentration of DMA for an ACUVUE® Advance contact lens modified to have a poly(DMA) lubcricious coating, according to an aspect of the present disclosure, made using 3.4 wt % AIBN and reaction at 70° C. for 12 hours and where DMA concentration was varied as indicated.
Figure 20:
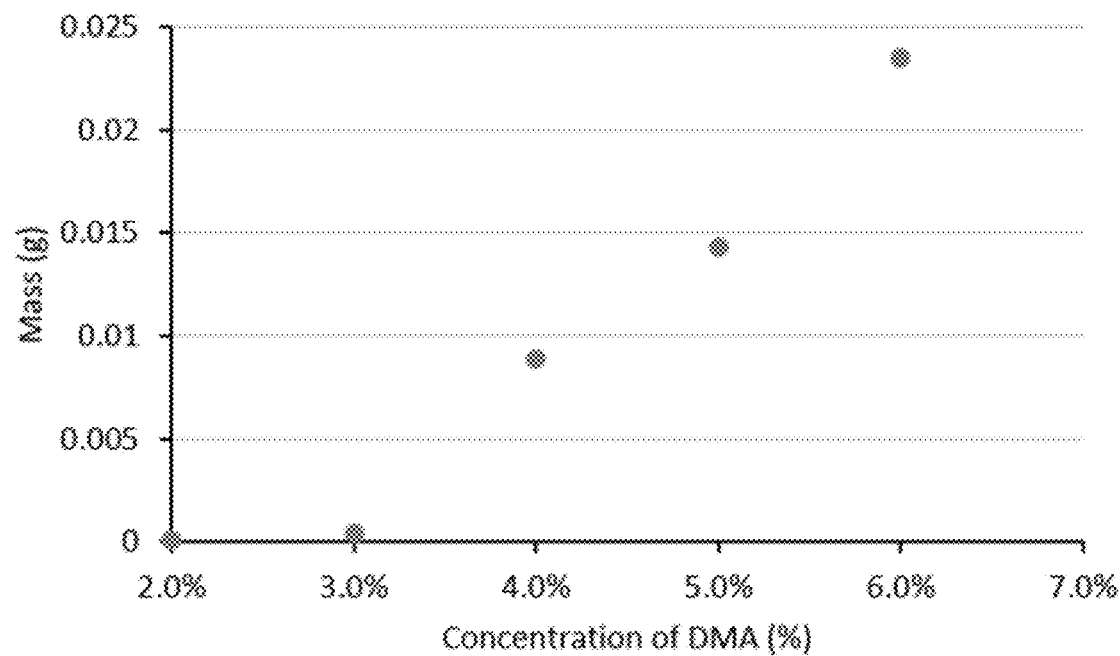
FIG. 20 shows representative data for mass of the wet layer versus concentration of DMA for an ACUVUE® Advance contact lens modified to have a poly(DMA) lubcricious coating, according to an aspect of the present disclosure, made using 3.4 wt % AIBN and reaction at 70° C. for 12 hours and where DMA concentration was varied as indicated.
Figure 21:
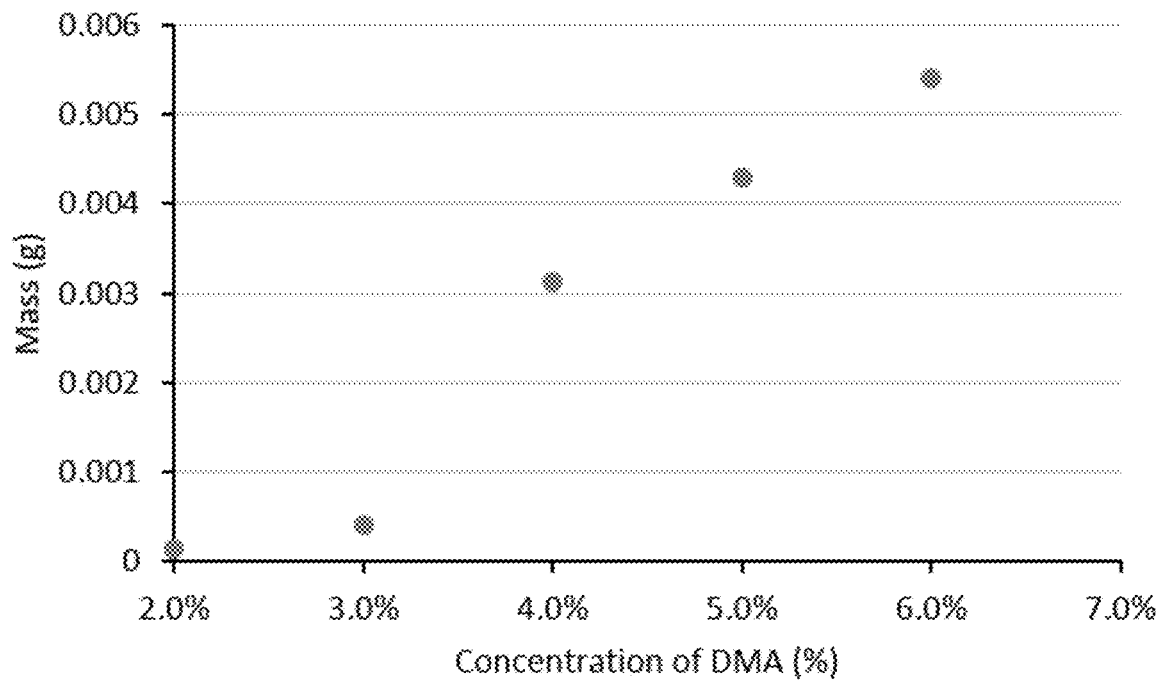
FIG. 21 shows representative data for mass of the dried layer versus concentration of DMA for an ACUVUE® Advance contact lens modified to have a poly(DMA) lubcricious coating, according to an aspect of the present disclosure, made using 3.4 wt % AIBN and reaction at 70° C. for 12 hours and where DMA concentration was varied as indicated.
Figure 22:
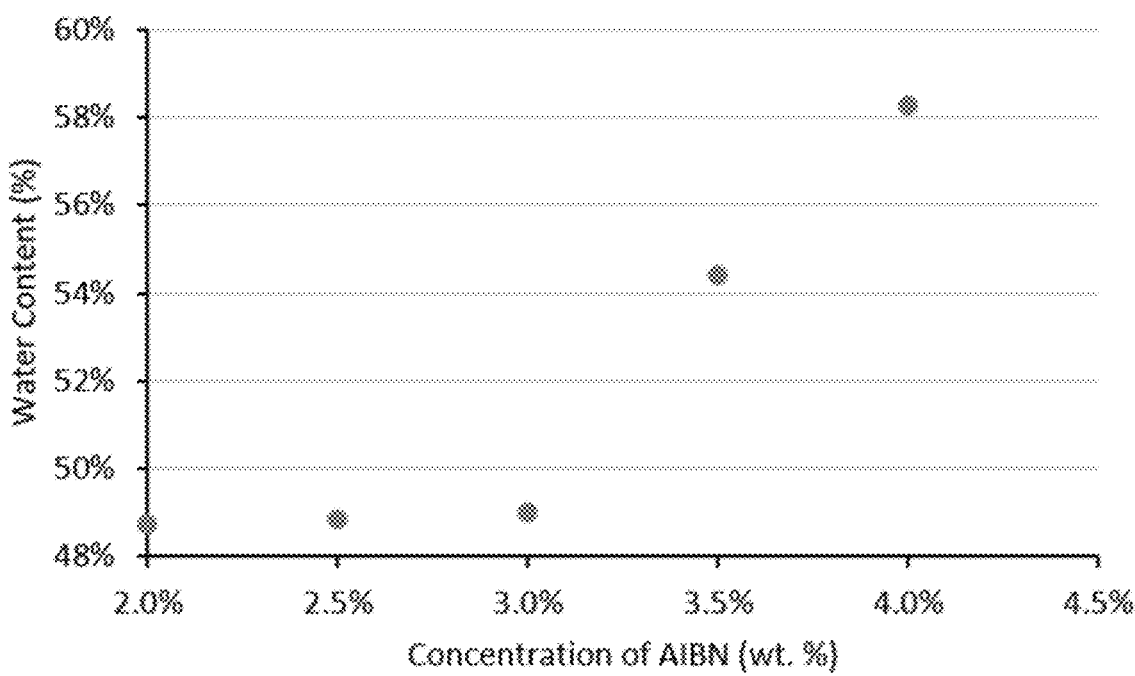
FIG. 22 shows representative data for water content versus concentration of AIBN for an ACUVUE® Advance contact lens modified to have a poly(DMA) lubcricious coating, according to an aspect of the present disclosure, made using 4 wt % DMA and reaction at 70° C. for 12 hours and where AIBN concentration was varied as indicated.
Figure 23:
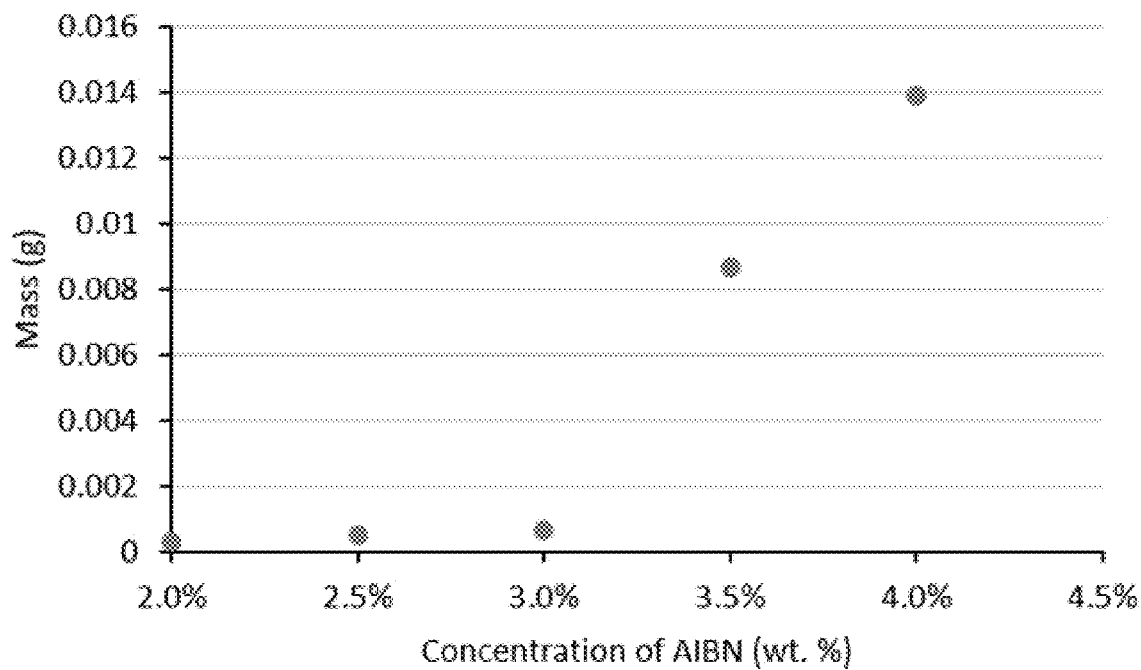
FIG. 23 shows representative data for mass of the wet layer versus concentration of AIBN for an ACUVUE® Advance contact lens modified to have a poly(DMA) lubcricious coating, according to an aspect of the present disclosure, made using 4 wt % DMA and reaction at 70° C. for 12 hours and where AIBN concentration was varied as indicated.
Figure 24:
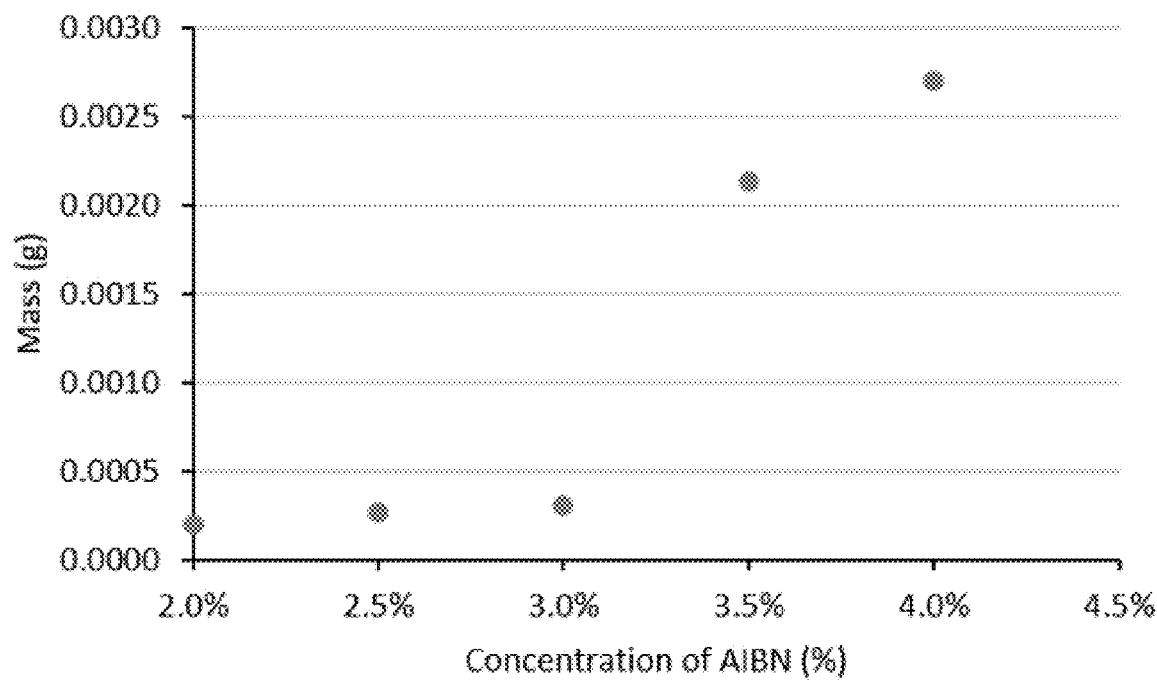
FIG. 24 shows representative data for mass of the dried layer versus concentration of AIBN for an ACUVUE® Advance contact lens modified to have a poly(DMA) lubcricious coating, according to an aspect of the present disclosure, made using 4 wt % DMA and reaction at 70° C. for 12 hours and where AIBN concentration was varied as indicated.
Figure 25:
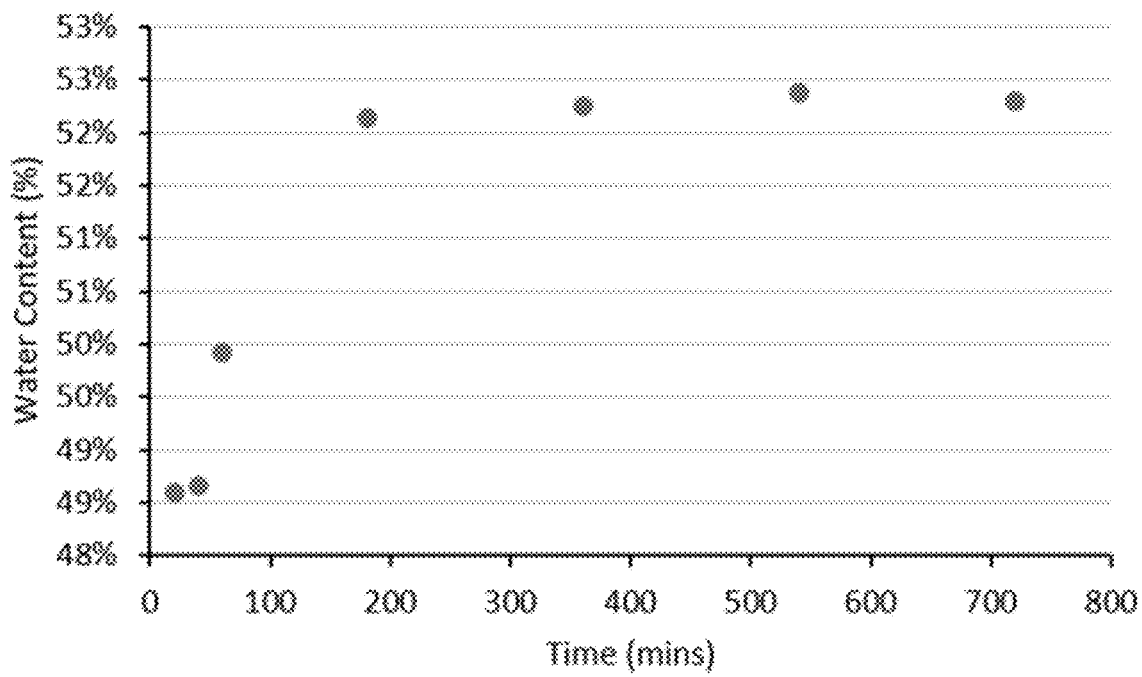
FIG. 25 shows representative data for water content versus reaction time for an ACUVUE® Advance contact lens modified to have a poly(DMA) lubcricious coating, according to an aspect of the present disclosure, made using 4 wt % DMA and 3.4 wt % AIBN, and where reaction time was varied as indicated.
Figure 26:
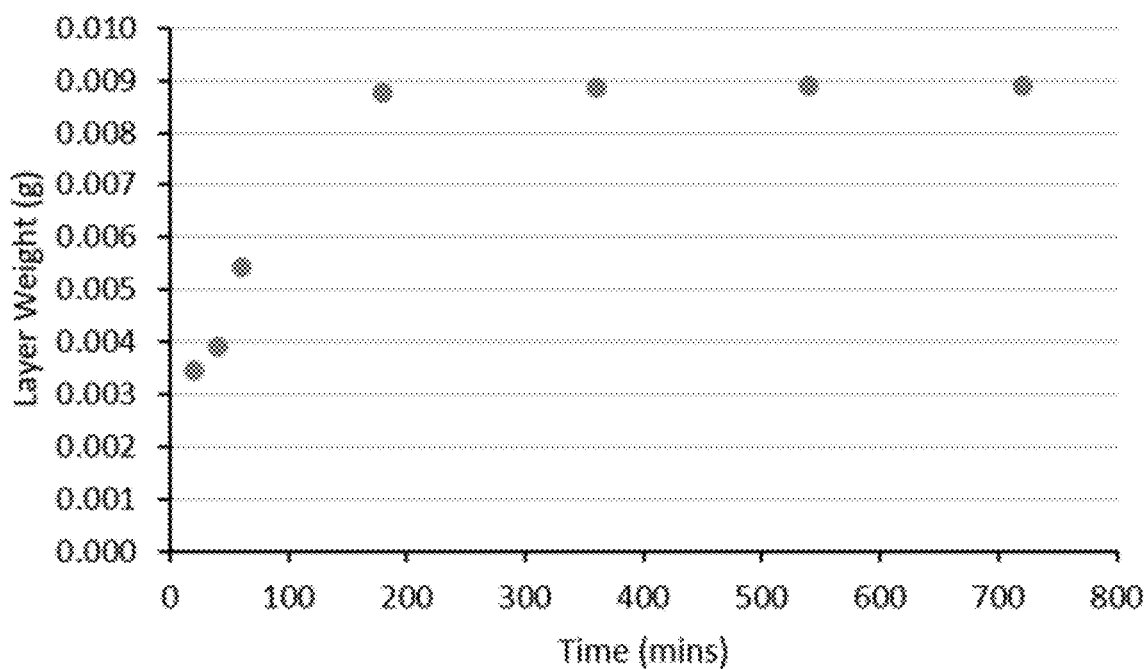
FIG. 26 shows representative data for mass of the wet layer versus reaction time for an ACUVUE® Advance contact lens modified to have a poly(DMA) lubcricious coating, according to an aspect of the present disclosure, made using 4 wt % DMA and 3.4 wt % AIBN, and where reaction time was varied as indicated.
Figure 27:
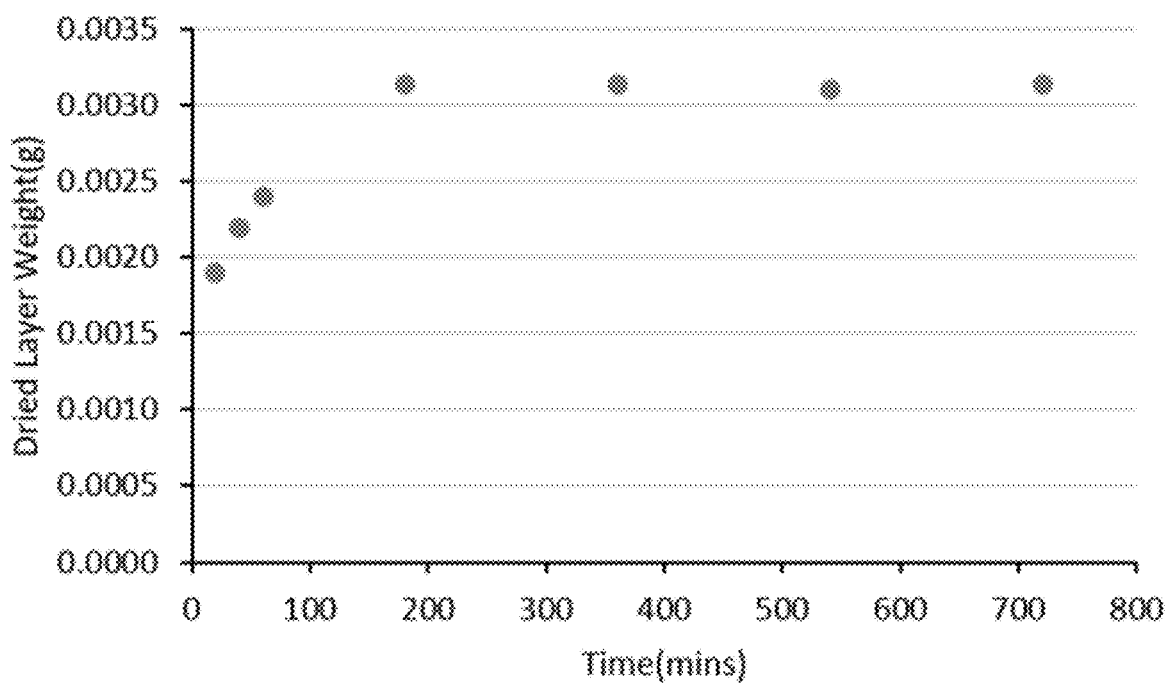
FIG. 27 shows representative data for mass of the dried layer versus reaction time for an ACUVUE® Advance contact lens modified to have a poly(DMA) lubcricious coating, according to an aspect of the present disclosure, made using 4 wt % DMA and 3.4 wt % AIBN, and where reaction time was varied as indicated.

Lens were modified by the foregoing method to assess the effect of varying each of: concentration of DMA, concentration of AIBN, and reaction times. FIGS. 19-21 show that the water content of modified lenses, the wet weight of the film, and the dry weight of the film increased as the concentration of DMA increased at concentrations greater than 3%. FIGS. 22-24 show that the water content of modified lenses, the wet weight of the film, and the dry weight of the film increased as the concentration of AIBN increased at concentrations greater than 3%. FIGS. 25-27 show that the water content of modified lenses, the wet weight of the film, and the dry weight of the film increased within the first three hours reaction and then appeared to reach a plateau. The data pertaining to reaction time suggest that the a significant proportion of polymerization likely occurred, under these conditions, within the first three hours of reaction.

Contact Angle of Modified Lens.

Figure 15A:
FIGS. 15A and 15B show representative photographs of water contact used for contact angle measurement of ACUVUE® Advanced lens with (FIG. 15A) and without (FIG. 15B) thermally initiated modification to provide a lubricious contact lens, according to an aspect of the present disclosure.
Figure 15B:
Figure 28:
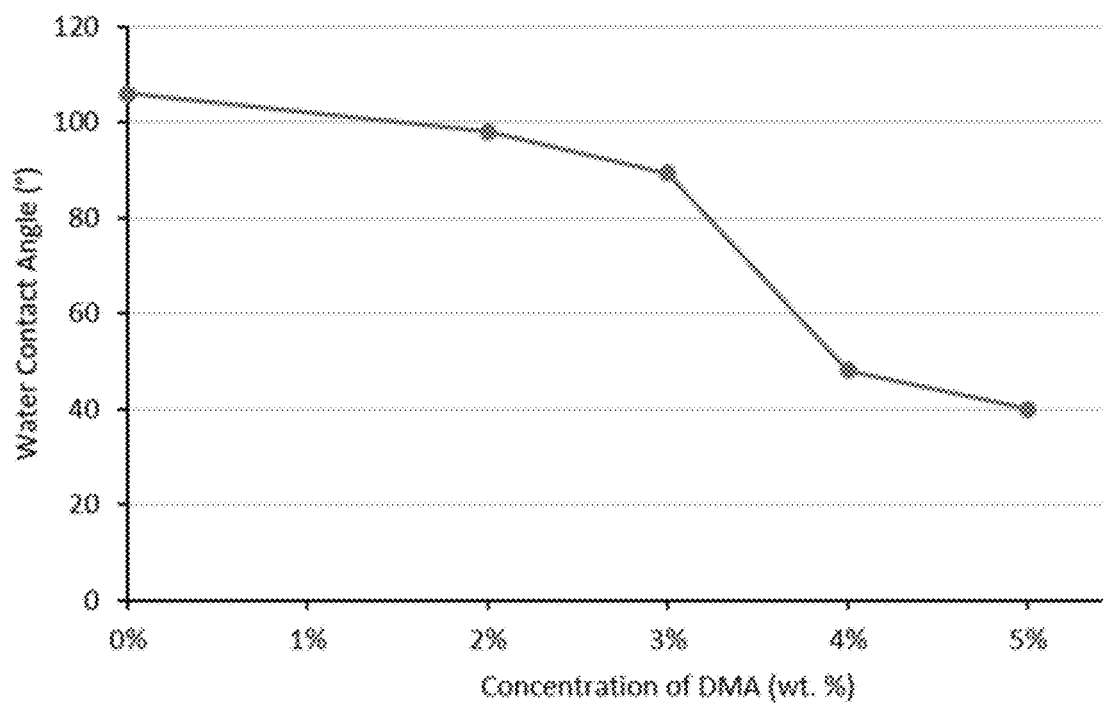
FIG. 28 shows representative contact angle data versus concentration of DMA for an ACUVUE® Advance contact lens modified to have a poly(DMA) lubcricious coating, according to an aspect of the present disclosure, made using 3.4 wt % AIBN and reaction at 70° C. for 12 hours and where DMA concentration was varied as indicated.
Figure 29:
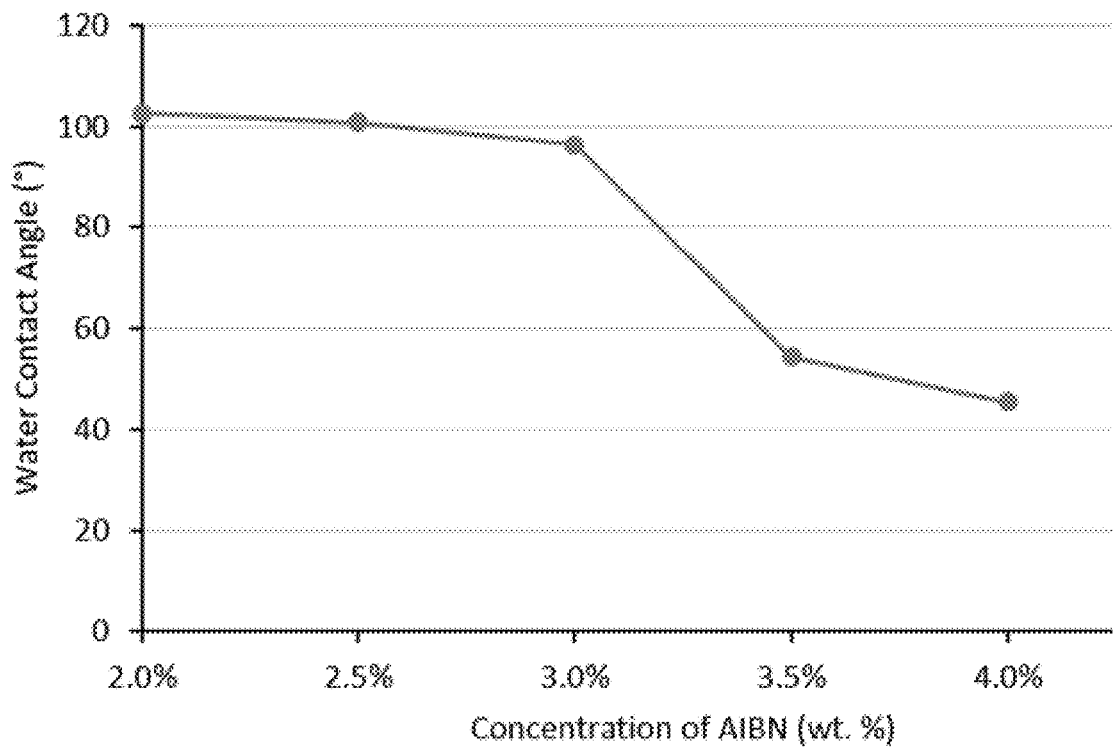
FIG. 29 shows representative contact angle data versus concentration of AIBN for an ACUVUE® Advance contact lens modified to have a poly(DMA) lubcricious coating, according to an aspect of the present disclosure, made using 4 wt % DMA and reaction at 70° C. for 12 hours and where AIBN concentration was varied as indicated.
Figure 30:
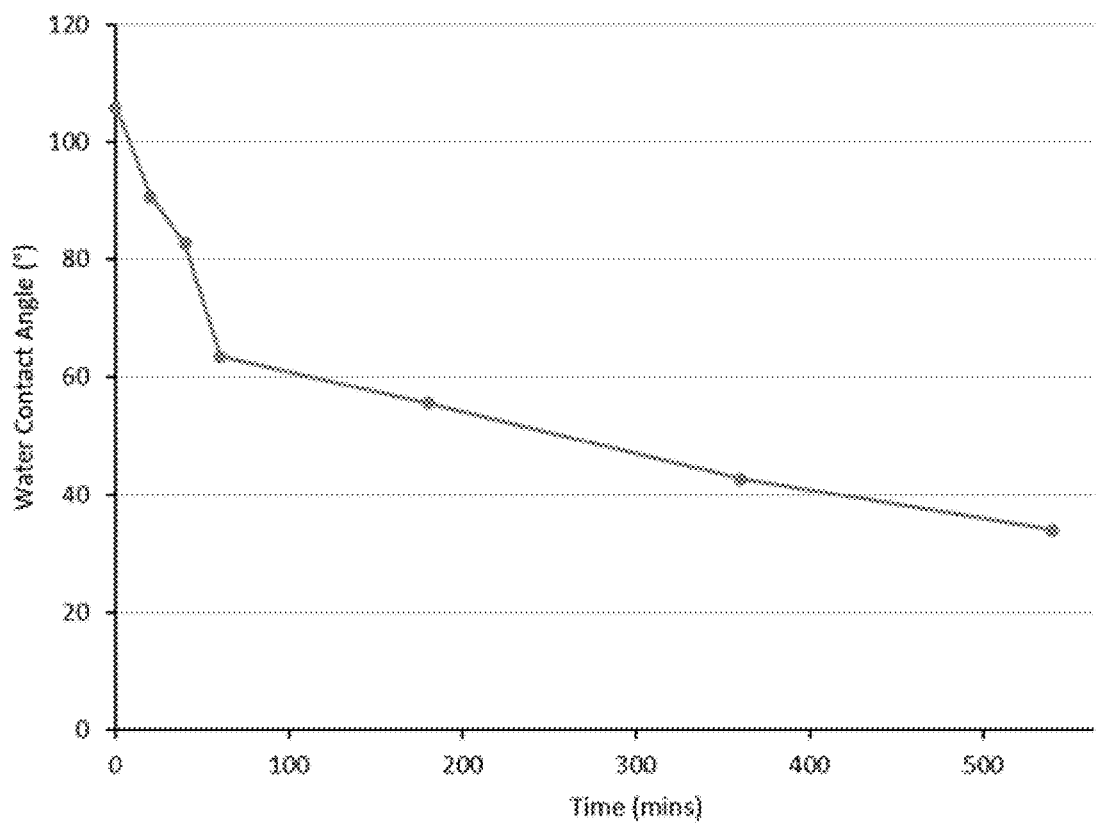
FIG. 30 shows representative contact angle data versus concentration of AIBN for an ACUVUE® Advance contact lens modified to have a poly(DMA) lubcricious coating, according to an aspect of the present disclosure, made using 4 wt % DMA and 3.4 wt % AIBN, and where reaction time was varied as indicated.

The water contact angle of an ACUVUE® ADVANCE® unmodified lens and an ACUVUE® ADVANCE® lens modified per the foregoing methods was determined using a KRUSS Drop Shape Analyzer—DSA100. Briefly, a drop of water was placed on the surface of a test lens. The data show that a modified contact lens compared to the unmodified contact lens, the modified contact lens has a significantly lower water contact angle (FIG. 15), suggesting that a hydrophilic surface layer was on the surface as a result of the foregoing method. Specifically, the contact angle (theta) of water on the surface of an unmodified ACUVUE® ADVANCE® lens was 105.9±0.1 degree, whereas the contact angle (theta) of a modified ACUVUE® ADVANCE® lens was 45.3±0.12 degree. The data in show that the contact angle decreased monotonically as concentration of DMA increased at concentrations greater than 3 wt % (FIG. 28); as concentration of AIBN increased at concentrations greater than 3 wt % (FIG. 29), and with increasing reaction time (FIG. 30). The results suggest that thickness of the disclosed lubricous layer can be increased with higher concentration of DMA, AIBN or longer reaction duration.

Lubricity and Shape Change of a Modified Lens.

Assessment of the various parameters, the concentration of AIBN and DMA were varied. All studies were carried at the indicated concentrations of AIBN and DMA according to the foregoing method with reactions carried out at 70° C. and 12 hours. FIG. 31 shows the images of lens modified as described; a description of shape assessed visually; and lubricity characteristics assessed by a finger feel test involving rubbing the surface with the fingers. The data show that higher concentrations of DMA and AIBN can be associated with a lens shape change; and a lower concentration of DMA and AIBN can be associated with a loss of lubricity. In some aspects, an effective concentration of AIBN and DMA are 3.4 wt % and 4 wt %.

Characterization of the Surface Layer Composition by ATR-FTIR.

Figure 32:
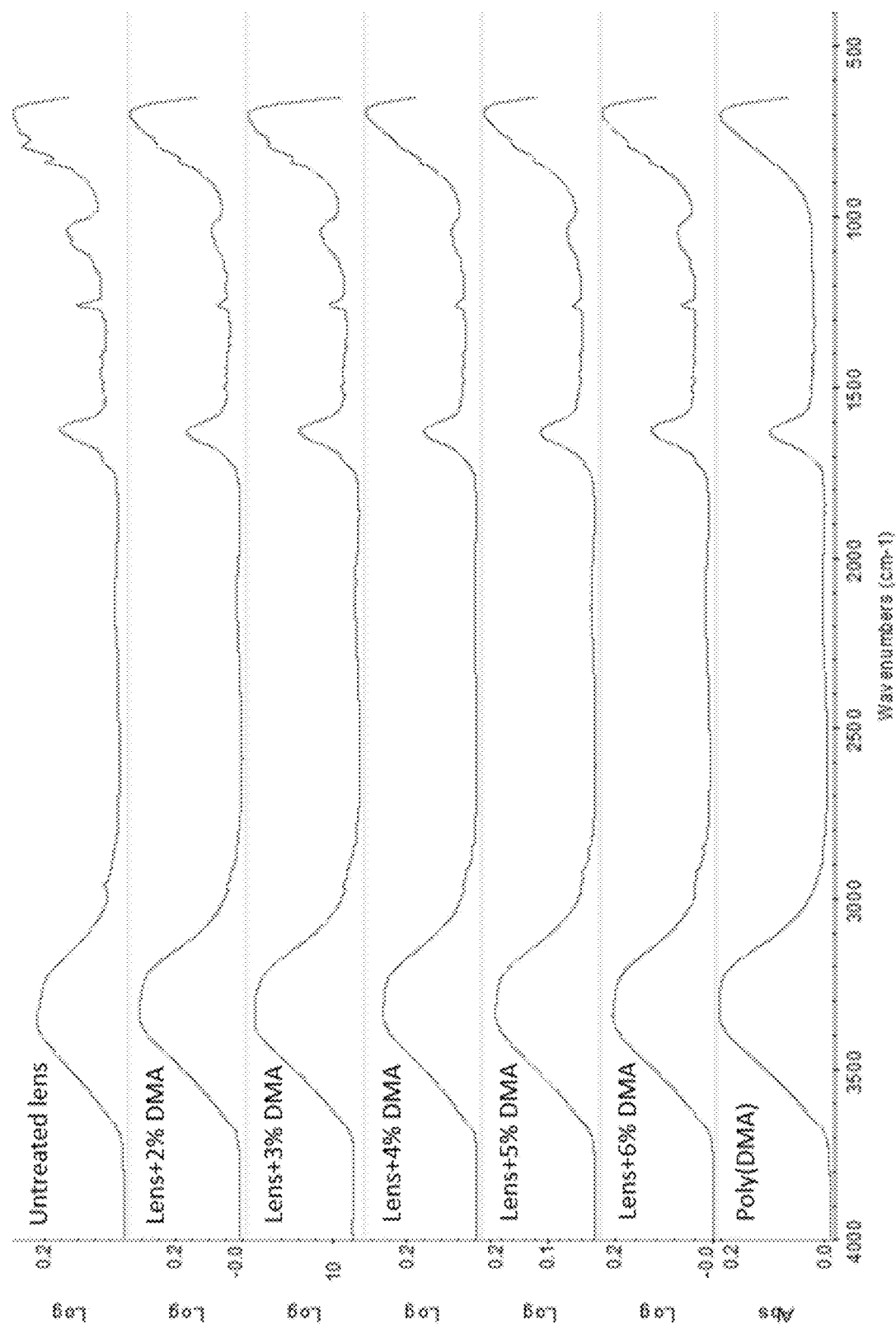
FIG. 32 shows representative stacked FTIR spectra for pure poly(DMA) and an untreated ACUVUE® Advance contact lens as indicated, and also for an ACUVUE® Advance contact lens modified using the indicated DMA concentrations in the presence of 3.4 wt % AIBN and reaction at 70° C. for 12 hours, according to an aspect of the present disclosure. The pure poly(DMA) sample used for comparison was prepared as described herein below in the Examples.
Figure 33:
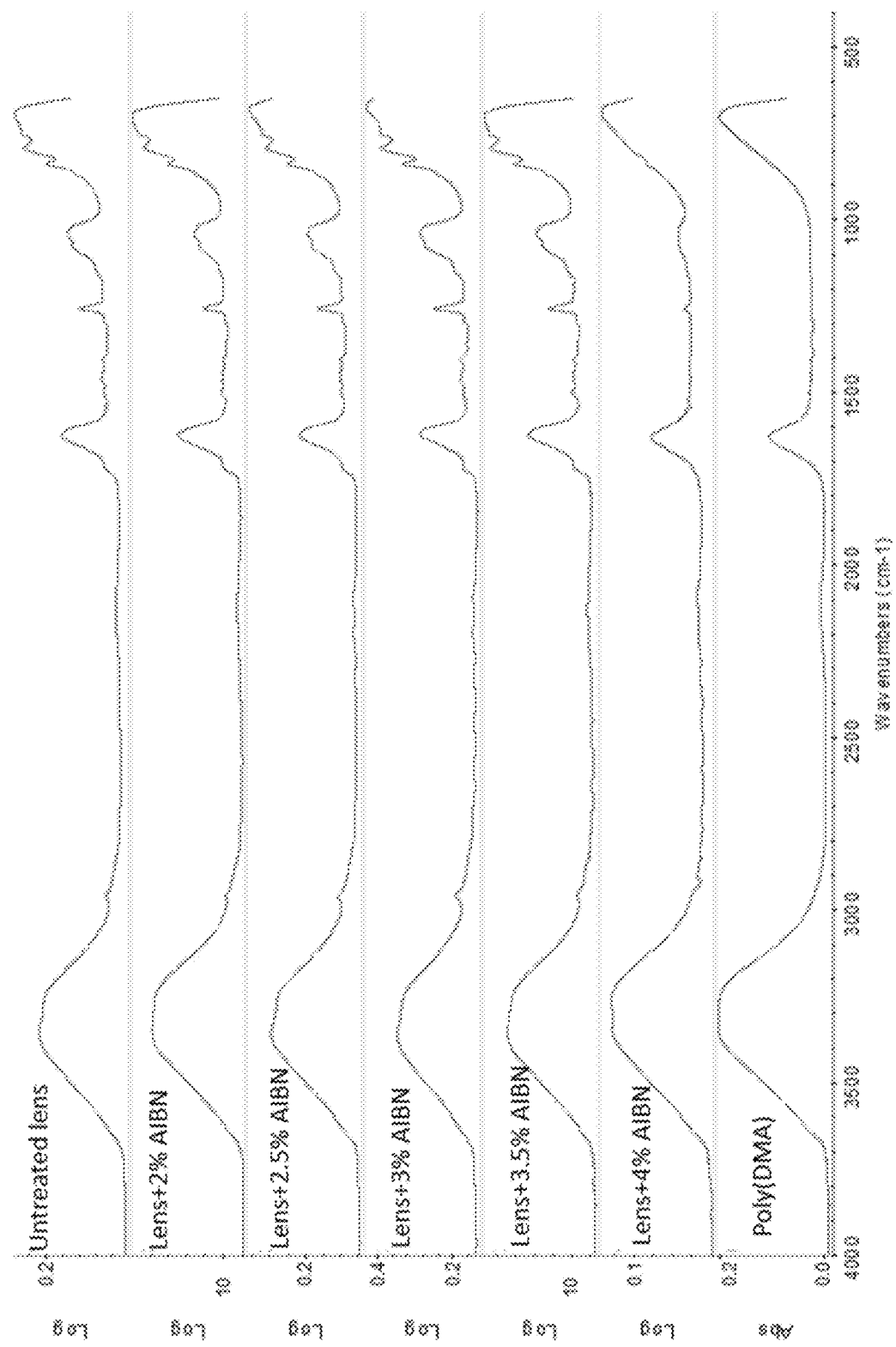
FIG. 33 shows representative stacked FTIR spectra for pure poly(DMA) and an untreated ACUVUE® Advance contact lens as indicated, and also for an ACUVUE® Advance contact lens modified using the indicated AIBN concentrations in the presence of 4 wt % DMA and reaction at 70° C. for 12 hours, according to an aspect of the present disclosure.
Figure 34:
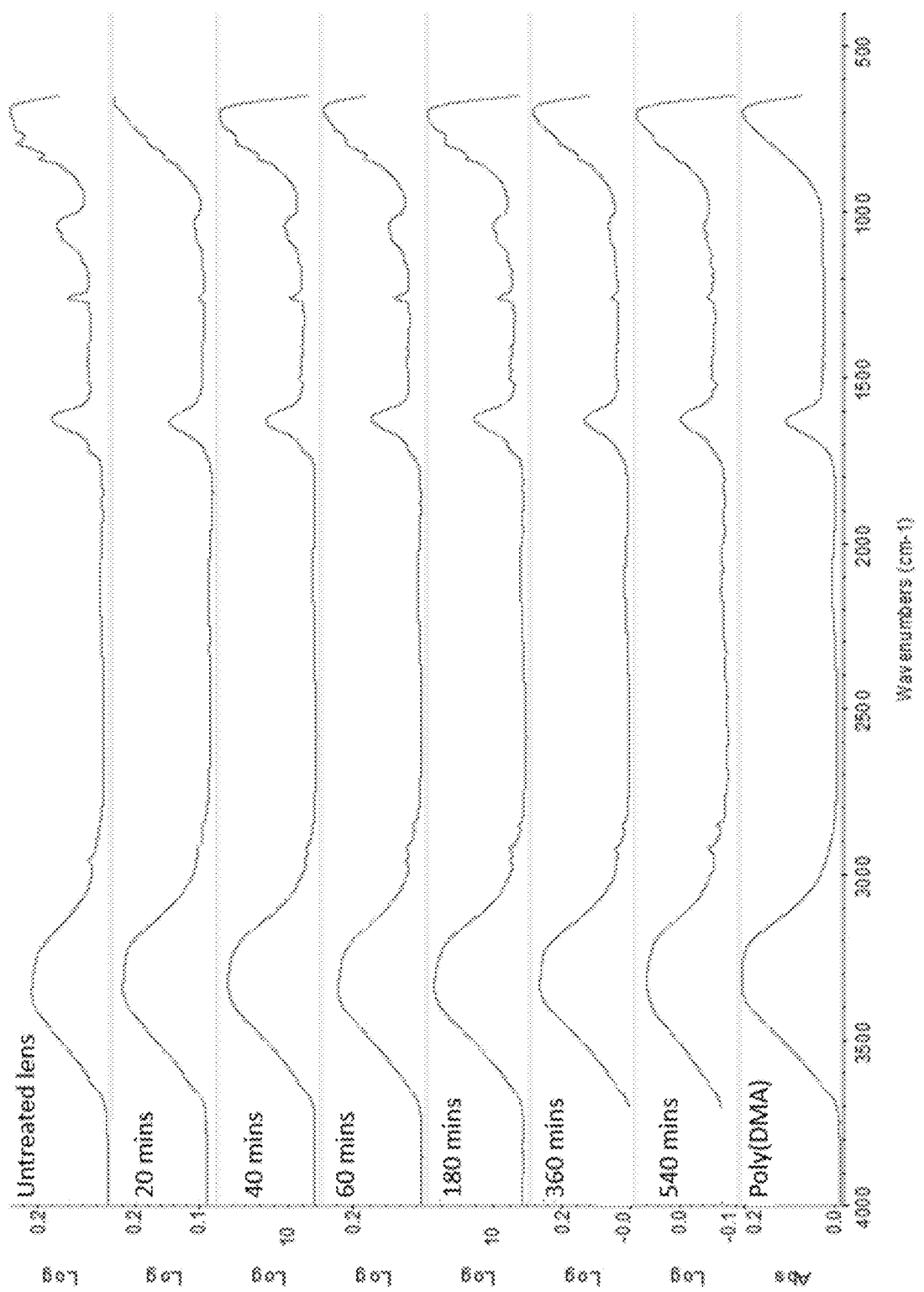
FIG. 34 shows representative stacked FTIR spectra for pure poly(DMA) and an untreated ACUVUE® Advance contact lens as indicated, and also for an ACUVUE® Advance contact lens modified using 3.4 wt % AIBN and 4 wt % DMA and reaction at 70° C. for the indicated reaction times, according to an aspect of the present disclosure.

ACUVUE® ADVANCE® lens modified per the foregoing methods was analyzed using FTIR, and the FTIR spectra obtained were compared to FTIR spectra obtained for an ACUVUE® ADVANCE® unmodified lens and a solution sample of poly(dimethyl acrylamide). The FTIR spectra are shown in FIGS. 32-34 obtained for varied concentrations of DMA or AIBN, and also for varied reaction times. The data show that as the concentration of DMA and AIBN increased at concentrations greater than 3%, the FTIR spectra of the modified contact lens becomes increasingly similar to the spectra of poly(dimethyl acrylamide). Similar results were obtained for varied reaction time, i.e., that as reaction time increased the FTIR spectra of the modified lens showed increased similarity to the FTIR spectra of a poly(dimethyl acrylamide) sample. The data are consistent with the surface layer being substantially similar to poly(dimethyl acrylamide). In addition, the data are consistent with the thickness of the surface layer increasing with the same parameters.

Lubricity Test of a Modified Contact Lens.

Figure 35:
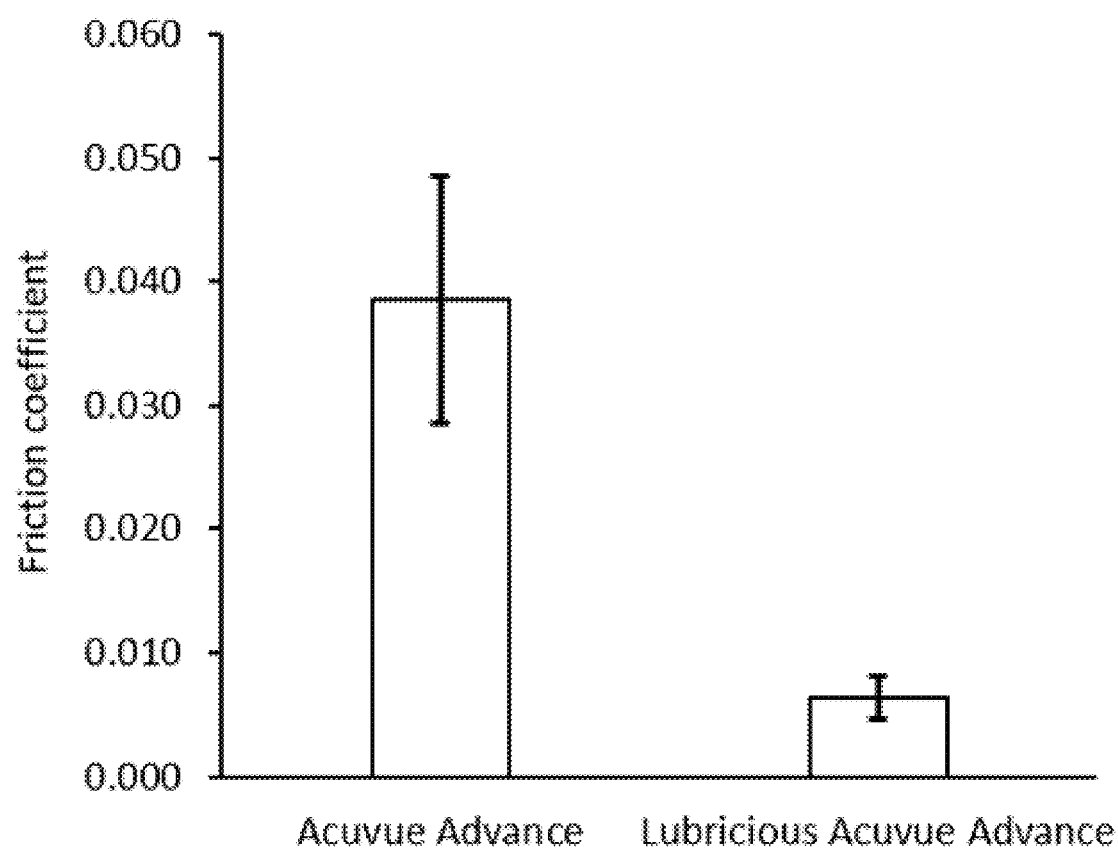
FIG. 35 shows representative friction coefficient data for an unmodified ACUVUE® Advance contact lens and an ACUVUE® Advance contact lens modified using 4 wt % DMA and 3.4 wt % AIBN, and reaction at 70° C. for 12 hours, according to aspects of the disclosed compositions and methods.

The lubricity of the lenses were characterized by measuring the friction coefficient between lenses and a rabbit cornea as described herein above using the Torque Meter Lubricity Test. Both ACUVUE® ADVANCE® unmodified lens and an ACUVUE® ADVANCE® lens modified per the foregoing methods were tested. The friction coefficient of each lens was measured for 3 runs in one direction only. FIG. 35 shows the friction coefficient of the modified lubricious lens decreased by the factor of 5, consistent with the lubricity of the modified contact lens being highly improved compared to the unmodified lens.

Assessment of the Disclosed Method with Other Lens.

Figure 36:
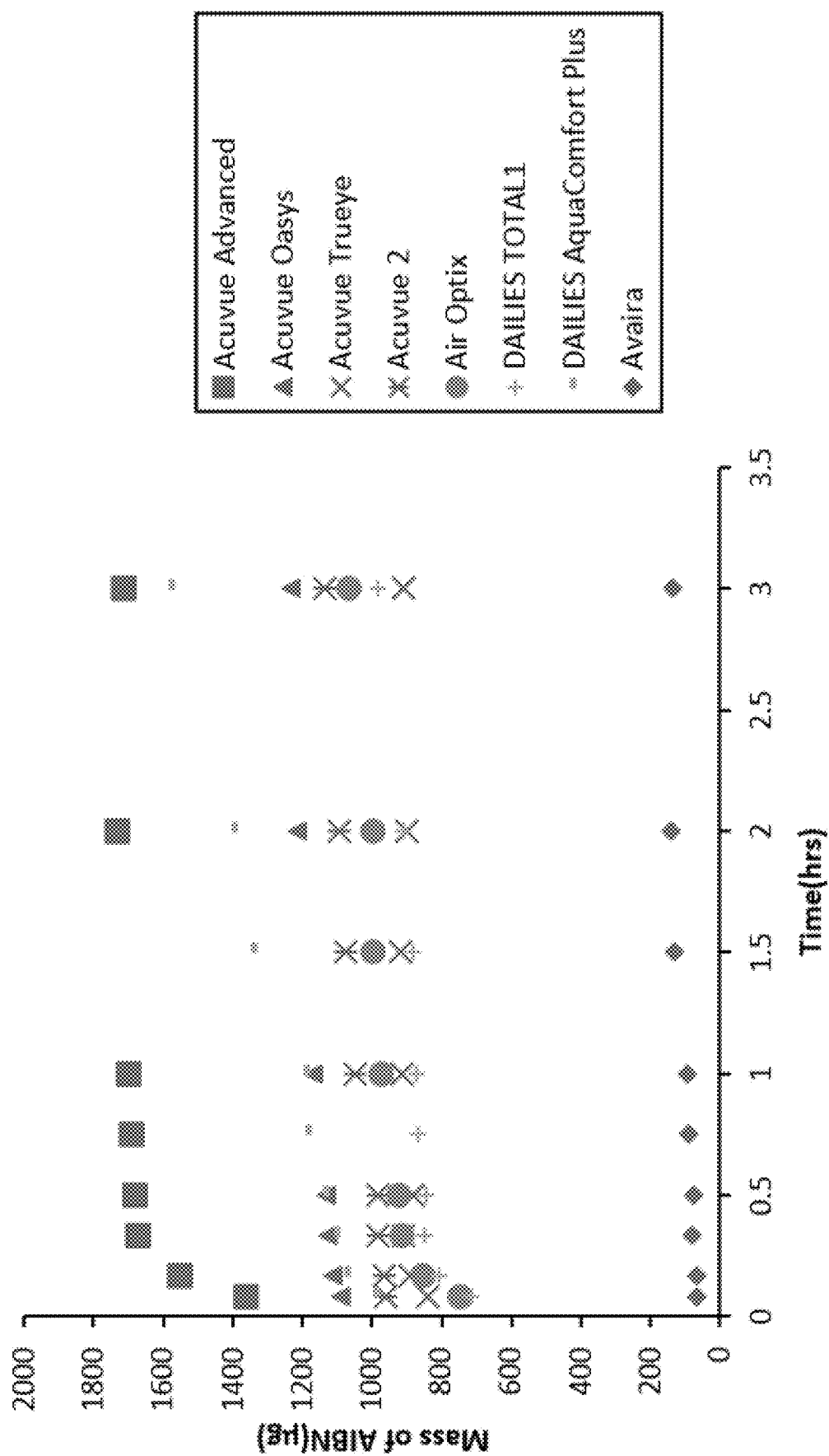
FIG. 36 shows representative data for the release of AIBN versus time from the indicated commercially available contact lens. Briefly, the indicated contact lens was soaked in a methanol solution of 3.4 wt % AIBN for 24 hours. The contact lens was then transferred to deionized water at 80° C. and samples of the water were analyzed using UV-vis spectrophotometry to determine the dynamic concentration of the AIBN that had been released from the contact lens.

The foregoing method was applied to other commercially available lens, such as, ACUVUE® Oasys, ACUVUE® 2, ACUVUE® Trueye®, DAILIES TOTAL1®, DAILIES® AquaComfort Plus®, Air Optix®, Avaira®. However, only ACUVUE® ADVANCE® and Air Optix® lens were effectively modified under these conditions. Modification according to these procedures on other lenses caused a shape change or failed to add lubricity on the surface. Each brand uses different materials in their lenses, which leads to unique AIBN release profiles from the lenses into the DMA solution (external solution). The lenses were soaked in 3.4% AIBN (methanol) solution for 24 hours, and then transferred into DI water at 80° C. The DI water was analyzed using UV-vis spectrophotometry to determine the dynamic concentration of AIBN that was released into the DI water. FIG. 36 shows AIBN release at 80° C. for these selected lenses. We observed that ACUVUE® ADVANCE® and Air Optix® lenses released effective amounts of AIBN in 30 minutes capable of catalyzing synthesis of the lubricious layer. The data suggest that other lenses did not release an effective amount of AIBN within this time scale. ACUVUE® Oasys, ACUVUE® 2, ACUVUE® Trueye®, DAILIES TOTAL1®, and DAILIES® AquaComfort Plus® lenses released a substantial proportion of AIBN within 5 minutes, with a kinetic profile similar to that seen for ACUVUE® ADVANCE® and Air Optix®. In contrast, the Avaira® lens released only a small amount of AIBN over an extended period of about 3 hours. However, there was no observed no lubricity on the lens surface or a lens shape change.

Figure 37:
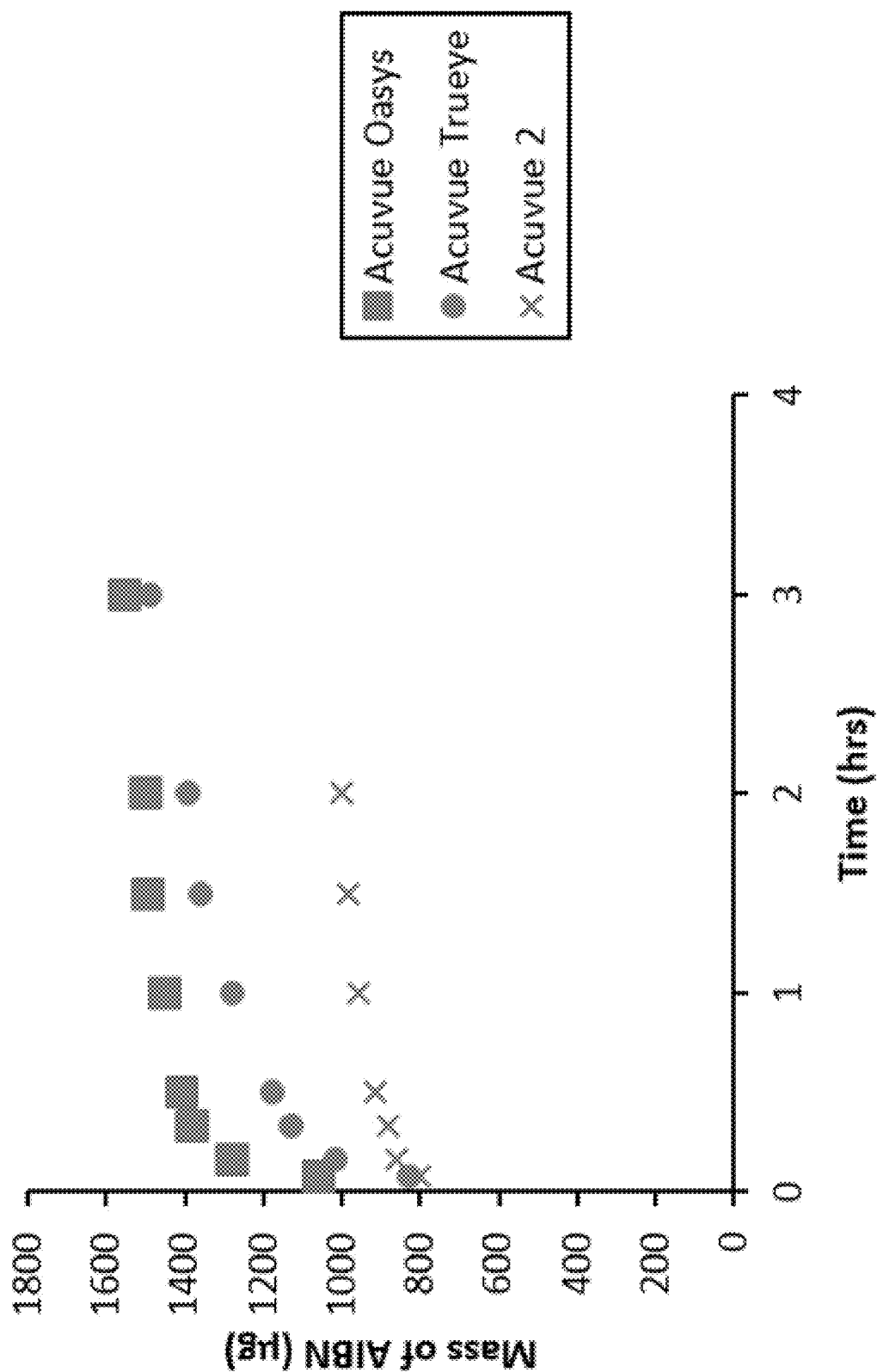
FIG. 37 shows representative data for the release of AIBN versus time from the indicated commercially available contact lens. Briefly, the indicated contact lens was soaked in a methanol solution of 1.8 wt % vitamin E and 7 wt % AIBN for 24 hours. The contact lens was then transferred to deionized water at 80° C. and samples of the water were analyzed using UV-vis spectrophotometry to determine the dynamic concentration of the AIBN that had been released from the contact lens.

As an alternative approach, in order to modulate the release of AIBN from the lens, the ability of vitamin E to act as an effective diffusion barrier was examined for ACUVUE® Oasys, ACUVUE® 2, and ACUVUE® Trueye® lens. Briefly, the lens was soaked in a methanol solution of the Vitamin E and AIBN (1.8 wt % Vitamin E and 7 wt % AIBN) for 24 hours. Following soaking of the lens in the foregoing solution, it was placed in DI water at 80° C. The DI water was analyzed using UV-vis spectrophotometry determine the release of AIBN versus time. FIG. 37 shows AIBN release from these lenses loaded with both Vitamin E and AIBN. The data suggests that the presence of Vitamin E slows the release of AIBN from these lenses, and is especially notable for the ACUVUE® Oasys.

Figure 38:
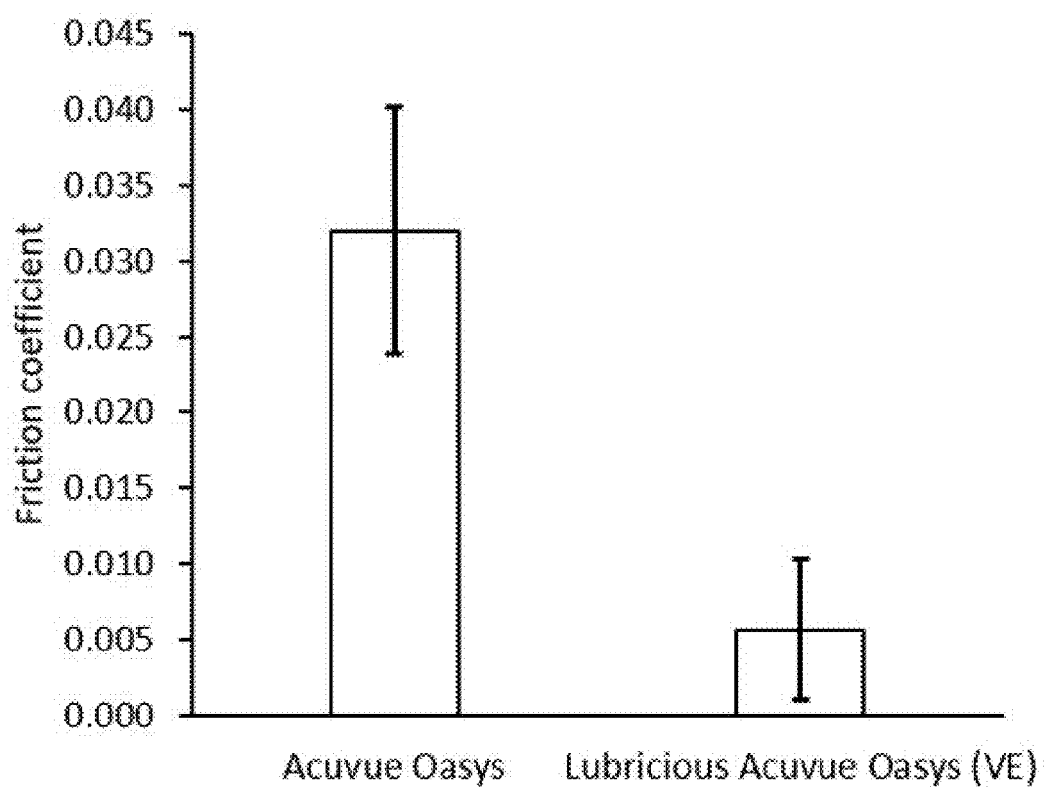
FIG. 38 shows representative friction coefficient data for an unmodified ACUVUE® Oasys contact lens and an ACUVUE® Oasys contact lens modified per disclosed methods. Briefly, a ACUVUE® Oasys contact lens was infused using a solution comprising 1.8 wt % vitamin E and 7 wt % AIBN, and then polymerized by placing the lens in a 4 wt % DMA solution and the reaction carried out at 80° C. for 12 hours, according to aspects of the disclosed compositions and methods.

Synthesis of a lubricious layer was attempted, using the modified method with vitamin E, for an ACUVUE® Oasys lens. Briefly, an Acuvue Oasys lens was soaked in a methanol solution of Vitamin E and AIBN (1.8 wt % Vitamin E and 7 wt % AIBN) for 1 hour. The lens was transferred into a vial of 4% DMA solution which had been purged with nitrogen for 30 minutes. The vial was kept at 80° C. for 12 hours, washed with DI water, and then placed into a vial of PBS. The lubricity of an unmodified and modified ACUVUE® Oasys lens by the lubricity testing device described above. The data in FIG. 38 show that the friction coefficient of the modified lens was 6 times lower than the commercial lens, indicating that the lubricity of the modified Acuvue Oasys was highly improved.

Summary

The data herein demonstrate a method utilizing DMA and AIBN using heat can provide a surface layer modification to commercially available contact lens that increases lubricity and wettability. That is, the data show a contact lens can be modified to comprise a lubricious surface layer comprising poly(dimethyl acrylamide) can be prepared using DMA and a hydrophobic initiator, AIBN. The method can be controlled more easily than the method in Example 1 due to the extended reaction times, such that the reaction time is on the order of several hours, e.g., about 12 hours can be effective. The concentration of monomer, e.g., DMA, and initiator, e.g., AIBN, can be controlled to insure effective results. For example, it was observed that high concentrations of DMA or AIBN can lead to detrimental results, including a shape change or lack of lubricity. It was also observed that the reaction time should be can be optimized for effective results, e.g., a too short reaction time can also result in a low lubricity on the lens surface. The following parameters were considered highly effective for 1-Day ACUVUE® Advance® lens: about 4 wt % DMA for the external solution; about 3.4 wt % AIBN for the lens loading solution; and about 12 hours reaction time at about 70° C. Other configurations were examined, but had less effective surface layers. The results from FTIR are consistent with the composition of the lubricious surface layer comprising poly(dimethyl acrylamide). It was observed that the thickness of the surface layer increased with increasing concentration of DMA, increasing concentration of AIBN, and increasing reaction time. The results from water contact angle tests and lubricity tests showed the modified lens has a higher hydrophilicity and lubricity than the commercial lenses. AIBN release from lenses at high temperature was analyzed. Vitamin E was introduced as a diffusion barrier to decrease the rate of the AIBN release. An ACUVUE® OASYS® lens loaded with Vitamin E and AIBN was effectively modified to comprise an effective lubricious surface layer that was significantly improved compared to the same lens without modification.

Example 3: Representative Lubricious Coating Prepared Using DMA, AIBN and UV Irradiation Synthesis of Lubricious Layer Using UV Irradiation.

Figure 16:
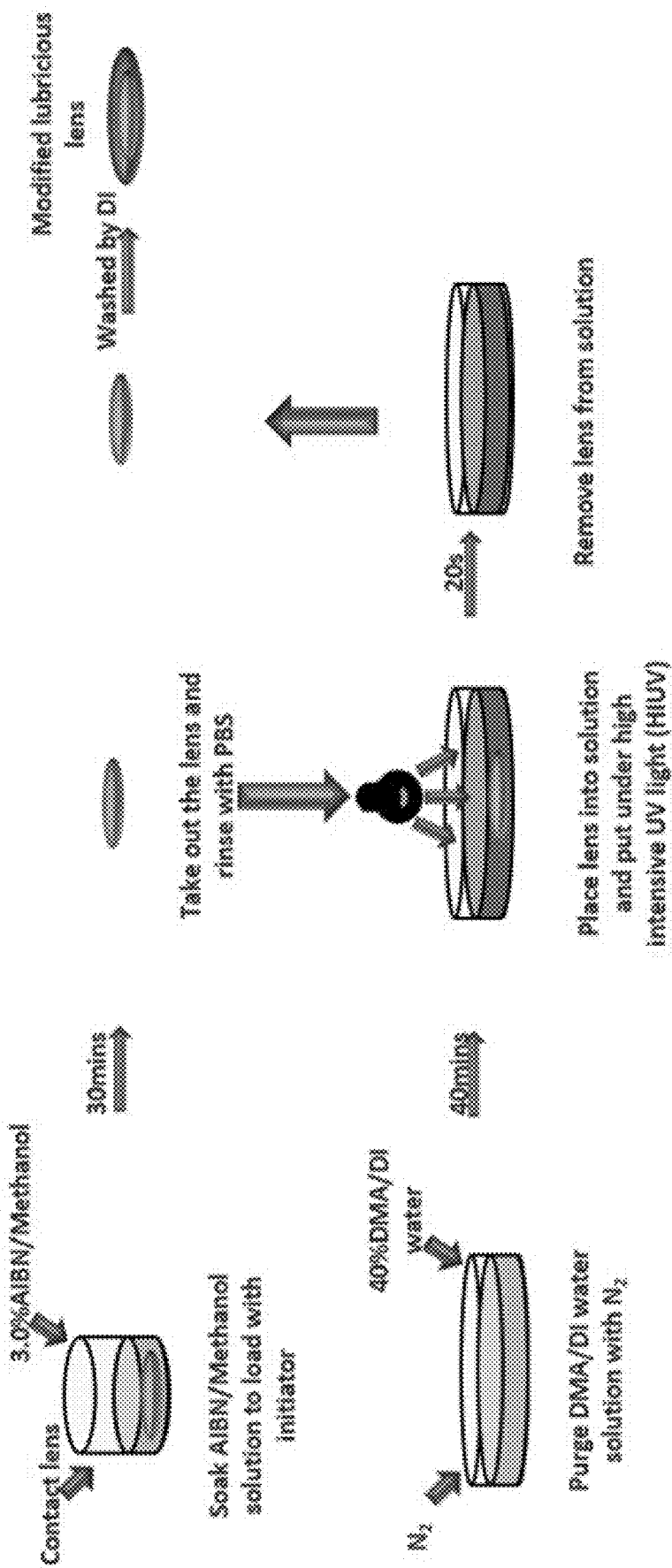
FIG. 16 shows a scheme for the process of photochemically initiated polymerization which can provide a thin lubricious layer of poly(DMA) on the surface of the contact lens, according to an aspect of the present disclosure.

The application of the foregoing method using DMA and AIBN to other lens types was examined by modified the modality of carrying out the reaction. In the above method, the reaction of DMA and AIBN was facilitated by heating. In a modified approach, shown schematically in FIG. 16, the reaction was carried out using UV irradiation as an energy source for the reaction. Briefly, a contact lens was soaked in a methanol solution of 3.0 wt % azobisisobutyronitrile (AIBN) for 30 minutes. Then, after transferring the lens to PBS and rinsing for 2 minutes, the contact lens was placed into an aqueous solution (DI water) of 40 wt % N, N-dimethylacrylamide which had been purged for 40 minutes. The 40 wt % DMA solution with the contact lens was placed under UV light for 20 seconds. The UV light source was an RC-742 Pulsed UV System (Xenon Corporation, Wilmington, Mass.). The RC-742 Pulsed UV System is capable of producing 1,000 W/cm$^2$ in under 0.5 second, and the lamps operate without a magnetron and can be ozone-free. Following polymerization, the lens was then washed with DI water and stored in PBS.

Figure 39:
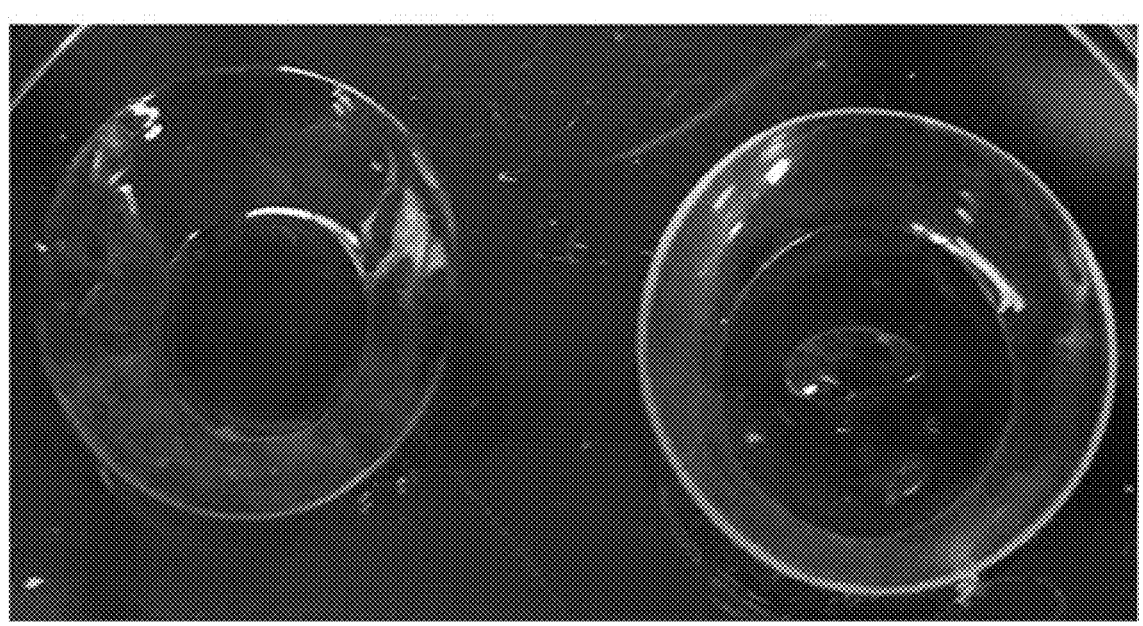
FIG. 39 shows representative images of an unmodified ACUVUE® Oasys contact lens (contact lens on left) and an ACUVUE® Oasys contact lens modified as described for FIG. 38 (contact lens on right), according to aspects of the disclosed compositions and methods.

The data are summarized in FIGS. 40 and 41, and these data suggest that the use of UV irradiation is highly effective for synthesizing a lubricious layer on the ACUVUE® Oasys lens. However, the effectiveness was more limited for other lenses examined. Based on the foregoing results, the characteristics of the lubricious layer synthesized in the presence of UV irradiation was examined in further detail for the ACUVUE® Oasys lens. Alternative concentrations of AIBN were also examined using UV irradiation as the energy source. The data for these additional reaction variations are shown in FIG. 42. The shape of lubricious contact lens was not changed by the modification at higher AIBN concentrations, but the size of lens was observed to be enlarged, with the perimeter of the modified lens was increased by 118% compared to the unmodified lens, see FIG. 39. The modified lens shown in FIG. 39 was prepared using 40 wt % DMA and 3 wt % AIBN, and reaction under UV light as described above.

Determination of the Water Content in Modified Lens.

The water content of the modified lens was assessed by measuring the difference between hydrated weight and dry weight of the lubricious lenses. Table 8 below shows the dry weight and hydrated weight for both a commercial lens and a modified lens. The weight of the hydrated layer and the dry layer was calculated by subtracting the weight of the commercial lens from the weight of the modified one. The ratio of the weights (in grams) of the hydrated layer and the dry layer yields the water content in the lubricious layer (see Table 8). The data Table 8 were obtained using an ACUVUE® ADVANCE® lens that was unmodified or modified according to the preceding method using 3.0 wt % AIBN and 40 wt % DMA, and reaction carried out under UV irradiation.

TABLE 8

Characterization of modified contact lens weight.

| Type | Lens Hydrated mass | Lens Hydrated mass (average) | Layer Hydrated mass | Lens Dried mass | Lens Dried mass (average) | Layer Dried mass | Water content (lens) | Water content (layer) |
|---|---|---|---|---|---|---|---|---|
| Unmodified Lens | 0.0306 | 0.0306 | — | 0.0188 | 0.0188 | — | 38.562% | — |
| Modified Lens | 0.0434 0.0438 0.0438 | 0.0437 | 0.0131 | 0.0213 0.0209 0.0201 | 0.0208 | 0.00197 | 52.443% | 564.407% |

Contact Angle of Modified Lens.

Figure 17A:
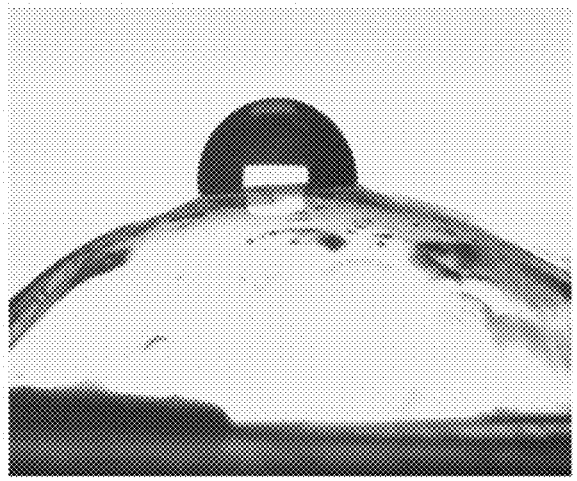
FIGS. 17A and 17B show representative photographs of water contact used for contact angle measurement of ACUVUE® Oasys lens with (FIG. 17A) and without (FIG. 17B) photochemically initiated modification to provide a lubricious contact lens, according to an aspect of the present disclosure.
Figure 17B:
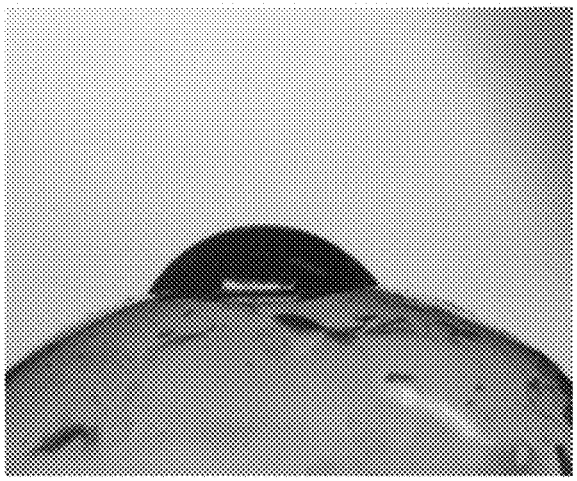

The water contact angle was determined using a KRUSS Drop Shape Analyzer—DSA100 for an ACUVUE® Oasys unmodified lens and an ACUVUE® Oasys lens modified per the foregoing method using UV irradiation. Briefly, a drop of water was placed on the surface of a test lens. The data show that a modified contact lens compared to the unmodified contact lens, the modified contact lens has a significantly lower water contact angle (FIG. 17), suggesting that a hydrophilic surface layer was on the surface as a result of the foregoing method. Specifically, the contact angle (theta) of water on the surface of an unmodified ACUVUE® Oasys lens was 95.5±0.84 degree, whereas the contact angle (theta) of a modified ACUVUE® Oasys lens was 52.3±1.32 degree. The results suggest that thickness of the disclosed lubricious layer can be increased with higher concentration of DMA, AIBN or longer reaction duration.

Lubricity Test of a Modified Contact Lens.

Figure 43:
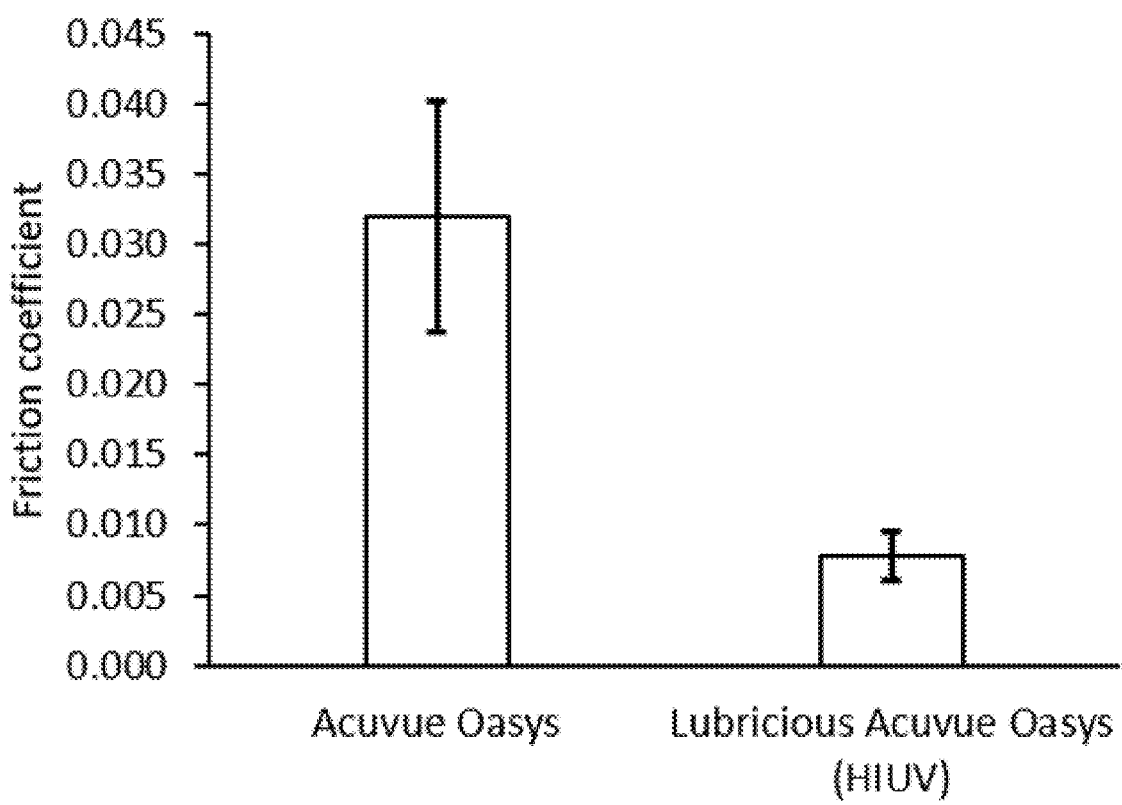
FIG. 43 shows representative friction coefficient data for an unmodified ACUVUE® Oasys contact lens and an ACUVUE® Oasys contact lens modified using 40 wt % DMA and 3 wt % AIBN, and reaction carried using UV irradiation for 20 seconds using an RC-742 Pulsed UV System, according to aspects of the disclosed compositions and methods.
Figure 44B:
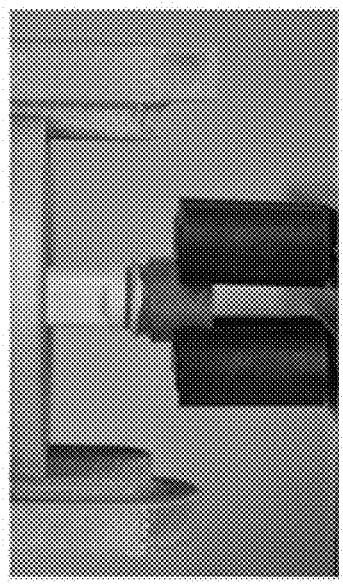
FIGS. 44A-44D shows representative aspects of a testing device used to determine friction coefficient between a contact lens and a rabbit cadaver cornea.
Figure 44C:
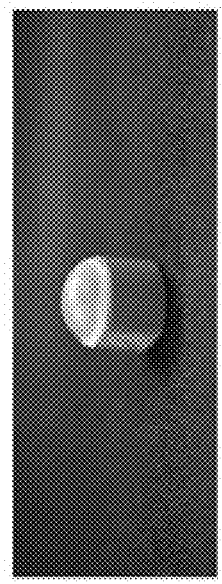
Figure 44D:
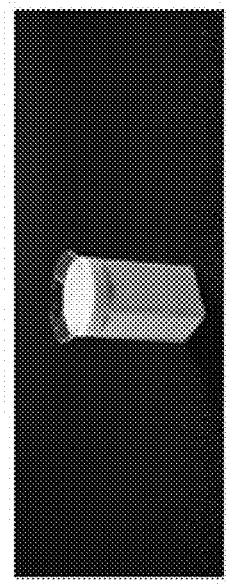
Figure 44A:
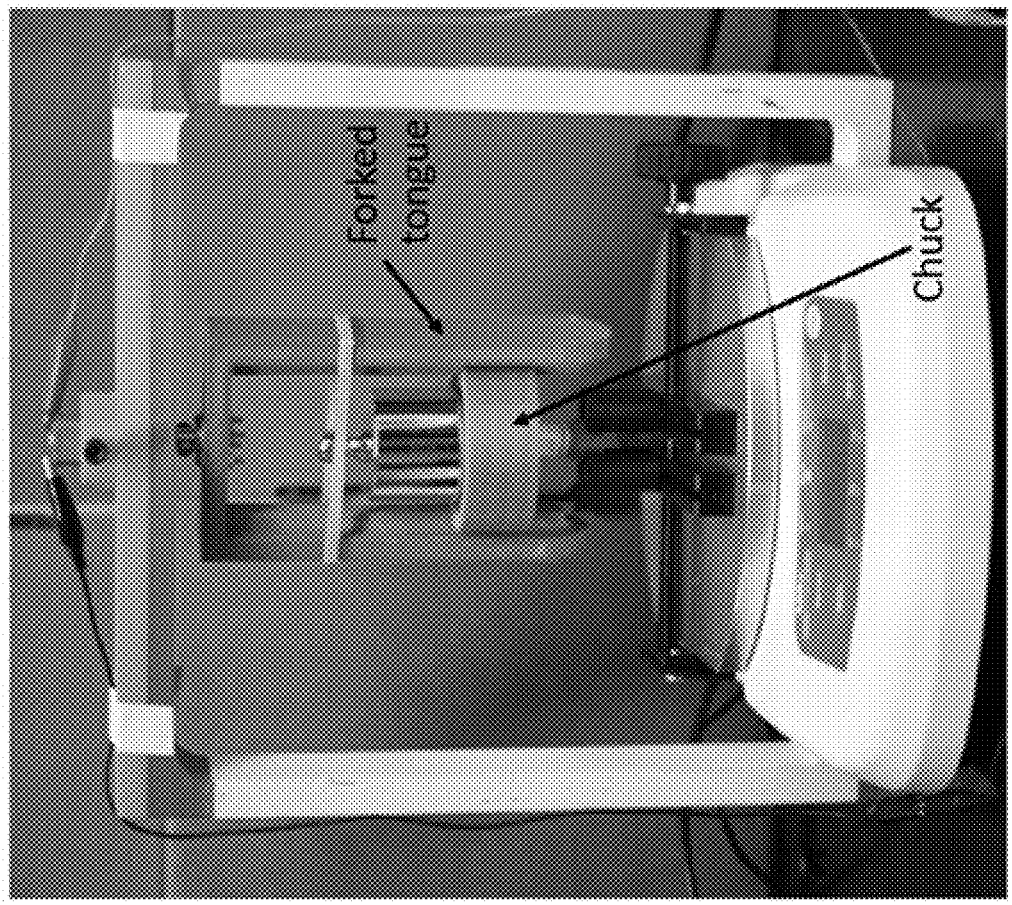

The lubricity of the lenses were characterized by measuring the friction coefficient between lenses and a rabbit cornea as described herein above using the Torque Meter Lubricity Test. Both an ACUVUE® Oasys unmodified lens and an ACUVUE® Oasys lens modified per the foregoing methods using UV irradiation were tested. The friction coefficient of each lens was measured for 3 runs in one direction only with the test lens and rabbit cadaver cornea hydrated in PBS. In the test, the load was 4.9N and the angular speed was 15 RPM. The data in FIG. 43 show that the friction coefficient of the modified lubricious lens decreased by the factor of 4, consistent with the lubricity of the modified contact lens being highly improved compared to the unmodified lens.

Summary

The data herein demonstrate a method utilizing DMA and AIBN using UV irradiation can provide a surface layer modification to commercially available contact lens that increases lubricity and wettability. That is, the data show a contact lens can be modified to comprise a lubricious surface layer comprising poly(dimethyl acrylamide) can be prepared using DMA and a hydrophobic initiator, AIBN. The method can be controlled more easily than the method in Example 1 due to the ability to exquisitely control aspects of the UV irradiation such as intensity, duration, and wavelength of the UV irradiation. In various aspects, it was determined that this modified method could provide an effective lubricious surface layer to an ACUVUE® OASIS® lens. Effective parameters for this method using an ACUVUE® OASYS® lens were: about 40 wt % DMA in the external solution; about 3 wt % AIBN in the lens loading solution; and UV irradiation for about 20 seconds.

It will be apparent to those skilled in the art that various modifications and variations can be made in the present disclosure without departing from the scope or spirit of the present disclosure. Other aspects of the present disclosure will be apparent to those skilled in the art from consideration of the specification and practice of the present disclosure disclosed herein. It is intended that the specification and examples be considered as exemplary only, with a true scope and spirit of the present disclosure being indicated by the following claims.

What is claimed is:

1. A method of preparing a surface layer on a contact lens, consisting of:
    providing a silicone hydrogel contact lens body;
    loading the silicone hydrogel contact lens body from an aqueous solution comprising a tertiary amine to form a tertiary amine loaded silicone hydrogel contact lens body or from an aqueous solution comprising a radical initiator to form a radical initiator loaded silicone hydrogel contact lens body;
    providing an aqueous solution comprising a monomer for a non-ionic hydrophilic polymer for use with the radical initiator loaded silicone hydrogel contact lens body or the aqueous solution comprising a monomer for a non-ionic hydrophilic polymer and further comprising a radical initiating oxidizer for use with the tertiary amine loaded silicone hydrogel contact lens body;
    contacting the tertiary amine loaded silicone hydrogel contact lens body or the radical initiator loaded silicone hydrogel contact lens body with the aqueous solution comprising the monomer;
    polymerizing the monomer at the surface and/or in the surface and a surface adjacent portion of the tertiary amine loaded silicone hydrogel contact lens body or the radical initiator loaded silicone hydrogel contact lens body to form a non-ionic hydrophilic polymer film;

terminating the radical; and isolating a lubricious silicone hydrogel contact lens.

2. The method of claim 1, wherein the monomer is N,N-dimethylacrylamide.

3. The method of claim 1, wherein the initiator is ammonium persulfate or azobisisobutyronitrile.

4. The method of claim 1, wherein the tertiary amine is N,N,N',N'-Tetramethylethane-1,2-diamine.

5. The method of claim 1, wherein polymerizing is retaining the lens in contact with the aqueous solution comprising the monomer for 5 to 180 seconds.

6. The method of claim 1, wherein polymerizing is retaining the lens in contact with the aqueous solution comprising the monomer for 1.5 minutes to 12 hours.

7. The method of claim 1, wherein terminating consists of contacting the non-ionic hydrophilic polymer film with oxygen.

8. The method of claim 1, wherein the aqueous solution comprising a tertiary amine further comprises the monomer.

9. The method of claim 1, wherein polymerizing is accomplished by heating.

10. The method of claim 1, wherein polymerizing is accomplished by irradiating.

\* \* \* \* \*